United States Patent
Gold et al.

(10) Patent No.: US 11,410,258 B2
(45) Date of Patent: Aug. 9, 2022

(54) METHOD AND SYSTEM FOR DISTRIBUTION OF UNIVERSITY STUDENT DEGREE COMPLETION DATA

(71) Applicant: Board of Trustees, California State University, Long Beach, CA (US)

(72) Inventors: Jeff Gold, Long Beach, CA (US); Desdemona Cardoza, Los Angeles, CA (US); Roy Stripling, Long Beach, CA (US)

(73) Assignee: Board of Trustees, California State University, Long Beach, CA (US)

( * ) Notice: Subject to any disclaimer, the term of this patent is extended or adjusted under 35 U.S.C. 154(b) by 0 days.

(21) Appl. No.: 16/599,114

(22) Filed: Oct. 10, 2019

(65) Prior Publication Data
US 2021/0110495 A1     Apr. 15, 2021

(51) Int. Cl.
*G06Q 50/20* (2012.01)
*G06F 16/25* (2019.01)
*G06F 16/958* (2019.01)
*G06F 16/23* (2019.01)
*G06F 16/28* (2019.01)

(52) U.S. Cl.
CPC ..... *G06Q 50/2053* (2013.01); *G06F 16/2365* (2019.01); *G06F 16/258* (2019.01); *G06F 16/287* (2019.01); *G06F 16/972* (2019.01)

(58) Field of Classification Search
CPC ........ G06Q 30/00; G06Q 10/00; G06Q 50/00; G06Q 50/2053; G06F 16/2365; G06F 16/258; G06F 16/287; G06F 16/972
See application file for complete search history.

(56) References Cited

U.S. PATENT DOCUMENTS

| | | | | |
|---|---|---|---|---|
| 2004/0197761 | A1* | 10/2004 | Boehmer | G09B 3/00 434/362 |
| 2007/0003919 | A1* | 1/2007 | Stevenson | G09B 19/0038 434/350 |
| 2013/0046775 | A1* | 2/2013 | Shapiro | G09B 7/02 707/758 |
| 2013/0066798 | A1* | 3/2013 | Morin | G06Q 50/20 705/327 |

(Continued)

OTHER PUBLICATIONS

Allensworth; what matter for staying in track and graduating (Year: 2007).*

(Continued)

*Primary Examiner* — Sangeeta Bahl
(74) *Attorney, Agent, or Firm* — Andrew D. Fortney; Central California IP Group, P.C.

(57) ABSTRACT

The invention is directed to a system and method for collection, distribution and delivery of university student enrollment, progress, and degree completion data, media content, and other data to campus students, faculty, users, employees, and external stakeholders, and more particularly to an integrated distribution system and method that obtains data from multiple sources into a single database, extracts and validates relevant data from the multiple sources and removes legacy formatting and non-essential information, provides user-centric reports, and distributes graphic media from one or more filtered special-purpose user-centric reports that is published to user display devices.

19 Claims, 45 Drawing Sheets

(56) References Cited

U.S. PATENT DOCUMENTS

2014/0205987 A1* 7/2014 Habermehl ............ G09B 7/02
434/350
2017/0140487 A1* 5/2017 Caines ............... G06Q 50/2053

OTHER PUBLICATIONS

Moore and Shulock; Student progress towards degree completion (Year: 2009).*
IT revolution learning etool for assessing undergraduate student learning (Year: 2011).*
Hulwan, "Geofencing application and student tracker" (Year: 2018).*
Moore, "ihelp student progress towards degree completion" (Year: 2009).*

* cited by examiner

FIGURE 4

400 — Graduation Initiative 2025– Are Students Advancing Quickly Enough to Meet Our Grad Goals?

Contributing Factors that may impact graduation rates (User Selections) 401

Campus List 402

Student Type List 403
(Freshmen or Transfers)

Input Variables: 404
- *Cohort*: year, term, campus, student level, student type, SSN, major
- *Course*: section, grades, units, abbreviation, number
- *Graduation*: year, term, campus For all calculations, group within campus, student type, and cohort in year 1

405     % with non-passing grades (1ˢᵗ year)

$$\frac{Count\ of\ Students\ Receiving\ DFW\ Grades}{Count\ of\ Students\ Enrolled} \times 100$$

where DFW grades: "D+" "D" "D-" "F" "NC" – no credit, "IC" – incomplete, "WU" – unauthorized withdrawal

406     % repeating courses (1st year)

$$\frac{Count\ of\ Students\ Repeating\ at\ least\ one\ course\ in\ their\ first\ year}{Count\ of\ Students\ Enrolled} \times 100$$

407     % switching majors (1st year)

$$\frac{Count\ of\ Students\ changing\ their\ major\ in\ their\ first\ year}{Count\ of\ Students\ Enrolled} \times 100$$

408     % switching colleges (1st year)

$$\frac{Count\ of\ Students\ changing\ to\ a\ major\ that\ falls\ under\ a\ different\ college\ in\ their\ first\ year}{Count\ of\ Students\ Enrolled} \times 100$$

409     % taking a full-load (1st year)

$$\frac{Count\ of\ Students\ taking\ a\ full-unit\ load\ in\ their\ first\ year}{Count\ of\ Students\ Enrolled} \times 100$$

where full-unit load means attempted 30 semester units or 45 quarter units in their first year.

410     Average unit load (1st year)

$$\frac{Total\ number\ of\ units\ attempted\ during\ the\ students\ first\ year}{Count\ of\ Students\ Enrolled} \times 100$$

FIGURE 6

600 ⟶ Graduation Initiative 2025– Which Courses Have the Lowest Passage Rates?

For all calculations, group by campus, college, cohort year 601 (User Selections)
- Campus List — 601
- College List — 602
- Year - Term — 603

604
Input variables: for each student taking course
- *Grade Files:* Course abbreviation, course number, course section, grade, For all undergraduate courses each year-term, calculate the following by college:

605
Impact
Count of students receiving a DFW grade in a course

606
Course Enrollment
Count of students enrolled in a course

607
Group Courses by Division Type:
- General Education, Lower Division, Upper Division, Sub-baccalaureate courses determined by course number (varies by campus)

608
% of DFW grades
For each unique course $$\frac{Impact}{Count\ of\ Students\ Enrolled\ in\ the\ Course} \times 100$$

where DFW grades: "D+" "D" "D-" "F" "NC" – no credit, "IC" – incomplete, "WU" – unauthorized withdrawal

609
Top 10 courses with the largest impact (filtered by DFW Rate > 15% and enrollment >= 10) are highlighted

610
All courses for each year-term displayed by:
- X- % of DFW Grades
- Y- Enrollment
- Bubble size: Impact CSU By The Numbers – How do Student Backgrounds Impact Time to Degree?

CSU By the numbers:
How do we compare to our CSU peers?

CSU By the numbers:
Who are our top HS and CC Feeder Schools?

Equity Dashboard:
What Does the Equity Gap Look Like on My Campus?

Equity Dashboard:
Do students achieve junior status at equitable rates?

Faculty Dashboard
Who Are My Students?

Faculty Dashboard
How Quickly Do They Progress?

Faculty Dashboard
What Paths Do They Follow?

Faculty Dashboard
In Which Courses Do They Struggle?

Faculty Dashboard
Which Courses Have the Largest GPA Equity Gaps?

California Community College Dashboard

FIG. 43

| | | |
|---|---|---|
| Progress towards graduation (Fig. 2) | Student | |
| Student-level based prediction module (Fig. 3) | Student | |
| Contributing Factors module by cohort year (Fig.4) | Student | |
| Departing students academics, bkgrd (Fig. 5) | Student | |
| Full units load module (Fig. 12) | Student | STUDENT |
| Student background vs. time to degree (Fig. 13) | Student | |
| Academic behaviors module (Fig. 18) | Student | |
| Junior status achievement module (Fig. 19) | Student | |
| Post-junior status module (Fig. 20) | Student | |
| Course passage rates module (Fig. 6) | Campus | |
| Course and GPA equity gap module (Fig. 7) | Campus | |
| Post-graduate enrollment module (Fig. 8) | Campus | |
| Student populations module (Fig. 9) | Campus | |
| Historical graduation rate module (Fig. 10) | Campus | CAMPUS |
| Equity gaps module (Fig. 11) | Campus | |
| H.S. and Comm'y College feeder schools (Fig. 16) | Campus | |
| Equity gap by campus module (Fig. 17) | Campus | |
| GPA equity gap by course module (Fig. 21) | Campus | |
| Faculty view of student-type module (Fig. 22) | Faculty | |
| Faculty-view progress rate module (Fig. 23) | Faculty | |
| Faculty-view majors view module (Fig. 24) | Faculty | |
| Faculty view course struggle module (Fig. 25) | Faculty | |
| Faculty-view GPA equity gap module (Fig. 26) | Faculty | FACULTY |
| Faculty-view junior status achievement (Fig. 27) | Faculty | |
| Faculty-view academic outcomes module (Fig. 28) | Faculty | |
| Faculty-view student departure module (Fig. 29) | Faculty | |
| Faculty-view post-graduate enrollment (Fig. 30) | Faculty | |
| State-wide peer comparison module (Fig. 14) | External | |
| National peer comparison module (Fig. 15) | External | |
| In-state high school module (Fig. 31) | External | EXTERNAL |
| In-state church partners module (Fig. 32) | External | |
| In-state community college module (Fig. 33); | External | |

FIGURE 45

Method for displaying student degree completion information on a mobile user devices or desktop/laptop user devices, (i) generating a specific data set from a combination of multiple variables taken from the relational database, (ii) interrogating the data set and selecting one or more transformational mathematical models, and running the model on the data set, (iii) generating multiple variations of display outputs, including graphs, moving images, charts, (iv) evaluating the display outputs against a specific audience, e.g. student, faculty, admin, external, for which the display is intended, and the assessed strength of the match between the display output and the specific audience is output as a narrative strength measure, (v) identifying when a specific display output is a strong match for the specific audience, saving the specific data set and the mathematical model that generated the strong match with the target audience, (vi) saving the identified specific display output, specific data set, and mathematical model as a final display set, and adding the final display set to a system containing a collection of final display sets for generating a website

METHOD AND SYSTEM FOR DISTRIBUTION OF UNIVERSITY STUDENT DEGREE COMPLETION DATA

CROSS-REFERENCE TO RELATED APPLICATIONS

Provided by Application Data Sheet per USPTO rules.

STATEMENT REGARDING FEDERALLY SPONSORED R&D

Provided by Application Data Sheet per with USPTO rules.

NAMES OF PARTIES TO JOINT RESEARCH AGREEMENT

Provided by Application Data Sheet per with USPTO rules.

STATEMENT RE PRIOR DISCLOSURES

Provided by Application Data Sheet per USPTO rules.

BACKGROUND OF THE INVENTION

Field of the Invention

The present invention relates generally to a system and method for collection, distribution and delivery of university student enrollment, progress, and degree completion data, media content, and other data to campus students, faculty, users, employees, and external stakeholders, and more particularly to an integrated distribution system and method that obtains data from multiple sources into a single database, extracts and validates relevant data from the multiple sources and removes legacy formatting and non-essential information, provides user-centric reports, and distributes graphic media from one or more filtered special-purpose user-centric reports that is published to user display devices.

Description of the Related Art

Universities have had a problem with equity gaps for under-represented minorities (URM-EG) which are the gaps that exist between students who identify as African American, American-Indian or Latino and their peer, and equity gaps for Pell-nonPell recipients (PELL-EG) which are the gaps that exist between Pell recipients and their peers.

A modern University will have multiple separate systems for collecting and displaying student information, ethnicity information, financial (PELL) information, degree requirements information, course information, admissions information, faculty information, student rate of degree completion information, University-peer group comparative information, student support information and student tracking information. Each of these systems generates their own data, in their own format, stored and retrieved from their own databases, updated on their own schedule, and displayed to their specific user population via dedicated displays.

It has not been not possible within existing university systems to, from a single network operation center (NOC), change the customized graphic feed at a specific display, e.g. student registered display, faculty member registered display, administrator registered display, and system admin display.

It is also has not been possible at existing universities for a user to subscribe to a degree completion application on his or her mobile device that provides user specific information, such as attending orientation events, making use of support staff, identifying degree requirements, entering personal work or other obligation schedules, entering day and time preferences for course, entering faculty preferences, entering budget or financial requirements, entering scheduling and calendars of related persons, etc., and using their smartphone IP address to send accurate, periodically-provided reminders or alerts.

Accordingly, there is strong demand for accurate, timely content by users of university degree completion facilities.

There is currently no available single unified interface as claimed to achieve all or most of these functions. The prior art does not teach a network operations center (NOC) computer that distributes a stream of constantly updated data to a plurality of data distribution nodes for periodic download, as taught by and claimed for, this invention.

There is a long-felt need for university and campus operators to be able to receive data sources from multiple sources, scrub, code, and validate the data, and then redistribute selected or filter information to degree completion graphic displays and user equipment.

BRIEF SUMMARY OF THE INVENTION

Accordingly, to address unmet needs in the art, there is provided in one non-limiting preferred embodiment, a system for providing reports on student progress towards completion of an undergraduate degree, comprising:

(i) at least one database for storing a plurality of selected university data, wherein the selected university data is raw data obtained from multiple sources, wherein the raw data is scrubbed, validated, and stored as selected university data into a relational database;

(ii) wherein the raw data is selected from the group consisting of: university student enrollment data, university student progress data, university student degree completion data, university campus data, university student biographical data, university course data, university faculty data, Statewide university student statistics data, National university student statistics data, university student test data, university student financial data, university student high school and/or community college data, university student enrollment data, university student attendance data, university student retention data, and combined forms of group university student data;

(iii) wherein the selected university data comprises variables selected from the group consisting of: Campus Assigned Student ID, Campus Code, Campus GPA, Citizenship Code, Concentration Code, University Race/Ethnicity Reporting Category, Cumulative Campus Pre-Collegiate Units Attempted, Cumulative Campus State-Supported Units Attempted, Cumulative Campus Units Earned, Degree Level Code, Degree Objective Code, Employee Identification Number, English Proficiency Status, Enrollment Status, Entry Level Mathematics Proficiency Status, Ethnic Code (Old), Father's Parent/Guardian #2 Education Code, Federal Pell Grant Award, High School GPA, Hispanic/Latino Ethnic Category, Hispanic/Latino Status, Institution Origin Code, IPEDS Race/Ethnicity Reporting Category, Major Code, Mathematics/Quantitative Reasoning Placement Status, Matriculation Period, Matriculation Type, Mother's Parent/Guardian #1 Education Code, Social Security Number, Term Code, Term Units Attempted—Lower Division, Term Units Attempted—Pre-Collegiate, Term Units Attempted—Upper Division, Total GPA, Total Units Earned, Transfer Units Earned, Year, EMPLID, CAMPUS ID, Course Abbreviation, Course Number, Course Suffix, Course Section, Course Section Credit Units, Grade, Course Title, Course Level, EMPLID_Neutralized, Course Section Credit Units—Modified, Campus_ID, Cohort_Group, Cohort_Type, DEG_Campus, DEG_Concentration_Code, DEG_Term, DEG_TotGPA, DEG_TotUnitsEarned, DEG_TransGPA, DEG_TransUnitsEarned, DEG_YR-TERM, DEG_Year, Deg_Major_Degree_Code, ERSX_Flag, ETHNICITY, Empl_ID, Enroll_Status, First_Gen_Status, GENDER, IPEDS_Race_Ethnicity_DERV, Maj_Opt_Conc_Emph, Major_Code, Math_QR_Placement_Status, Pell_Status, Remediated, Remediation_Status, Student_Level, Term_Units_Att_Total, URM_Status, YR1_RETENTION_SAMECAMPUS, YR2_RETENTION_SAMECAMPUS, YR3_RETENTION_SAMECAMPUS, YR4_RETENTION_SAMECAMPUS, YR5_RETENTION_SAMECAMPUS, YR6_RETENTION_SAMECAMPUS, YR7_RETENTION_SAMECAMPUS, YRTERM, campus, cohort, Idunits, major, precollunits, studentlevel, totunits, udunits, Requester Return Field, College Name, 2-year/4-year, Enrollment Begin, Enrollment End, Graduated?, Graduation Date;

(iv) a plurality of dashboard displays, wherein the selected university data is used to generate the plurality of dashboard displays, wherein the dashboard displays comprise a graduation progress dashboard, a faculty dashboard, a campus tracking dashboard, and an equity gaps dashboard, (v) a plurality of modules, wherein each module comprises program instructions for retrieving module-specific data selected from the relational database of selected university data, performing calculations and/or functions using the module-specific data, and transmitting instructions to a remote display device for graphically displaying a module-specific graph, chart, or selection menu, wherein the dashboard displays are generated using one or more of the module-specific graph, chart or selection menu, and wherein each module is selected from the group consisting of: a Colorimetric display module of progress towards graduation (FIG. 2), a student-level based prediction module for progress towards graduation (FIG. 3), a Contributing Factors module which comprises variables relating to cohort year, term, campus, level, type, and identifier (SSN/EIN) (FIG. 4), a departing students academic and background characteristics module (FIG. 5), a course passage rates module (FIG. 6), a course and GPA equity gap module (FIG. 7), a post-graduate enrollment module (FIG. 8), a student populations module (FIG. 9), a historical graduation rate module (FIG. 10), an equity gaps module (FIG. 11), a full units load module (FIG. 12), a student background vs. time to degree module (FIG. 13), a State-wide peer comparison module (FIG. 14), a National peer comparison module (FIG. 15), a high school and community college feeder schools module (FIG. 16), an equity gap by campus module (FIG. 17), an academic behaviors module (FIG. 18), a junior status achievement module (FIG. 19), a post-junior status module (FIG. 20), a GPA equity gap by course module (FIG. 21), a faculty view of student-type module (FIG. 22), a faculty-view progress rate module (FIG. 23), a faculty-view majors view module, (FIG. 24), a faculty view course struggle module (FIG. 25), a faculty-view GPA equity gap module (FIG. 26), a faculty-view junior status achievement module (FIG. 27), a faculty-view academic outcomes module (FIG. 28), a faculty-view student departure module (FIG. 29), a faculty-view post-graduate enrollment module (FIG. 30), an in-state high school module (FIG. 31), an in-state church partners module (FIG. 32), and an in-state community college module (FIG. 33);

wherein said graduation progress dashboard supports administrators, faculty and staff in tracking their campus progress toward meeting their graduation progress goals, and includes linear trajectories for goals and provides an assessment of progress made to date, wherein said faculty dashboard supports faculty in gaining a better understanding of the backgrounds and academic patterns of students, and includes analyses of student progress to degree, identification of low-success courses and courses with large equity gaps, and analyses of students who leave without earning a degree, wherein said campus dashboard provides backgrounds and academic patterns of currently enrolled and recently graduated students, including an analysis of how university student populations are changing, how many students are taking a full-load of classes (15 units per term) and how university campus graduation rates compare to national peers, and wherein said equity gaps dashboard highlights inequitable outcomes in short- and long-term student outcomes while identifying actions that will help close equity gaps on campuses and systemwide, and includes predictive models and visualizations that assist the campus to provide students with equitable opportunities to succeed.

In another non-limiting preferred embodiment, there is provided a system and method for collection, distribution and delivery of to campus students, faculty, users, employees, and external stakeholders, and more particularly to an integrated distribution system and method that obtains, provides user-centric reports, and distributes graphic media from one or more filtered special-purpose user-centric reports that is published to user display devices.

In another non-limiting preferred embodiment of the present invention, there is provided a method for providing reports on student progress towards completion of an undergraduate degree, comprising the steps:

(i) providing at least one database for storing a plurality of selected university data, wherein the selected university data is raw data obtained from multiple sources, wherein the raw data is scrubbed, validated, and stored as selected university data into a relational database;

(ii) wherein the raw data is selected from the group consisting of: university student enrollment data, university student progress data, university student degree completion data, university campus data, university student biographical data, university course data, university faculty data, State-wide university student statistics data, National university student statistics data, university student test data, university student financial data, university student high school and/or community college data, university student enrollment data, university student attendance data, university student retention data, and combined forms of group university student data;

(iii) wherein the selected university data comprises variables selected from the group consisting of: Campus Assigned Student ID, Campus Code, Campus GPA, Citizenship Code, Concentration Code, University Race/Ethnicity Reporting Category, Cumulative Campus Pre-Collegiate Units Attempted, Cumulative Campus State-Supported Units Attempted, Cumulative Campus Units Earned, Degree Level Code, Degree Objective Code, Employee Identification Number, English Proficiency Status, Enrollment Status, Entry Level Mathematics Proficiency Status, Ethnic Code (Old), Father's Parent/Guardian #2 Education Code, Federal Pell Grant Award, High School GPA, Hispanic/Latino Ethnic Category, Hispanic/Latino Status, Institution Origin Code, IPEDS Race/Ethnicity Reporting Category, Major Code, Mathematics/Quantitative Reasoning Placement Status, Matriculation Period, Matriculation Type, Mother's Parent/Guardian #1 Education Code, Social Security Number, Term Code, Term Units Attempted—Lower Division, Term Units Attempted—Pre-Collegiate, Term Units Attempted—Upper Division, Total GPA, Total Units Earned, Transfer Units Earned, Year, EMPLID, CAMPUS ID, Course Abbreviation, Course Number, Course Suffix, Course Section, Course Section Credit Units, Grade, Course Title, Course Level, EMPLID_Neutralized, Course Section Credit Units—Modified, Campus_ID, Cohort_Group, Cohort_Type, DEG_Campus, DEG_Concentration_Code, DEG_Term, DEG_TotGPA, DEG_TotUnitsEarned, DEG_TransGPA, DEG_TransUnitsEarned, DEG_YR-TERM, DEG_Year, Deg_Major_Degree_Code, ERSX_Flag, ETHNICITY, Empl_ID, Enroll_Status, First_Gen_Status, GENDER, IPEDS_Race_ Ethnicity_DERV, Maj_Opt_Conc_Emph, Major_Code, Math_QR_Placement_Status, Pell_Status, Remediated, Remediation_Status, Student_Level, Term_Units_Att_Total, URM_Status, YR1_RETENTION_SAMECAMPUS, YR2_RETENTION_SAMECAMPUS, YR3_RETENTION_SAMECAMPUS, YR4_RETENTION_SAMECAMPUS, YR5_RETENTION_SAMECAMPUS, YR6_RETENTION_SAMECAMPUS, YR7_RETENTION_SAMECAMPUS, YRTERM, campus, cohort, Idunits, major, precollunits, studentlevel, totunits, udunits, Requester Return Field, College Name, 2-year/4-year, Enrollment Begin, Enrollment End, Graduated?, Graduation Date;

(iv) generating a plurality of dashboard displays, wherein the selected university data is used to generate the plurality of dashboard displays, wherein the dashboard displays comprise a graduation progress dashboard, a faculty dashboard, a campus tracking dashboard, and an equity gaps dashboard, (v) providing a plurality of modules, wherein each module comprises program instructions for retrieving module-specific data selected from the relational database of selected university data, performing calculations and/or functions using the module-specific data, and transmitting instructions to a remote display device for graphically displaying a module-specific graph, chart, or selection menu, wherein the dashboard displays are generated using one or more of the module-specific graph, chart or selection menu, and wherein each module is selected from the group consisting of: a Colorimetric display module of progress towards graduation (FIG. 2), a student-level based prediction module for progress towards graduation (FIG. 3), a Contributing Factors module which comprises variables relating to cohort year, term, campus, level, type, and identifier (SSN/EIN) (FIG. 4), a departing students academic and background characteristics module (FIG. 5), a course passage rates module (FIG. 6), a course and GPA equity gap module (FIG. 7), a post-graduate enrollment module (FIG. 8), a student populations module (FIG. 9), a historical graduation rate module (FIG. 10), an equity gaps module (FIG. 11), a full units load module (FIG. 12), a student background vs. time to degree module (FIG. 13), a State-wide peer comparison module (FIG. 14), a National peer comparison module (FIG. 15), a high school and community college feeder schools module (FIG. 16), an equity gap by campus module (FIG. 17), an academic behaviors module (FIG. 18), a junior status achievement module (FIG. 19), a post-junior status module (FIG. 20), a GPA equity gap by course module (FIG. 21), a faculty view of student-type module (FIG. 22), a faculty-view progress rate module (FIG. 23), a faculty-view majors view module, (FIG. 24), a faculty view course struggle module (FIG. 25), a faculty-view GPA equity gap module (FIG. 26), a faculty-view junior status achievement module (FIG. 27), a faculty-view academic outcomes module (FIG. 28), a faculty-view student departure module (FIG. 29), a faculty-view post-graduate enrollment module (FIG. 30), an in-state high school module (FIG. 31), an in-state church partners module (FIG. 32), and an in-state community college module (FIG. 33).

In another non-limiting preferred embodiment of the present invention, there is provided a method of providing media content to a plurality of displays in a university, comprising:

providing a network operation center (NOC) that includes a computer with a processor linked to computer memory, wherein the network operation center (NOC) is configured with computer programming instructions to monitor and control a centralized data collection node and a data decoupling module, receiving raw data from multiple university systems into the centralized data collection node, wherein the raw data is selected from the group consisting of: university student enrollment data, university student progress data, university student degree completion data, university campus data, university student biographical data, university course data, university faculty data, State-wide university student statistics data, National university student statistics data, university student test data, university student financial data, university student high school and/or community college data, university student enrollment data, university student attendance data, university student retention data, and combined forms of group university student data;

Converting the raw data into selected university data, wherein converting comprising the steps of mapping received raw data, extracting the mapped data, coding the extracted mapped data and validating the coded extracted mapped data to obtain selected university data using computer program instructions in the data decoupling module, and storing the selected university data in a relational database using computer program instructions in the data decoupling module, wherein the network operation center (NOC) is configured with computer programming instructions to manage the relational database, transmitting selected university data from the relational database to a plurality of remote display devices, wherein the network operation center (NOC) is configured with computer programming instructions to transmit the selected university data to the plurality of display devices, wherein the selected university data comprises variables selected from the group consisting of: Campus Assigned Student ID, Campus Code, Campus GPA, Citizenship Code, Concentration Code, University Race/Ethnicity Reporting Category, Cumulative Campus Pre-Collegiate Units Attempted, Cumulative Campus State-Supported Units Attempted, Cumulative Campus Units Earned, Degree Level Code, Degree Objective Code, Employee Identification Number, English Proficiency Status, Enrollment Status, Entry Level Mathematics Proficiency Status, Ethnic Code (Old), Father's Parent/Guardian #2 Education Code, Federal Pell Grant Award, High School GPA, Hispanic/Latino Ethnic Category, Hispanic/Latino Status, Institution Origin Code, IPEDS Race/Ethnicity Reporting Category, Major Code, Mathematics/Quantitative Reasoning Placement Status, Matriculation Period, Matriculation Type, Mother's Parent/Guardian #1 Education Code, Social Security Number, Term Code, Term Units Attempted—Lower Division, Term Units Attempted—Pre-Collegiate, Term Units Attempted—Upper Division, Total GPA, Total Units Earned, Transfer Units Earned, Year, EMPLID, CAMPUS ID, Course Abbreviation, Course Number, Course Suffix, Course Section, Course Section Credit Units, Grade, Course Title, Course Level, EMPLID_Neutralized, Course Section Credit Units—Modified, Campus_ID, Cohort_Group, Cohort_Type, DEG_Campus, DEG_Concentration_Code, DEG_Term, DEG_TotGPA, DEG_TotUnitsEarned, DEG_TransGPA, DEG_TransUnitsEarned, DEG_YR-TERM, DEG_Year, Deg_Major_Degree_Code, ERSX_Flag, ETHNICITY, Empl_ID, Enroll_Status, First_Gen_Status, GENDER, IPEDS_Race_ Ethnicity_DERV, Maj_Opt_Conc_Emph, Major_Code, Math_QR_Placement_Status, Pell_Status, Remediated, Remediation_Status, Student_Level, Term_Units_Att_Total, URM_Status, YR1_RETENTION_SAMECAMPUS, YR2_RETENTION_SAMECAMPUS, YR3_RETENTION_SAMECAMPUS, YR4_RETENTION_SAMECAMPUS, YR5_RETENTION_SAMECAMPUS, YR6_RETENTION_SAMECAMPUS, YR7_RETENTION_SAMECAMPUS, YRTERM, campus, cohort, Idunits, major, precollunits, studentlevel, totunits, udunits, Requester Return Field, College Name, 2-year/4-year, Enrollment Begin, Enrollment End, Graduated?, Graduation Date;

(iv) generating a plurality of dashboard displays,
wherein the selected university data is used to generate the plurality of dashboard displays,
wherein the dashboard displays comprise a graduation progress dashboard, a faculty dashboard, a campus tracking dashboard, and an equity gaps dashboard, (v) providing a plurality of modules,
wherein each module comprises program instructions for retrieving module-specific data selected from the relational database of selected university data, performing calculations and/or functions using the module-specific data, and transmitting instructions to a remote display device for graphically displaying a module-specific graph, chart, or selection menu,
wherein the dashboard displays are generated using one or more of the module-specific graph, chart or selection menu, and wherein each module is selected from the group consisting of: a Colorimetric display module of progress towards graduation (FIG. 2), a student-level based prediction module for progress towards graduation (FIG. 3), a Contributing Factors module which comprises variables relating to cohort year, term, campus, level, type, and identifier (SSN/EIN) (FIG. 4), a departing students academic and background characteristics module (FIG. 5), a course passage rates module (FIG. 6), a course and GPA equity gap module (FIG. 7), a post-graduate enrollment module (FIG. 8), a student populations module (FIG. 9), a historical graduation rate module (FIG. 10), an equity gaps module (FIG. 11), a full units load module (FIG. 12), a student background vs. time to degree module (FIG. 13), a State-wide peer comparison module (FIG. 14), a National peer comparison module (FIG. 15), a high school and community college feeder schools module (FIG. 16), an equity gap by campus module (FIG. 17), an academic behaviors module (FIG. 18), a junior status achievement module (FIG. 19), a post-junior status module (FIG. 20), a GPA equity gap by course module (FIG. 21), a faculty view of student-type module (FIG. 22), a faculty-view progress rate module (FIG. 23), a faculty-view majors view module, (FIG. 24), a faculty view course struggle module (FIG. 25), a faculty-view GPA equity gap module (FIG. 26), a faculty-view junior status achievement module (FIG. 27), a faculty-view academic outcomes module (FIG. 28), a faculty-view student departure module (FIG. 29), a faculty-view post-graduate enrollment module (FIG. 30), an in-state high school module (FIG. 31), an in-state church partners module (FIG. 32), and an in-state community college module (FIG. 33).

monitoring and controlling the data sources, relational database management, data decoupling and output selection, device detection feedback, output data source distribution to a display device, and the updating of output data sources for the plurality of displays in a university, wherein the network operation center (NOC) is configured with computer programming instructions to monitor and control data sources, relational database management, data decoupling and output selection, device detection feedback, output data source distribution to a display device, and the updating of output data sources for the plurality of displays in a university, and, providing a selected university data sources user interface to a display connected to the centralized data collection node, said interface comprising:

a data sources region configured with computer programming instructions to display links to selected university data;

a system management region configured with computer programming instructions to display system management tools for centralized management and distribution of selected university data, at least one additional region configured with computer programming instructions to display information relating to the at least one additional region, wherein the at least one additional region selected from a manage relational database region, a manage remote display region, a manage customer/user mobile devices region, an archive region, a manage network region, a generate reports region, a communication region, an alert region, and an system parameters region.

In another non-limiting preferred embodiment of the present invention, there is provided a method wherein transmitting selected university data from the relational database includes the steps of detecting a type of display of the plurality of displays, wherein the type of display comprises one or more devices selected from the group consisting of a smartphone, a tablet, a laptop, and a desktop computer, and using an application programming interface (API) specific for each type of device to receive device-modified special purpose output selected university data.

In another preferred embodiment of the present invention, there is provided a method, wherein the selected university data is received according to the following steps:

providing a web server connected to the Internet, wherein the web server is programmed to access the centralized data collection node, wherein the web server has a data storage device, a connection to the Internet to communicate with the university, and a messaging gateway coupled to a network to communicate with the centralized data collection node;

providing at least one remote access module that is connected to the centralized data collection node, the remote access module having a digital interface coupled to the centralized data collection node and a communications module to communicate with the web server via the network, and the messaging gateway; and providing an internet device is connected to the internet to allow the university to communicate with the web server, wherein the university can remotely access and control the centralized data collection node via the web server.

In another non-limiting preferred embodiment of the present invention, there is provided a method, wherein the selected university data is directly received from a university and includes data directly from the university and formatted as received from the university or a proxy.

In another non-limiting preferred embodiment of the present invention, there is provided a method, comprising providing remote access to the network operation center (NOC) status and settings of a remote multi-user enrollment, progress, and degree completion display system via the Internet, comprising the steps of:

providing a web server connected to the Internet, wherein the web server is programmed to access the network operation center (NOC) remote multi-user enrollment, progress, and degree completion display system, wherein the web server has a data storage device, a connection to the Internet to communicate with the university, and a messaging gateway coupled to a network to communicate with the network operation center (NOC) remote multi-user enrollment, progress, and degree completion display system;

providing at least one remote access module that is connected to the network operation center (NOC) remote multi-user enrollment, progress, and degree completion display system, the remote access module having a digital interface coupled to the network operation center (NOC) remote multi-user enrollment, progress, and degree completion display system and a communications module to communicate with the web server via the network, and the messaging gateway; and providing an internet device is connected to the internet to allow the university to communicate with the web server, wherein the university can remotely access and control the network operation center (NOC) remote multi-user enrollment, progress, and degree completion display system via the web server.

In another non-limiting preferred embodiment of the present invention, there is provided a method of providing media content to a smartphone of a user in a university, comprising:

providing a network operation center (NOC) that includes a computer with a processor linked to computer memory, wherein the network operation center (NOC) is configured with computer programming instructions to monitor and control a centralized data collection node and a data decoupling module, receiving raw data from multiple university systems into the centralized data collection node, wherein the raw data is selected from the group consisting of: university student enrollment data, university student progress data, university student degree completion data, university campus data, university student biographical data, university course data, university faculty data, State-wide university student statistics data, National university student statistics data, university student test data, university student financial data, university student high school and/or community college data, university student enrollment data, university student attendance data, university student retention data, and combined forms of group university student data;

Converting the raw data into selected university data, wherein converting comprising the steps of mapping received raw data, extracting the mapped data, coding the extracted mapped data and validating the coded extracted mapped data to obtain selected university data using computer program instructions in the data decoupling module, and storing the selected university data in a relational database using computer program instructions in the data decoupling module, wherein the network operation center (NOC) is configured with computer programming instructions to manage the relational database, wherein the selected university data comprises variables selected from the group consisting of: Campus Assigned Student ID, Campus Code, Campus GPA, Citizenship Code, Concentration Code, University Race/Ethnicity Reporting Category, Cumulative Campus Pre-Collegiate Units Attempted, Cumulative Campus State-Supported Units Attempted, Cumulative Campus Units Earned, Degree Level Code, Degree Objective Code, Employee Identification Number, English Proficiency Status, Enrollment Status, Entry Level Mathematics Proficiency Status, Ethnic Code (Old), Father's Parent/Guardian #2 Education Code, Federal Pell Grant Award, High School GPA, Hispanic/Latino Ethnic Category, Hispanic/Latino Status, Institution Origin Code, IPEDS Race/Ethnicity Reporting Category, Major Code, Mathematics/Quantitative Reasoning Placement Status, Matriculation Period, Matriculation Type, Mother's Parent/Guardian #1 Education Code, Social Security Number, Term Code, Term Units Attempted—Lower Division, Term Units Attempted—Pre-Collegiate, Term Units Attempted—Upper Division, Total GPA, Total Units Earned, Transfer Units Earned, Year, EMPLID, CAMPUS ID, Course Abbreviation, Course Number, Course Suffix, Course Section, Course Section Credit Units, Grade, Course Title, Course Level, EMPLID_Neutralized, Course Section Credit Units—Modified, Campus_ID, Cohort_Group, Cohort_Type, DEG_Campus, DEG_Concentration_Code, DEG_Term, DEG_TotGPA, DEG_TotUnitsEarned, DEG_TransGPA, DEG_TransUnitsEarned, DEG_YRTERM, DEG_Year, Deg_Major_Degree_Code, ERSX_Flag, ETHNICITY, Empl_ID, Enroll_Status, First_Gen_Status, GENDER, IPEDS_Race_Ethnicity_DERV, Maj_Opt_Conc_Emph, Major_Code, Math_QR_Placement_Status, Pell_Status, Remediated, Remediation_Status, Student_Level, Term_Units_Att_Total, URM_Status, YR1_RETENTION_SAMECAMPUS, YR2_RETENTION_SAMECAMPUS, YR3_RETENTION_SAMECAMPUS, YR4_RETENTION_SAMECAMPUS, YR5_RETENTION_SAMECAMPUS, YR6_RETENTION_SAMECAMPUS, YR7_RETENTION_SAMECAMPUS, YRTERM, campus, cohort, Idunits, major, precollunits, studentlevel, totunits, udunits, Requester Return Field, College Name, 2-year/4-year, Enrollment Begin, Enrollment End, Graduated?, Graduation Date;

(iv) generating a plurality of dashboard displays,
wherein the selected university data is used to generate the plurality of dashboard displays,
wherein the dashboard displays comprise a graduation progress dashboard, a faculty dashboard, a campus tracking dashboard, and an equity gaps dashboard,
(v) providing a plurality of modules,
wherein each module comprises program instructions for retrieving module-specific data selected from the relational database of selected university data, performing calculations and/or functions using the module-specific data, and transmitting instructions to a remote display device for graphically displaying a module-specific graph, chart, or selection menu,
wherein the dashboard displays are generated using one or more of the module-specific graph, chart or selection menu, and wherein each module is selected from the group consisting of: a Colorimetric display module of progress towards graduation (FIG. 2), a student-level based prediction module for progress towards graduation (FIG. 3), a Contributing Factors module which comprises variables relating to cohort year, term, campus, level, type, and identifier (SSN/EIN) (FIG. 4), a departing students academic and background characteristics module (FIG. 5), a course passage rates module (FIG. 6), a course and GPA equity gap module (FIG. 7), a post-graduate enrollment module (FIG. 8), a student populations module (FIG. 9), a historical graduation rate module (FIG. 10), an equity gaps module (FIG. 11), a full units load module (FIG. 12), a student background vs. time to degree module (FIG. 13), a Statewide peer comparison module (FIG. 14), a National peer comparison module (FIG. 15), a high school and community college feeder schools module (FIG. 16), an equity gap by campus module (FIG. 17), an academic behaviors module (FIG. 18), a junior status achievement module (FIG. 19), a post-junior status module (FIG. 20), a GPA equity gap by course module (FIG. 21), a faculty view of student-type module (FIG. 22), a faculty-view progress rate module (FIG. 23), a faculty-view majors view module, (FIG. 24), a faculty view course struggle module (FIG. 25), a faculty-view GPA equity gap module (FIG. 26), a faculty-view junior status achievement module (FIG. 27), a faculty-view academic outcomes module (FIG. 28), a faculty-view student departure module (FIG. 29), a faculty-view post-graduate enrollment module (FIG. 30), an in-state high school module (FIG. 31), an in-state church partners module (FIG. 32), and an in-state community college module (FIG. 33);
registering a user Smart Phone device with the network operation center (NOC), where the user Smart Phone device has a university mobile application installed thereon, the university mobile application contains user specific travel data, the user Smart Phone device includes a geolocating function selected from one or more of GPS, WiFi, cellular LTE and/or LTE advanced, Bluetooth, Satellite and near-field communication (NFC),
generating a graphical enrollment, progress, and graduation completion aid by combining the user specific data with the selected university data in the relational database using computer program instructions in the network operation center (NOC) to generate re-aggregated filtered device-modified special purpose selected university data;
transmitting the graphical enrollment, progress, and graduation completion aid to the user Smart Phone device, wherein the network operation center (NOC) is configured with computer programming instructions to transmit the graphical graduation completion aid to the user Smart Phone device,
monitoring and controlling the data sources, relational database management, data decoupling and output selection, device detection feedback, output data source distribution, and updating the re-aggregated filtered device-modified special purpose output data and graphical graduation completion aid, wherein the network operation center (NOC) is configured with computer programming instructions to monitor and control data sources, relational database management, data decoupling and output selection, device detection feedback, output data source distribution, and to update the re-aggregated filtered device-modified special purpose output data and graphical enrollment, progress, and graduation completion aid, and,
providing a selected university data user interface to a display connected to the centralized data collection node, said interface comprising:
a data sources region configured with computer programming instructions to display links to periodically-provided university data sources selected from the group consisting of a university data source, and a media data source;
a system management region configured with computer programming instructions to display system management tools for centralized management and distribution of university content media,
at least one additional region configured with computer programming instructions to display information relating to the at least one additional region, wherein the at least one additional region selected from a manage relational database region, a manage remote display region, a manage customer/user mobile devices region, an emergency management region, an archive region, a manage network region, a generate reports region, a communication region, an alert region, and an system parameters region.
In another non-limiting preferred embodiment of the present invention, there is provided a method, wherein registering includes sending a notification, wherein sending is triggered by a geolocation feature in the university mobile application indicating the user is at the university, wherein the notification is selected from the group consisting of: an automated text message from the user Smart Phone device to a pre-set list of mobile numbers or emails selected by the user in the university mobile application; an arrival notification sent to the network operation center (NOC); an arrival notification sent to a university with the user.
In another non-limiting preferred embodiment of the present invention, there is provided a method, further comprising the step of sending an alert to the user Smart Phone device, wherein the alert is generated by measuring the user enrollment, progress, and graduation completion information, calculating the enrollment, progress, and graduation completion and a target, calculating a user rate of enrollment, progress, and graduation completion based on actual enrollment, progress, and graduation completion information, calculating a time to enrollment, progress, and graduation completion (TTEPGC), comparing the time to enrollment, progress, and graduation completion (TTEPGC) to target time data (TTD) for the student, generating a enrollment, progress, and graduation completion report wherein if the enrollment, progress, and graduation completion report indicates the user is not on schedule to reach the enrollment, progress, and graduation completion in a timely manner, a report is generated and sent to the network operation center (NOC), to the University, to the student, and a graphic alert is sent to notify the user they are not on schedule to graduate on time.

In another non-limiting preferred embodiment of the present invention, there is provided a method, wherein the graphic alert and notification are programmed to include one or more alerts selected from a color change to the graphic, a sound alert, and a recorded message.

In another non-limiting preferred embodiment of the present invention, there is provided a method, wherein the color change to the graphic is programmed to change in direct relation to difference in time between the calculated user enrollment, progress, and graduation completion (TTEPGC) and the target enrollment, progress, and graduation completion (TEPGCC).

In another non-limiting preferred embodiment of the present invention, there is provided a method for displaying student degree completion information on a mobile user devices or desktop/laptop user devices, comprising the steps in order:

(i) generating a specific data set from a combination of multiple variables taken from the relational database;

(ii) interrogating the data set and selecting one or more transformational mathematical models, and running the model on the data set;

(iii) generating multiple variations of display outputs, including graphs, moving images, charts;

(iv) evaluating the display outputs against a specific audience, e.g. student, faculty, admin, external, for which the display is intended, and the assessed strength of the match between the display output and the specific audience is output as a narrative strength measure;

(v) identifying when a specific display output is a strong match for the specific audience, saving the specific data set and the mathematical model that generated the strong match with the target audience; and (vi) saving the identified specific display output, specific data set, and mathematical model as a final display set, and adding the final display set to a system containing a collection of final display sets for generating a website.

BRIEF DESCRIPTION OF THE SEVERAL VIEWS OF DRAWING

FIG. 4 is a graphic flowchart illustrating a Contributing Factors module which comprises variables relating to cohort year, term, campus, level, type, and identifier (SSN).

FIG. 6 is a graphic flowchart illustrating a course passage rates module and architecture for progress towards graduation using variables of the present invention.

FIG. 43 is a graphic illustration showing how multiple available modules may be used from varying categories to provide the content menus and displays.

FIG. 45 is a graphic illustration showing a method for testing and selecting a match of mathematical models against a selected data set to generate a strong narrative measure, saving successful sets to a collection of sets in a system for displaying the sets on a website.

DETAILED DESCRIPTION OF THE INVENTION

Figure 1:
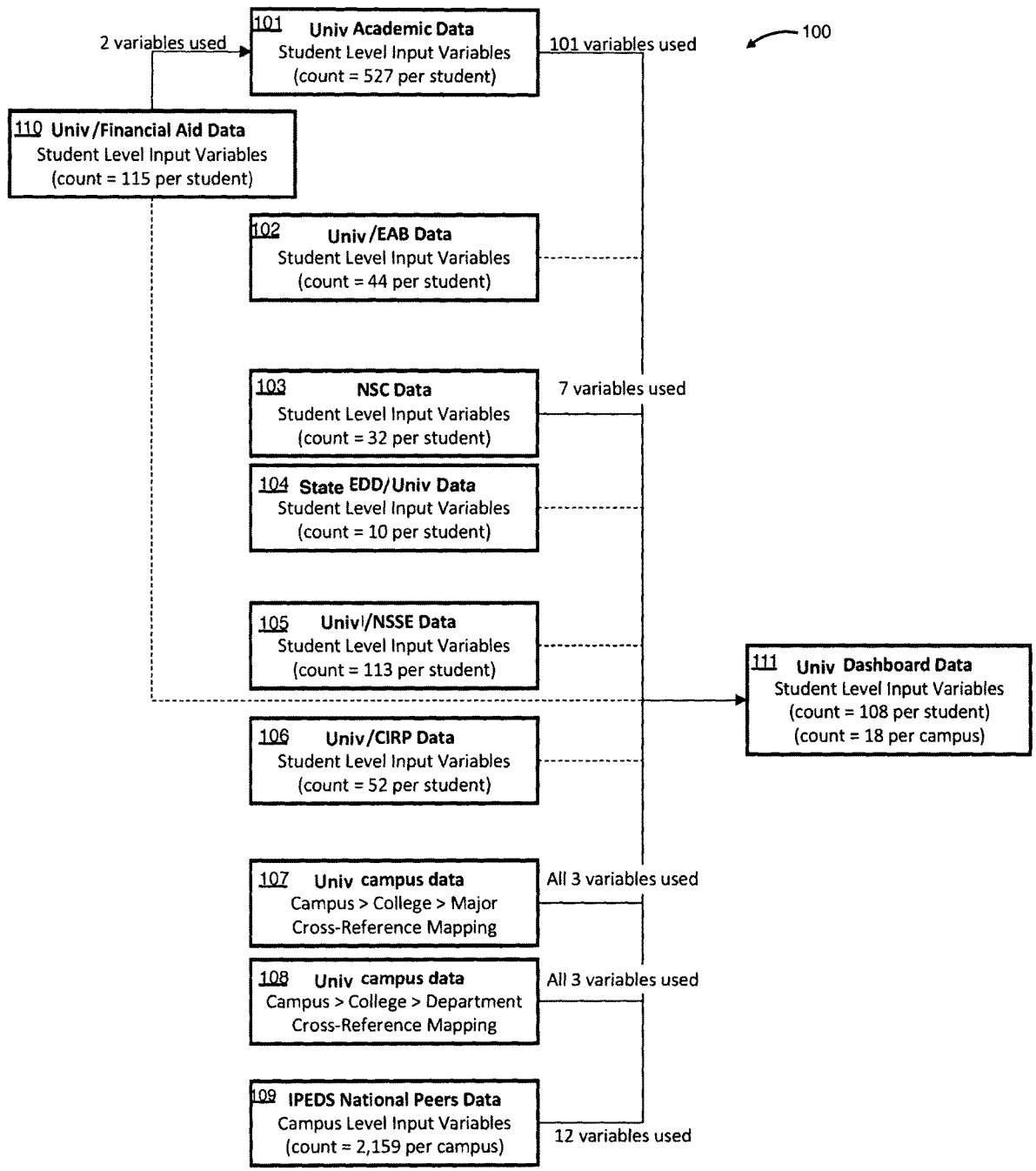
FIG. 1 is a graphic flowchart illustrating the categories of data sources, the number of variables from each source, how the variables are filtered and combined to achieve an output for the dashboard data of the present invention.

The invention is directed to a system and method for collection, distribution and delivery of university student enrollment, progress, and degree completion data, media content, and other data to campus students, faculty, users, employees, and vendors, and more particularly to an integrated distribution system and method that obtains data from multiple sources into a single database, extracts and validates relevant data from the multiple sources and removes legacy formatting and non-essential information, provides user-centric reports, and distributes graphic media from one or more filtered special-purpose user-centric reports that is published to user display devices.

Important features of the invention include:
1. Integrated Data-Discourse, module 1
2. Integrated Data-Discourse, module 2
3. Tool-tip embedded data visualizations
4. Method for identifying predictive early academic behaviors
5. Method for identifying trends over 5 year period
6. Methods for identifying key (academic) variables that distinguish those making a target from those just missing it
7. Method for identifying key (academic) indicators of 6-year graduation success via hierarchical logistic regression models and presenting the findings via a "what if" interactive tool.
8. Methods for applying Propensity Score Matching to select peer comparison group to facilitate assessment of specific programs.
9. Methods applying Structural Equation Modeling to identify students with intersecting characteristics that may require different types of support in higher ed setting.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer readable storage medium having non-transitory computer usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Python, Ruby, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal subparts. As will be understood by one skilled in the art, a range includes each individual member.

OVERVIEW

Campus-specific data sources to close equity gaps include data on inclusiveness initiatives, campus space information, programming information, and staff information relating to support of URM students and first-generation students, counselor number and type data, parents and family data, professional mentoring data, leadership data and professional opportunities data for URM students and first-generation students.

Data Processing

Aggregating data from multiple data sources requires the data from each data source is processed. Processing as defined herein includes the validation, sorting, summarization, aggregation, analysis, reporting, and classification. Validation as used herein is the process of ensuring that the periodically provided data sources and the special purpose output data sources are without errors and are accurate. Sorting as defined herein arranges periodically-provided data sources into sets and sequences. Summarization as defined herein distills periodically-provided data sources into pre-selected main categories, and can use tagging as a method to modify periodically-provided data sources and create the special purpose output data sources. Aggregation as defined herein is the combining of the tagged, distilled, sorted, and validated data into new groups. Analysis as defined herein is the combined process of collecting, organizing, analyzing, interpreting, and presenting the data. Reporting as defined herein is the creation of a summary of the processed data, the special purpose output data sources. Classification as defined herein is the separating of the periodically-provided data sources and the special purpose output data sources into various categories.

Source Formats & Transmission

As will be appreciated by a person of ordinary skill in the art, the multi-user enrollment, progress, and degree completion (MU-EPDCC) system also functions as a clearinghouse for media content received from multiple providers as digital packets of streaming content, pre-recorded content, or static content. In preferred aspects, the content is HTML, CSS, JavaScript, PNG, and JSON encoded depending on the type of content. Physical delivery of the content to displays and user equipment is contemplated to be via wired and wireless technologies, including but not limited to Ethernet, coaxial cable, twisted pair copper cabling, POTS, WiFi, Ultra-Wide Band, 3G, 4G, LTE, LTE Advanced, Bluetooth, Satellite bands, and NFC. Those of ordinary skill in the art will appreciate that various communication protocols for data transfer may be used such as TCP/IP (Transmission Control Protocol/Internet Protocol) protocols (TCP, FTP and UDP). The specific protocols chosen will depend upon the design requirements for a given system. Encryption and decryption techniques are contemplated for protecting the distribution and access of the media and data streams.

In preferred aspects, the periodically-provided data sources include XX

Database

As defined herein the collection of data in the database is managed by a database management system to allow the definition, creation, querying, updating, and administration of the database. Well known systems that support relational and post-relational models include MySQL, PostgreSQL, MS-SQL Server, Oracle, Sybase, IBM DB2, and XML db systems such as NoSQL, NewSQL.

Existing DBMSs provide various functions for managing a database and its data which can be classified into four main functions:

Data definition—Creation, modification and removal of definitions that define the organization of the data.

Update—Insertion, modification, and deletion of the actual data.

Retrieval—Providing information in a form directly usable or for further processing by other applications. The retrieved data may be made available in a form basically the same as it is stored in the database or in a new form obtained by altering or combining existing data from the database.

Administration—Registering and monitoring users, enforcing data security, monitoring performance, maintaining data integrity, dealing with concurrency control, and recovering information that has been corrupted by some event such as an unexpected system failure.

DATA SOURCES—RAW DATA

The data herein includes campus data, student biographical data, university course data, faculty data, State student statistics data, National student statistics data, Student test data, student financial data, student high school and/or community college data, student enrollment data, student attendance data, student retention data, and combined forms of group data. Data filtering and selection is an important feature of the present invention. Accordingly, there is a list of (1) the possible data available from the data sources, and (2) the data that is selected and filtered and which is used in the database to generate the student success dashboard of the present invention.

As a non-limiting example, the following is a list of the 603 possible global data variables available from the data sources used in the invention.

Global Data sources:

Academic Talent Increase/Bump
Accommodation Status
Accommodation Status Date
Added Authorization
Adjusted Eligibility Index
Adjusted High School GPA
Adjusted Transfer GPA
Admission Basis Code
Admission Status
Admission Status Date
Application Receipt Date
Artistic Talent Increase/Bump
ADT (Associate Degree For Transfers) Completion Verification Status
Birth Date
Cal Grant Award
Cal State Apply ID (CASID)
California Community College Control Number
California Promise Program Status
Campus Assigned Student ID
Campus Code
Campus GPA
Center Code
Citizenship Code
Classification of Instructional Programs (CIP) Code
College Preparatory Electives
College Preparatory English
College Preparatory Foreign Language
College Preparatory Laboratory Science
College Preparatory Mathematics
College Preparatory Mathematics and Quantitative Reasoning For Placement Considerations
College Preparatory Social Sciences
College Preparatory U.S. History and Govt.
College Preparatory Visual and Performing Arts
Competency Determination
Concentration Code
Country of Citizenship
Credential Action
Credential Class
Credential Emphasis
Credential Status
Credential and Subject Matter Waiver Objective
University Race/Ethnicity Reporting Category
Cumulative Campus Pre-Collegiate Units Attempted
Cumulative Campus State-Supported Units Attempted
Cumulative Campus Units Earned
Degree Conferral Code
Degree Held Code
Degree Level Code
Degree Objective Code
Degree Program Delivery Type
Dependent Family Size
Dependent Income Code
Disabled Student Services Program Service
Disabled Student Services Verified Disability
EAP English Language Arts Score
EAP English Language Arts Status
EAP Mathematics Score
EAP Mathematics Status
Early Start English
Early Start Mathematics
Educational Opportunity Program Status
Eligibility Index
Employee Identification Number
English Proficiency Status
Enrollment Status
Entry Level Mathematics Administration Date
Entry Level Mathematics Proficiency Status
Entry Level Mathematics Total Score
Ethnic Code (Old)
Exception Admission Code
Father's Parent/Guardian #2 Education Code
Federal Pell Grant Award
Federal Work Study Award
Foster Youth Increase/Bump
GE-Breadth Critical Thinking Course Completion Status
GE-Breadth English Composition Course Completion Status Global Data sources:

GE-Breadth Math/Quantitative Reasoning Course Completion Status
GE-Breadth Oral Communications Course Completion Status
Gender Expression Code
Gender Identity Code
High School GPA
High School Graduation Year
High School Math GPA
High School Math GPA For Placement Considerations
High School Transcript Status
Hispanic/Latino Ethnic Category
Hispanic/Latino Status
Immigration Year
Impacted Major
Independent Family Size
Independent Income Code
Institution Origin Code
IPEDS Race/Ethnicity Reporting Category
Issuance Date
Local Area Status
Major Code
Mathematics/Quantitative Reasoning Placement Status
Matriculation Period
Matriculation Type
Military Increase/Bump
Mother's Parent/Guardian #1 Education Code
Multiple Major Degree Flag
Multiple Race Category
Option Suffix Code
Other Increase/Bump
Place-Bound Increase/Bump
Race Code 1
Race Code 2
Race Code 3
Race Code 4
Race Code 5
Race Status
Registered Nurse Code
Residence Code
Residence Status
SAT Score Type
Section Score for Redesigned SAT Reasoning Test
Sex Code
Sexual Orientation Code
Social Security Number
Special Programs Code (Chancellor's Office use only)
Start Date (CalStateTEACH)
State University Fee Waiver
State University Grant Award
Statewide Student Identifier (SSID)
Student First Name
Student Last Name
Student Level Code
Student Middle Name
Student Name (Discontinued from Fall 2011)
Student Name Suffix
Student Standing Code
Term Code
Term Units Attempted — Graduate Division
Term Units Attempted — Graduate Division —Special Session Courses
Term Units Attempted — Lower Division
Term Units Attempted — Lower Division —Special Session Courses
Term Units Attempted - Pre-Collegiate
Term Units Attempted —Upper Division
Term Units Attempted —Upper Division —Special Session Courses
Test Scores for ACT
Test Scores for ACT Writing (Provisional)
Test Scores for Enhanced ACT Writing
Test Scores for English Language Proficiency Test (ELPT)
Test Scores for EPT
Test Score for Redesigned SAT Reasoning Test
Test Scores for SAT (SAT Reasoning Test)
Test Scores for SAT Writing Section (Provisional)
Test Scores for TOEFL
Total GPA
Total Units Earned
Transfer GPA
TMC (Transfer Model Curriculum) Number
Transfer Units Earned
U.S. Current Military Status
U.S. Military Dependent Status
U.S. Military Status
Written Communication Placement Status
Year
SSN
EMPLID
CAMPUS ID
Year
Term Code
Campus Code
Course Abbreviation
Course Number
Course Suffix
Course Section
Course Section Credit Units
Grade
Course Title
Course Level*
SSN_Neutralized*
EMPLID_Neutralized*
Course Section Credit Units- Modified*
ACT_Comp
ACT_English
ACT_Math
ACT_Reading
ACT_Science
ACT_Scores
ACT_Writing
ADT_EARNED
AGE_DERV
AGE_GROUP_DERV
Added_Authorization
Adm_Basis
Admission_Basis_Code_New
Birth_Date
Birth_Day
Birth_Month
Birth_Year
CAS_ID
CA_Promise_Prog_Status
CCC_Control_Number
CCSS_Units_Attempted
CIP_Code
CP_Electives
CP_English
CP_FL
CP_Lab_Sci
CP_Math
CP_Social_Science
CP_US_HistGov
CP_VPA
CST_Start_Date
University_Race_Cat
CUA_Pre_Collegiate
CY
Calgrant_Status
Campus_Code
Campus_GPA
Campus_ID
Citizenship_Code
Cohort_Duplicate_Flag
Cohort_Group
Cohort_Type
CollYearDesc
Country_Code
Cred_Sub_Waiver_Obj
Credential_Emphasis
Credential_Status
Cum_Campus_Units_Earned Global Data sources:

DEG_ADT_Completion_Status
DEG_AdmBasis
DEG_Admission_Basis_Code_New
DEG_BirthDate
DEG_BirthDay
DEG_BirthMonth
DEG_BirthYear
DEG_CA_Promise_Prog_Status
DEG_CCC_Control_Number
DEG_CIPCode
DEG_UniversityRaceCat
DEG_Campus
DEG_CampusGPA
DEG_Campus_ID
DEG_CitizenCode
DEG_Concentration_Code
DEG_Conf_Code
DEG_CountryCode
DEG_County
DEG_Cum_Campus_Units_Earned
DEG_Deg_Prog_Delivery_Type
DEG_Degree_Held
DEG_DisciplineDiv
DEG_EMPL_ID
DEG_EthCode
DEG_ExpAdmCode
DEG_Gender_Expression_Code
DEG_Gender_ID_Code
DEG_HSGRDYR
DEG_HispLatinoCat
DEG_HispLatinoStatus
DEG_IOC
DEG_IPEDSRaceCat
DEG_InstType
DEG_MRCat
DEG_MatPeriod
DEG_OptSuffix
DEG_RESCODE
DEG_RESStatus
DEG_SSN
DEG_STEM
DEG_SchCode
DEG_Sex
DEG_Sex_Orientation_Code
DEG_TMC_Number
DEG_Term
DEG_TotGPA
DEG_TotUnitsEarned
DEG_TransGPA
DEG_TransUnitsEarned
DEG_USMiliStatus
DEG_US_Curr_Military_Status
DEG_US_Military_Dependent_Status
DEG_YRTERM
DEG_Year
DSSPROG
DSSVD
Deg_Deg_Level_Code
Deg_DegreeCode
Deg_Major_Degree_Code
Deg_Prog_Delivery_Type
Degree_Held
Degree_Obj_Code
Disc_Division
EAP_English
EAP_English_LA_Score
EAP_Math
EAP_Math_Score
ELIGIBLE_ENROLL
ELM_Adm_Date
ELM_Adm_Day
ELM_Adm_Month
ELM_Adm_Year
ELM_Algebra
ELM_Dates
ELM_First_Total
ELM_Geometry Global Data sources:

ELM_Prof_Status
ELM_Total
ELPT
EOP_Status
EPT_Composition
EPT_Essay
EPT_Prof_Status
EPT_Reading
EPT_Scores
EPT_Total
ERSR_RACE
ERSX_Flag
ETHCSRDE
ETHNICITY
Early_Start_English
Early_Start_Math
Empl_ID
Eng_Flag
Enroll_Status
Enroll_Status_S
Enrolled_1_yr_later
Ethnic_Code
Except_Adm_Code
FALL
FT_PT_Status
Fee_Waiver
First_Gen_Status
GENDER
GE_Critical_Thinking
GE_English_Comp
GE_Mathematics
GE_Oral_Comm
Gender_Expression_Code
Gender_ID_Code
HS_GPA
HS_Grad_Year
Hisp_Latino_Eth_Cat
Hisp_Latino_St
IPEDS_RE
IPEDS_Race_Cat
IPEDS_Race_Ethnicity_DERV
Immigration_Year
Inst_Code
Inst_Origin
Inst_State
Inst_Type
K_YEAR
Maj_Opt_Conc_Emph
Major_Code
Major_Spec
Mat_Period
Math_Flag
Math_QR_Placement_Status
Matriculation_Type
Mult_Major_Degree
Mult_Race_Cat
NEW_CONCORDED_EI
NEW_FULLCONCORD_EI
NEW_SAT_EI
OLD_CONCORDED_EI
OTH_Campus
OTH_Campus_ID
OTH_DEG_Deg_Level_Code
OTH_DEG_Major_Degree_Code
OTH_Empl_ID
OTH_SSN
OTH_YRTERM
Option_Suffix
Pell_Status
RACECOMB
RD_SAT_CONVERTED
RD_SAT_Comp
RD_SAT_Comp_CONCORD
RD_SAT_Comp_FULLCONCORD
RD_SAT_EBRW
RD_SAT_Math
RD_SAT_Math_Sub_Test -continued

| Global Data sources: |
|---|
| RD_SAT_Reading_Sub_Test |
| RD_Writing_Sub_Test |
| Registered_Nurse |
| Remediated |
| Remediation_Status |
| Remediation_Status_HSExit |
| Res_Code |
| Res_Status |
| SAT_CONVERTED |
| SAT_Comp |
| SAT_Comp_CONCORD |
| SAT_EBRW_DERV |
| SAT_EI |
| SAT_Math |
| SAT_Math_DERV |
| SAT_Score_Type |
| SAT_Scores |
| SAT_Verbal |
| SAT_Writing |
| SSN |
| STEM |
| Sex_Code |
| Sex_Orientation_Code |
| Special_Programs |
| Statewide_Student_ID |
| Student_Level |
| Student_Standing |
| TMC_Number |
| TOEFL_Score |
| TUA_Pre_Collegiate |
| Term |
| Term_Units_Att_Total |
| Test_Indicator_EEE |
| Total_GPA |
| Total_TUA_Summer |
| Total_Units_Att_G |
| Total_Units_Att_LD |
| Total_Units_Att_UD |
| Total_Units_Earned |
| Trans_Units_Earned |
| Transfer_GPA |
| URM_Status |
| US_Curr_Military_Status |
| US_Military_Dependent_Status |
| US_Military_Status |
| VALID_SAT_TREND |
| VALID_SAT_TREND_CONCORD |
| WC_Placement_Status |
| YR10_GRAD_ANYCAMPUS |
| YR10_GRAD_OTHCAMPUS |
| YR10_GRAD_SAMECAMPUS |
| YR10_GRAD_STEMDISCIP |
| YR10_RETENTION_ANYCAMPUS |
| YR10_RETENTION_OTHCAMPUS |
| YR10_RETENTION_SAMECAMPUS |
| YR10_RETENTION_STEMDISCIP |
| YR1_GRAD_ANYCAMPUS |
| YR1_GRAD_OTHCAMPUS |
| YR1_GRAD_SAMECAMPUS |
| YR1_GRAD_STEMDISCIP |
| YR1_RETENTION_ANYCAMPUS |
| YR1_RETENTION_OTHCAMPUS |
| YR1_RETENTION_SAMECAMPUS |
| YR1_RETENTION_STEMDISCIP |
| YR2_GRAD_ANYCAMPUS |
| YR2_GRAD_OTHCAMPUS |
| YR2_GRAD_SAMECAMPUS |
| YR2_GRAD_STEMDISCIP |
| YR2_RETENTION_ANYCAMPUS |
| YR2_RETENTION_OTHCAMPUS |
| YR2_RETENTION_SAMECAMPUS |
| YR2_RETENTION_STEMDISCIP |
| YR3_GRAD_ANYCAMPUS |
| YR3_GRAD_OTHCAMPUS |
| YR3_GRAD_SAMECAMPUS |
| YR3_GRAD_STEMDISCIP |
| YR3_RETENTION_ANYCAMPUS |

-continued

| Global Data sources: |
|---|
| YR3_RETENTION_OTHCAMPUS |
| YR3_RETENTION_SAMECAMPUS |
| YR3_RETENTION_STEMDISCIP |
| YR4_GRAD_ANYCAMPUS |
| YR4_GRAD_OTHCAMPUS |
| YR4_GRAD_SAMECAMPUS |
| YR4_GRAD_STEMDISCIP |
| YR4_RETENTION_ANYCAMPUS |
| YR4_RETENTION_OTHCAMPUS |
| YR4_RETENTION_SAMECAMPUS |
| YR4_RETENTION_STEMDISCIP |
| YR5_GRAD_ANYCAMPUS |
| YR5_GRAD_OTHCAMPUS |
| YR5_GRAD_SAMECAMPUS |
| YR5_GRAD_STEMDISCIP |
| YR5_RETENTION_ANYCAMPUS |
| YR5_RETENTION_OTHCAMPUS |
| YR5_RETENTION_SAMECAMPUS |
| YR5_RETENTION_STEMDISCIP |
| YR6_GRAD_ANYCAMPUS |
| YR6_GRAD_OTHCAMPUS |
| YR6_GRAD_SAMECAMPUS |
| YR6_GRAD_STEMDISCIP |
| YR6_RETENTION_ANYCAMPUS |
| YR6_RETENTION_OTHCAMPUS |
| YR6_RETENTION_SAMECAMPUS |
| YR6_RETENTION_STEMDISCIP |
| YR7_GRAD_ANYCAMPUS |
| YR7_GRAD_OTHCAMPUS |
| YR7_GRAD_SAMECAMPUS |
| YR7_GRAD_STEMDISCIP |
| YR7_RETENTION_ANYCAMPUS |
| YR7_RETENTION_OTHCAMPUS |
| YR7_RETENTION_SAMECAMPUS |
| YR7_RETENTION_STEMDISCIP |
| YR8_GRAD_ANYCAMPUS |
| YR8_GRAD_OTHCAMPUS |
| YR8_GRAD_SAMECAMPUS |
| YR8_GRAD_STEMDISCIP |
| YR8_RETENTION_ANYCAMPUS |
| YR8_RETENTION_OTHCAMPUS |
| YR8_RETENTION_SAMECAMPUS |
| YR8_RETENTION_STEMDISCIP |
| YR9_GRAD_ANYCAMPUS |
| YR9_GRAD_OTHCAMPUS |
| YR9_GRAD_SAMECAMPUS |
| YR9_GRAD_STEMDISCIP |
| YR9_RETENTION_ANYCAMPUS |
| YR9_RETENTION_OTHCAMPUS |
| YR9_RETENTION_SAMECAMPUS |
| YR9_RETENTION_STEMDISCIP |
| YRTERM |
| Year |
| combprof |
| campus |
| cohort |
| gradunits |
| Idunits |
| major |
| precollunits |
| ssn |
| studentlevel |
| totunits |
| udunits |
| yrterm |
| academic_standing_cd |
| grade_id |
| institution_id |
| academic_period |
| academic_start_dt |
| academic_end_dt |
| missed_rule_reason_id |
| institution_id |
| student_id |
| term_id |
| course_id |
| course_ref_no |

| Global Data sources: | Used in our system (condensed list) |
|---|---|
| registration_status_cd | Campus Assigned Student ID |
| campus_id | Campus Code |
| college_id | Campus GPA |
| department_id | Citizenship Code |
| attempted_credits | Concentration Code |
| earned_credits | University Race/Ethnicity Reporting Category |
| gradable_ind | Cumulative Campus Pre-Collegiate Units Attempted |
| final_grade_id | Cumulative Campus State-Supported Units Attempted |
| transfers_course_ind | Cumulative Campus Units Earned |
| repeat_ind | Degree Level Code |
| registered_ind | Degree Objective Code |
| attendance_id | Employee Identification Number |
| appointment_id | English Proficiency Status |
| student_id | Enrollment Status |
| staff_id | Entry Level Mathematics Proficiency Status |
| meeting_type | Ethnic Code (Old) |
| appointment_type | Father's Parent/Guardian #2 Education Code |
| location | Federal Pell Grant Award |
| scheduled_duration | High School GPA |
| appointment_reason | Hispanic/Latino Ethnic Category |
| scheduled_date | Hispanic/Latino Status |
| scheduled_hour_of_day | Institution Origin Code |
| report_filed | IPEDS Race/Ethnicity Reporting Category |
| dropin | Major Code |
| student_attended | Mathematics/Quantitative Reasoning Placement Status |
| cancelled | Matriculation Period |
| no_show | Matriculation Type |
| message_id | Mother's Parent/Guardian #1 Education Code |
| delivery_method | Social Security Number |
| student_id | Term Code |
| staff_id | Term Units Attempted — Lower Division |
| message_created_dt | Term Units Attempted - Pre-Collegiate |
| First Name | Term Units Attempted — Upper Division |
| Middle Initial | Total GPA |
| Last Name | Total Units Earned |
| Name Suffix | Transfer Units Earned |
| Requester Return Field | Year |
| Record Found Y/N | EMPLID |
| Search Date | CAMPUS ID |
| College Code/Branch | Course Abbreviation |
| College Name | Course Number |
| College State | Course Suffix |
| 2-year / 4-year | Course Section |
| Public / Private | Course Section Credit Units |
| Enrollment Begin | Grade |
| Enrollment End | Course Title |
| Enrollment Status | Course Level* |
| Class Level | EMPLID_Neutralized* |
| Enrollment Major 1 | Course Section Credit Units-Modified* |
| Enrollment CIP 1 | Campus_ID |
| Enrollment Major 2 | Cohort_Group |
| Enrollment CIP 2 | Cohort_Type |
| Graduated? | DEG_Campus |
| Graduation Date | DEG_Concentration_Code |
| Degree Title | DEG_Term |
| Degree Major 1 | DEG_TotGPA |
| Degree CIP 1 | DEG_TotUnitsEarned |
| Degree Major 2 | DEG_TransGPA |
| Degree CIP 2 | DEG_TransUnitsEarned |
| Degree Major 3 | DEG_YRTERM |
| Degree CIP 3 | DEG_Year |
| Degree Major 4 | Deg_Major_Degree_Code |
| Degree CIP 4 | ERSX_Flag |
| College Sequence | ETHNICITY |
| | Empl_ID |
| | Enroll_Status |
| | First_Gen_Status |
| | GENDER |
| | IPEDS_Race_Ethnicity_DERV |
| | Maj_Opt_Conc_Emph |
| | Major_Code |
| | Math_QR_Placement_Status |
| | Pell_Status |
| | Remediated |
| | Remediation_Status |
| | Student_Level |
| | Term_Units_Att_Total |
| | URM_Status |
| | YR1_RETENTION_SAMECAMPUS |

DATA SOURCE—SELECTED UNIVERSITY DATA

From the global data set, the data that is selected and filtered is used in the database to generate the student success dashboard of the present invention.

As a non-limiting example, the following is a list of 101 variables that comprise the selected global data available from the (603 variables) data sources used in the invention.

| Used in our system (condensed list) |
| --- |
| YR2_RETENTION_SAMECAMPUS |
| YR3_RETENTION_SAMECAMPUS |
| YR4_RETENTION_SAMECAMPUS |
| YR5_RETENTION_SAMECAMPUS |
| YR6_RETENTION_SAMECAMPUS |
| YR7_RETENTION_SAMECAMPUS |
| YRTERM |
| campus |
| cohort |
| Idunits |
| major |
| precollunits |
| studentlevel |
| totunits |
| udunits |
| Requester Return Field |
| College Name |
| 2-year / 4-year |
| Enrollment Begin |
| Enrollment End |
| Graduated? |
| Graduation Date |

Application Programming Interfaces (APIs)

In a preferred aspect, the invention uses an application programming interface (API) architecture to define the programmable interfaces through which the multi-user enrollment, progress, and degree completion display system interacts with applications that use its assets. This allows the programmable interfaces to provide different sets of services to different application serving different types of consumers. The API disclosed herein uses custom library code in order to provide reusable modules that are determined based upon the user interface that is accessing the library. These pre-coded modules allow application-specific access to the database that contains the periodically-provided data sources from multiple university systems that has been converted into the device-modified special purpose output data source for distribution to university displays and user equipment.

In a preferred aspect, the API architecture includes an end user component that interacts with a client applications component where the client applications component connects to and leverages a core API infrastructure. In one preferred embodiment of the invention, the core API infrastructure includes a security layer that interfaces with a caching layer, a representation layer connected to the caching layer, an orchestration layer between the representation layer and the API implementation layer, and a backend layer interfacing with the API implementation layer.

Digital Displays

As defined herein, digital display refers to the use of computer screens to display still and moving media having different information scheduled at various times and capable of being updated remotely. Examples of computer screens include projectors, LCD and LED monitors, touch screens, touch screen overlays, multi-touch screens, kiosks, plasma screens, window films, and equivalent technology. The output feed received from the multi-user enrollment, progress, and degree completion display system can be presented on the computer screens using standard presentation graphics software. Examples of presentation graphics software includes Microsoft PowerPoint, OpenOffice and LibreOffice presentation software, MS Media player, built-in media players, media player software and equipment from existing vendors, and interactive media players.

University Remote Access System detail

A remote access and control system enabling a university to remotely access a remote multi-user enrollment, progress, and degree completion display system. Access system provides the university with one or more ways to connect to and to communicate with web server running a computer program to send commands to and receive information from remote multi-user enrollment, progress, and degree completion display system through a remote access module. Each remote access module can control one or more remote multi-user enrollment, progress, and degree completion display system at each location.

The university can register, setup notifications, and or access and control at least one remote multi-user enrollment, progress, and degree completion display system via access system. University specific login and configuration information, including remote multi-user enrollment, progress, and degree completion display system locations, and detailed instruction information about each system, including optional notifications, can be stored as university data. The university data can be stored on Web Server, typically via data storage element as a university profile. The university profile can be stored in a variety of data structures such as in one or more relational databases stored on data storage element, or some other compatible computer storage media accessible by web server. Once registered, a university can remotely access remote multi-user enrollment, progress, and degree completion display system in multiple locations by connecting to web server. The university can connect to web server by one of several different connect methods, such as via the Internet or through a telephone system.

Connection to web server through the Internet can be accomplished in several ways. a university can connect to web server using a personal computer ("PC"), including an IBM compatible machine, such as those using an INTEL, AMD, or similar processor as well as by computers running another operating system ("OS"), such as an APPLE compatible OS. Any suitable PC or terminal can also connect to the internet by a wireless network such as an IEEE 802.11 type WiFi or 802.15/16 WiMax connection or a hardwired local area connection ("LAN"). Other suitable connections can be made by the university using an internet enabled cell phone with web browser connecting to the Internet through a cellular network or a PDA with cellular, wireless, or wired access to the Internet.

A university can also connect to web server(s) from the telephone network. The university can also use a cell phone to connect to telephone network via wireless cellular connection.

Web server can communicate with a plurality of remote multi-user enrollment, progress, and degree completion display systems at one or more locations via messaging gateway. Messaging gateway can communicate with wireless system via the internet or by a direct connection such as by Ethernet. Wireless system can then connect with a communications module associated with a particular remote multi-user enrollment, progress, and degree completion display system.

Registration: Before using system, a university typically registers for the remote access service. A university inputs information into the system during registration to build a university profile. The university profile can include a username, user role/affiliation access code, location information, system information, and information on the various remote multi-user enrollment, progress, and degree completion display systems. Where notifications are used, the profile can further include notifications tables.

Interaction via the Web: Once registered, the university can login from any web browser, anywhere there is access to the World Wide Web ("web"), typically through the Internet. First, the consumer does a login to web server. On successful login to web server, in step B, the user gains access to the remote multi-user enrollment, progress, and degree completion system. In step C, the user can request the current status and settings for any system at the remote location. The status and settings are then returned for the equipment at that location and those settings are displayed on one or more web pages for user viewing in step D. In step E, the user can optionally adjust the settings. In step F, the user logs out or otherwise disconnects from web server.

Notifications: It can be desirable for remote multi-user enrollment, progress, and degree completion display systems to notify concerned or responsible parties of system status, system events, alarms, trips, and various other failures. These notifications can be routine, as in a periodic status update of readings and settings. A routine notification is typically something that does not require immediate attention or action. Or, a notification can be urgent. An urgent notification generally requires immediate attention.

Remote access module constantly monitors the state of the university's remote multi-user enrollment, progress, and degree completion display system. A routine or urgent notification can be detected by remote access module. Remote access module can send the notification to web server using communications module, a 2-way paging module in one embodiment, communicating via communications network to messaging gateway. Messaging gateway sends the notification to web server. Web server determines if the notification is routine or urgent and then can consult a notification table to determine which access methods should be invoked to deliver the notification to one or more designation recipients including, but not limited to, the university, or one or more alternate contacts. Web server can use an email protocol to send a notification by an email service, to a text pager via a text pager network, or to directly send an email to an email address via a network such as the Internet.

In a specific example, a user's Smart Phone is registered to the arriving university system as the user arrives on-campus.

Definitions

Examples of preferred embodiments of the invention include the following details and features.

Example—Graphic Dashboards

Student Success Dashboards

Internal data dashboards to serve as a central resource to assist each campus in identifying and dislodging barriers to student success for its students. These dashboards contain data for all campuses, and can be found at a password protected site.

The dashboards provide the university community with a set of analytical tools that go beyond descriptive statistics and apply methods such as predictive modeling to give new insights into factors that affect student progress toward a degree. Using the dashboards, campus leaders can monitor on-track indicators and better understand which milestones students are failing to reach and why they are not being reached. Ultimately, this analytical tool can also help campuses design interventions or policy changes to increase student success and gauge the impact of their interventions.

There are four main data dashboards:

Graduation Initiative Dashboard—This dashboard supports administrators, faculty and staff in tracking their campus progress toward meeting their Graduation Initiative goals. The dashboard includes linear trajectories for all six goals and provides an assessment of progress made to date.

Faculty Dashboard—Faculty play a critical role in fostering student success in, and out, of the classroom. This dashboard supports faculty in gaining a better understanding of the backgrounds and academic patterns of students. It includes analyses of student progress to degree, identification of low-success courses and courses with large equity gaps, and analyses of students who leave without earning a degree.

University by the Numbers Dashboard—This dashboard facilitates a deeper understanding of the backgrounds and academic patterns of currently enrolled and recently graduated students. The dashboard includes an analysis of how university student populations are changing, how many students are taking a full-load of classes (15 units per term) and how university campus graduation rates compare to national peers.

Equity Gaps Dashboard—The recently developed equity gap dashboard highlights inequitable outcomes in short- and long-term student outcomes while identifying actions that will help close equity gaps on campuses and system wide. It includes predictive models and innovative visualizations that underscore the imperative to ensure that all students are given equitable opportunities to succeed.

DRAWINGS

Referring now to the drawings, FIG. 1 is a graphic flowchart illustrating the categories of data sources in data modules, the number of variables from each source, how the variables are filtered and combined to achieve an output for the dashboard data of the present invention.

FIG. 1 shows that data module University Academic Data (AD) 101 comprises Student Level Input Variables (count=527 per student) of which 101 variables are used.

FIG. 1 shows that data module University/Financial Aid Data (FAD) 110 comprises Student Level Input Variables (count=115 per student), of which 2 are used and are input into the University Academic Data (AD) data module 101.

FIG. 1 shows that data module University/Education Advisory Board Data (EAB) 102 comprises Student Level Input Variables (count=44 per student).

FIG. 1 shows that data module National Student Clearinghouse Data (NSC) 103 comprises Student Level Input Variables (count=32 per student), of which 7 variables are used.

FIG. 1 shows that data module State Employment Development Department/University Data (CA EDD/University) 104 comprises Student Level Input Variables (count=10 per student).

FIG. 1 shows that data module University/National Survey for Student Engagement Data (NSSE) 105 comprises Student Level Input Variables (count=113 per student)

FIG. 1 shows that data module University/Cooperative Institutional Research Program (Freshman Survey) Data (CIRP) 106 comprises Student Level Input Variables (count=52 per student)

FIG. 1 shows that data module University campus data (MAJ) 107 comprises Campus>College>Major Cross-Reference Mapping, of which all 3 variables are used.

FIG. 1 shows that data module University campus data (DEPT) 108 comprises Campus>College>Department Cross-Reference Mapping, of which all 3 variables are used And FIG. 1 shows that data module IPEDS National Peers Data (PEERS) 109 comprises Campus Level Input Variables (count=2,159 per campus), of which 12 variables are used.

Finally, FIG. 1 shows that data module University Dashboard Data 111 comprises an output of Student Level Input Variables (count=108 per student) (count=18 per campus).

Figure 2:
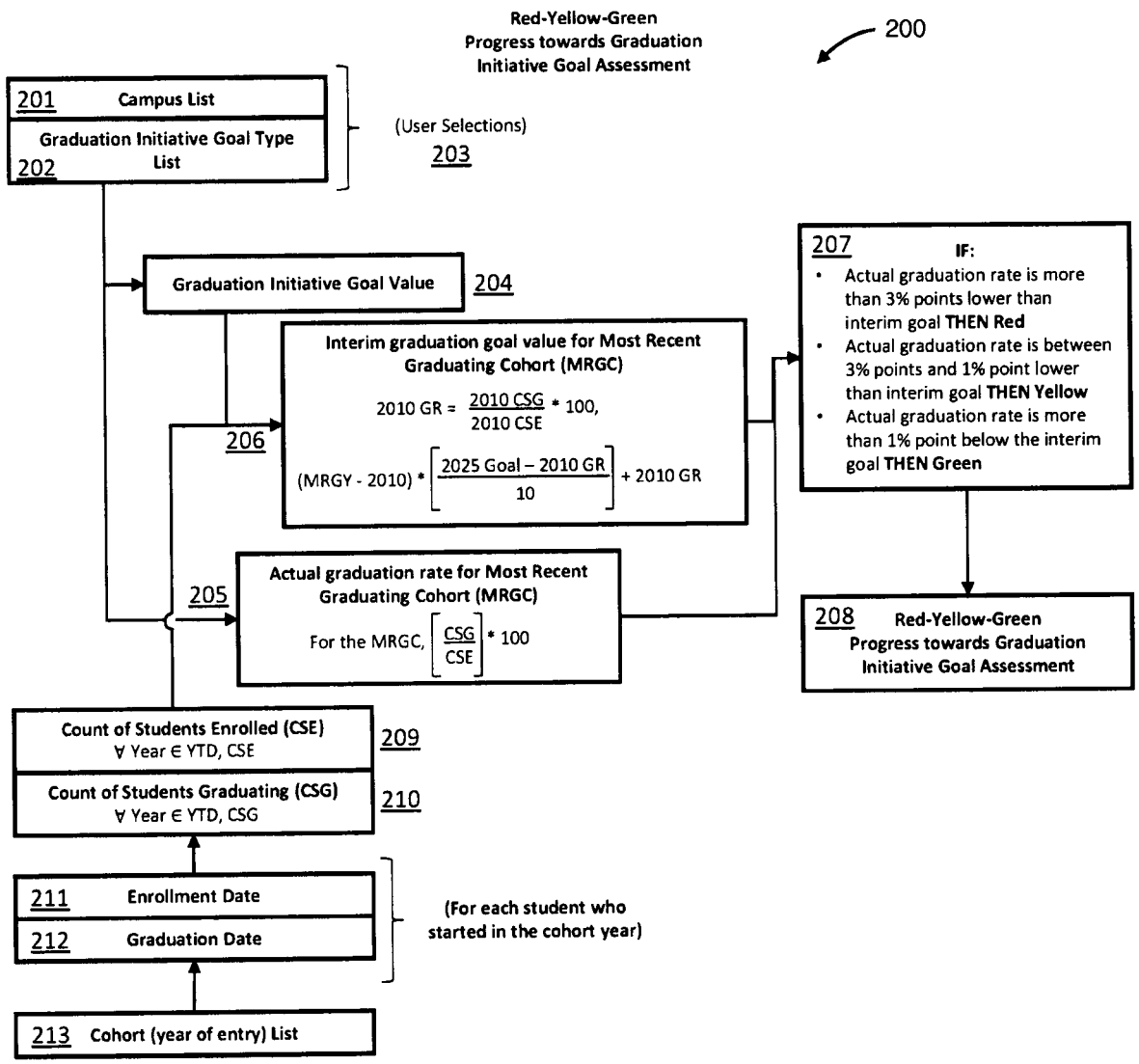
FIG. 2 is a graphic flowchart illustrating a tri-color indicator (Red-Yellow-Green) overview module and architecture for progress towards graduation using variables of the present invention.

Referring now to FIG. 2, FIG. 2 shows a graphic flowchart illustrating a PTG module 200 which comprises a color indicator (Red-Yellow-Blue) for Progress towards Graduation Initiative Goal Assessment.

FIG. 2 shows User Selections module 203 comprising a selection for Campus List module 201 and a selection for Graduation Initiative Goal Type List module 202.

FIG. 2 shows that a Graduation Initiative Goal (GIG) Value 204 is combined with an output from a data chain comprising Count of Students Enrolled 209, Count of Students Graduating 210, Enrollment Date 211 and Graduation Date 212 (For each student who started in the cohort year), and a Cohort (year of entry) List 213. This combination yields an Interim graduation goal (IGG) value 206 for most recent year (linear increment from 210 cohort's graduation rate to year 2025 graduation rate goal).

FIG. 2 shows that an Interim graduation goal (IGG) value 206 for most recent year is combined with an Actual graduation rate (AGR) 205 for most recent cohort.

FIG. 2 then shows that the IGG-AGR combination 207 is measured to generate a color or indicator display 208. For example, IF:
Actual graduation rate is more than 3% points lower than interim goal THEN Red;
Actual graduation rate is between 3% points and 1% point lower than interim goal THEN Yellow; or
Actual graduation rate is more than 1% point below the interim goal THEN Green.

The indicator/color is output to a selected page within the dashboard to provide a Red-Yellow-Blue Progress towards Graduation Initiative Goal Assessment.

Figure 3:
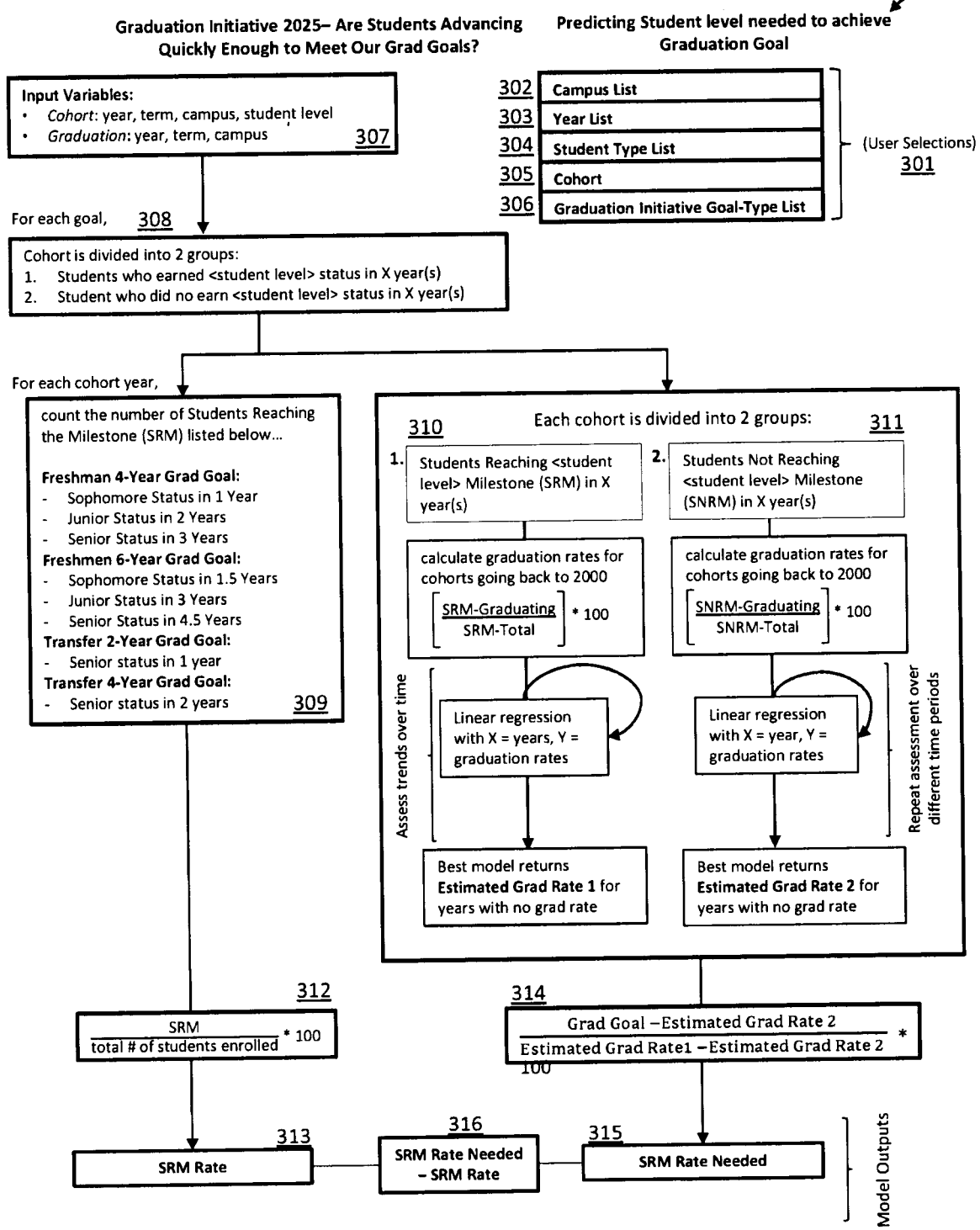
FIG. 3 is a graphic flowchart illustrating a student-level based prediction module and architecture for progress towards graduation using variables of the present invention.

Referring now to FIG. 3, FIG. 3 is a graphic flowchart illustrating a student level-based prediction module 300 and architecture for progress towards graduation using variables of the present invention.

FIG. 3 shows how selected data can be used to for Predicting Student level needed to meet Graduation Goals. The PREDICTION VARIABLES module 307 includes cohort year, term, campus and student level, along with graduation year, term and campus.

FIG. 3 shows user selections module 301 comprising Campus List module 302, Year List module 303, Student Type List module 304, Cohort module 305, and Graduation Initiative Goal Type List module 306. User selections module 301 is generated from Variables 307: Cohort: year, term, campus, student level; and Graduation: year, term, campus.

FIG. 3 shows a Goal Module 308 that calculates for Freshman 4-year, Freshman 6-year, Transfer 2-year, and Transfer 4-Year.

For calculating Freshman 4-year, FIG. 3 shows that for each cohort year, there is a calculation of the total number each student's timely advancement status using year, term, and student level: Freshman 4-Year Grad Goal. FIG. 3 shows the use of the variables: Sophomore Status in 1 Year; Junior Status in 2 Years; Senior Status in 3 Years.

For calculating Freshmen 6-Year Grad Goal, FIG. 3 shows the use of the variable for Sophomore Status in 1.5 Years, Junior Status in 3 Years, and Senior Status in 4.5 Years.

For calculating Transfer 2-Year Grad Goal, FIG. 3 shows the use of the variable for Senior status in 1 year.

For calculating Transfer 4-Year Grad Goal, FIG. 3 shows the use of the variable for Senior status in 2 years.

FIG. 3 shows that a calculation 312 is made whereby (Total # of students) is divided by (the total # of student enrolls) to obtain % of each student's timely advancement status FIG. 3 then shows for each goal, the Cohort is divided into 2 groups 309: 1. Students who earned <student level> status in X year(s) 310. 2. Student who did not earn <student level>status in X year(s) 311.

FIG. 3 shows that for each of the two Cohort Groups, a linear regression and a Best Model Estimate is calculated.

FIG. 3 shows in Cohort Group 1, 310, the progression from dividing into groups to assessing trends over time. This includes starting with Students who earned <student level> status in X year(s), and then calculate graduation rates for cohorts going back to 2000.

Next, a Linear regression is performed with X=years, Y=graduation rates to yield a Best model estimate of grad rate 1 for years with no grad rate.

FIG. 3 shows in Cohort Group 2, 311, the progression from dividing into groups to assessing trends over time. This includes starting with Students who did not earn <student level> status in X year(s) and calculating to yield a graduation rates for cohorts going back to 2000

Similarly, a Linear regression is performed with X=year, Y=graduation rates to yield a Best model estimates grad rate 2 for years with no grad rate.

FIG. 3 then shows the Formula 314

(Grad Goal−Grad Rate 2)/(Grad Rate 1−Grad Rate 2) to obtain % of needed student's timely advance status in order to achieve goal 315.

Difference

FIG. 3 finally shows wherein the difference is obtained using:

(% of each student's timely advancement status 313)−(% of needed student's timely advance status in order to achieve goal 315).

Referring now to FIG. 4, FIG. 4 is a graphic flowchart illustrating a Contributing Factors module 400 which comprises variables relating to cohort year, term, campus, level, type, and identifier (SSN).

FIG. 4 shows a User Selections module 401 that combines a Campus List module 402 and a Student Type List module 403 (Freshman or Transfers) with an output to a CONTRIBUTING FACTORS VARIABLES module 404 that comprises Variables including: Cohort: year, term, campus, student level, student type, SSN; Course: section, grades, and units; and Graduation: year, term, and campus.

FIG. 4 shows that the Variables module 404 may comprise:

(i) a Sum dfw grades divided by total of enrolled students 405 to yield an Average unit load (1st year) (AUL) variable 406;

(ii) a sum course units divided by the total 407 to yield a % with non-passing grades (1st year) (NPG %) variable 408;

(iii) a Sum of repeat courses divided by the total courses taken 409 to yield a % repeating courses (1st year) (RC %) variable 410;

(iv) a sum of major switches divided by the total of enrolled students 411 to yield a % switching majors (1st year)(SW %) variable 412;

(v) a sum of college switches/total of enrolled students 413 to yield a % switching colleges (1st year)(SC %) variable 414; and, (vi) a sum of students attempting 30 units in their first year/total of enrolled students 415 to yield a % taking a full-load (1st year) (FL %) variable 416.

For all of the calculations, the calculations are made according to a group within campus, a student type, and a cohort in year 1.

Figure 5:
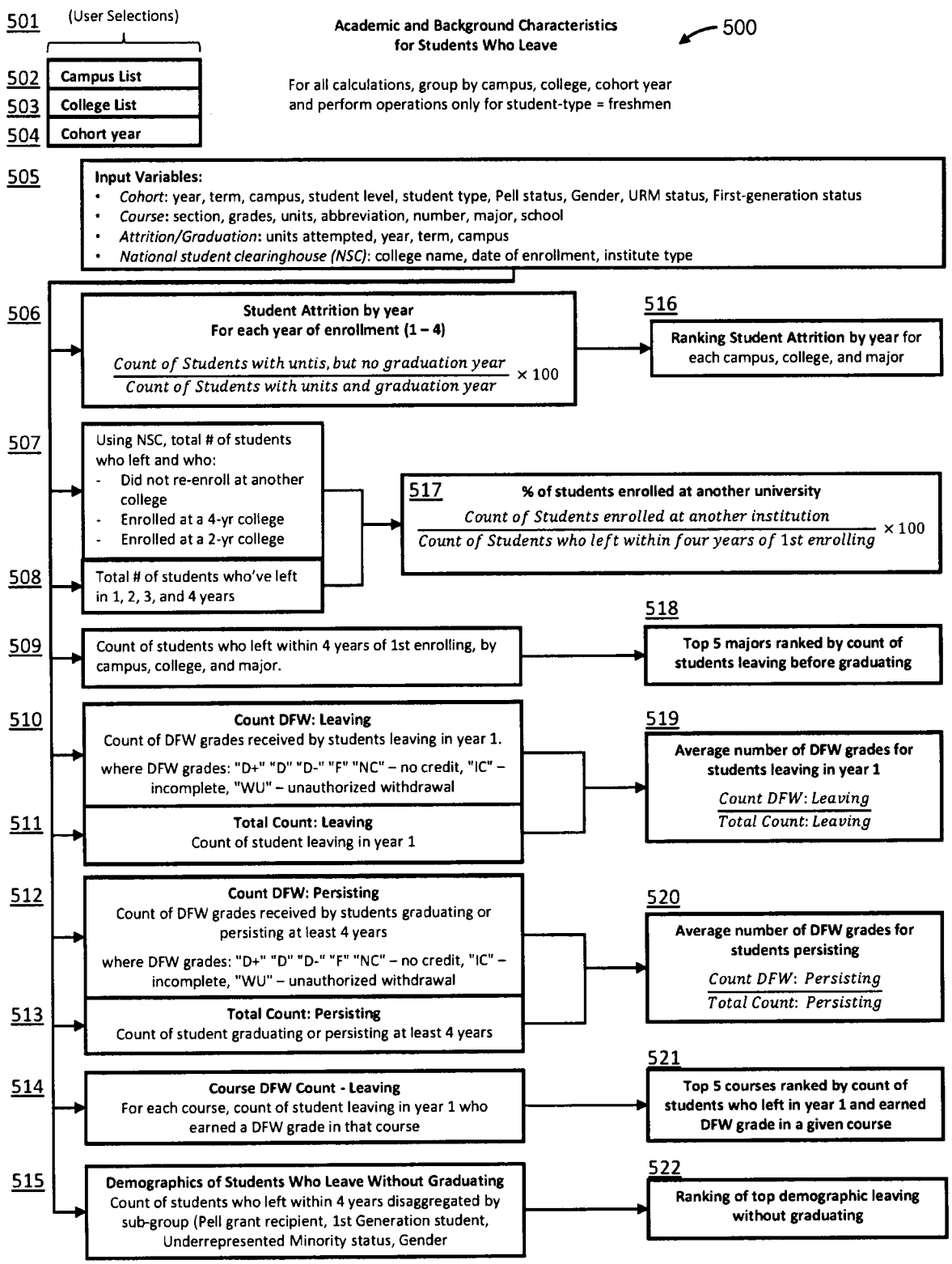
FIG. 5 is a graphic flowchart illustrating a departing students academic and background characteristics module and architecture for progress towards graduation using variables of the present invention.

FIG. 5 is a graphic flowchart illustrating a departing students module 500 and architecture for progress towards graduation using variables of the present invention.

FIG. 5 shows that user selections module 501 comprises (i) Campus List module 502, (ii) School List module 503, and (iii) Year List module 504, can select from a group of variables 505 to provide an output of the Academic and Background Characteristics for Students Who Leave.

FIG. 5 shows that the LEAVE VARIABLES module 505 includes by Cohort, by Course, by Attrition/Graduation, and by National Student Clearinghouse.

In a non-limiting preferred embodiment, the Leave Variables comprise:

Cohort: year, term, campus, student level, student type, Pell status, Gender, URM status, First-generation status Course: section, grades, units, abbreviation, number, major, school Attrition/Graduation: units attempted, year, term, campus National student clearinghouse: college name, date of enrollment, institute type FIG. 5 shows that for all calculations, they are grouped within campus, student type, and cohort.

FIG. 5 shows the five calculations to comprise:

(i) count of students with units and no graduation year/count of students with units and graduation year 506 to yield Output 1] Student attrition (1st year) 507;

(ii) count of students enrolled in another institution/count of students who left within four years 508 to yield Output 2] % of students enrolled at another university 509;

(iii) Count of students who left within 4 years by campus, college, cohort, major 510 to yield Output 3] Majors left at highest rate 511;

(iv)(a) Average number of DFW grades for students who (a) left in year 1 and (b) stayed or graduated within 4 years 512, and (iv)(b) Count of students who left in year 1 with at least 1 DFW for each course in campus 512 to yield Output 4a] Comparison DFW grades in Year 1 for students who left and stayed 513; and (v) Total number of students who left within 4 years, disaggregated by sub-group (Pell, URM, First-generation status, gender) 514 to yield Output 5] URM And Non-URM Students Differed Most In Attrition Rates 515.

Calculations (i) thru (v) are then subjected to a Ranking Analysis 516 to identify Enrollment year with highest attrition rate Top 5 majors with highest attrition rates, and Top 5 courses with highest attrition rates.

FIG. 6 is a graphic flowchart illustrating a course passage rates module 600 and architecture for progress towards graduation using variables of the present invention.

FIG. 6 shows a module comprising a plurality of calculation sub-modules using selected University variables for addressing the question: Which Courses Have the Lowest Passage Rates?

FIG. 6 shows (User Selections) module 601 may include Campus List module 603, College List module 604, and Year—Term module 604 for accessing and outputting (to display) passage rate information.

FIG. 6 shows that the PASSAGE VARIABLES module 605 includes for each student taking course, the Grade Files which comprise: Course abbreviation, course number, course section, and grade, For all undergraduate courses each year—term, a calculation is performed by college for the following: % of DFW Grades 606, Impact 607, and Division Type 608.

The % of DFW Grades calculation 606 comprises for each unique course (course abbreviation, course number), calculate the total number of students who receive a DFW grade (specifically: "D+" "D" "D–" "F" "NC"—no credit, "IC"—incomplete, "WU"—unauthorized withdrawal) then dividing by the total number of students enrolled in the course.

The Impact calculation 607 comprises the Total number of students who receive a DFW grade.

And the Division Type calculation 608 comprises General Education, Lower Division, Upper Division, Sub-baccalaureate courses determined by course number and varies by campus FIG. 6 shows that once the (% of DFW Grades 606, Impact 607, and Division Type 608) calculations are performed, the output is displayed 609, 610 according to the following.

All courses for each year-term 609 displayed by:

X— % of DFW Grades

Y— Enrollment.

And the Top 10 courses with the largest impact 610 (filtered by DFW Rate>15% and enrollment>=10) are highlighted.

Figure 7:
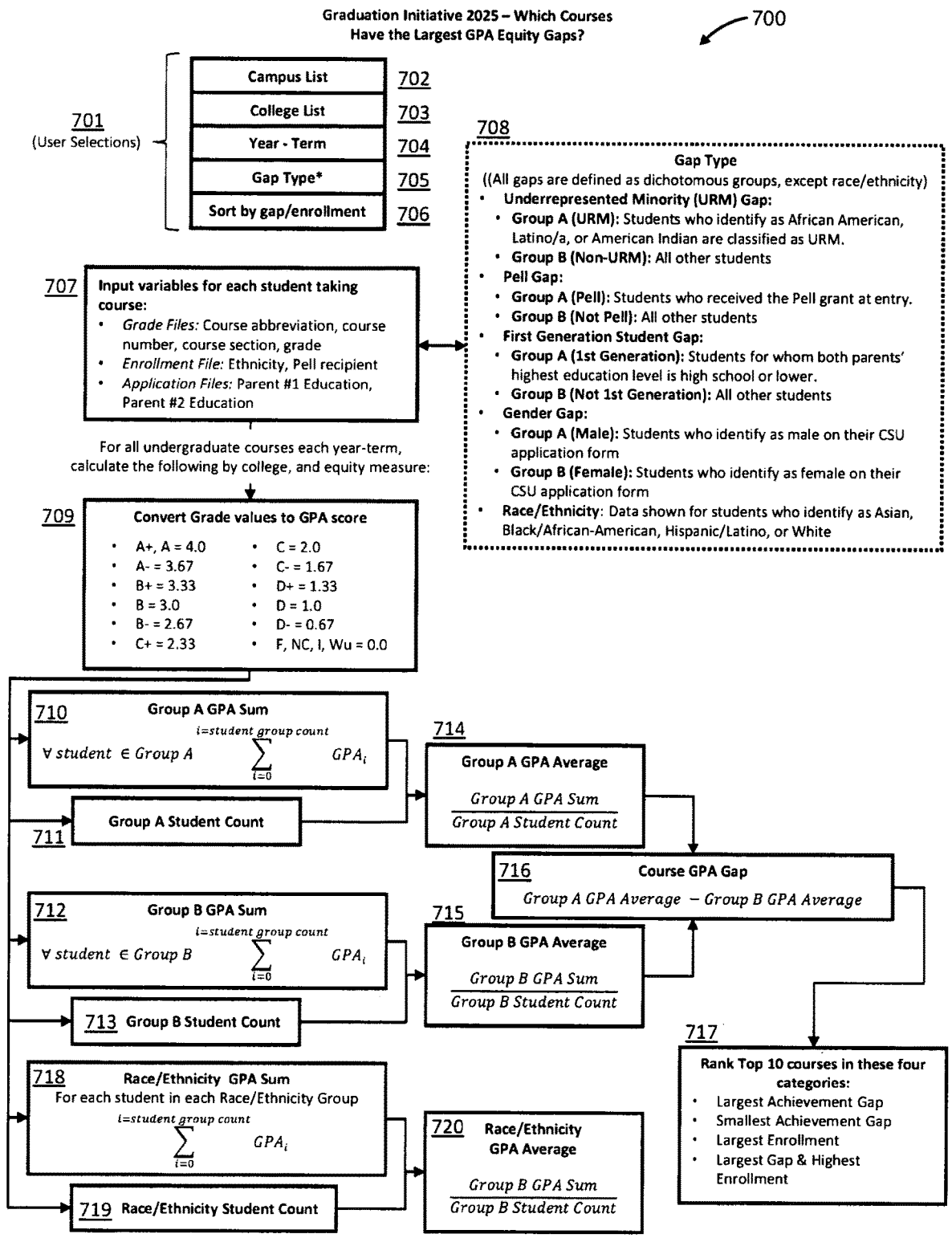
FIG. 7 is a graphic flowchart illustrating a course and GPA equity gap module and architecture for progress towards graduation using variables of the present invention.

FIG. 7 is a graphic flowchart illustrating a course and GPA equity gap module 700 and architecture for progress towards graduation using variables of the present invention.

FIG. 7 shows the module comprising a plurality of calculation sub-modules using selected University variables for addressing the question: Which Courses Have the Largest GPA Equity Gaps?

FIG. 7 shows that user selections 701 comprising (i) Campus List module 702, (ii) College List module 703, (iii) Year—Term module 704, (iv) Gap Type module 705, and (v) Sort by gap/enrollment module 706, can select from a group of variables 707 to provide an output of the Courses Have the Largest GPA Equity Gaps.

FIG. 7 shows that the COURSE AND GPA EQUITY GAP VARIABLES module 707 includes Variables 707 for each student taking course. These variables include Grade Files, Enrollment File, and Application File.

Grade files include Course abbreviation, course number, course section, and grade variables. Enrollment File includes Ethnicity, and Pell recipient variables. Application Files include Parent #1 Education, and Parent #2 Education variables.

Gap Type module 708 includes Underrepresented Minority, Pell, First Generation Students, and Gender variables.

Underrepresented Minority (URM) comprise Students who identify as African American, Latino/a, or American Indian are classified as URM. All other students are classified as Non-URM.

Pell comprise Students who received the Pell grant at entry are classified as Pell students. Those who did not receive the Pell grant at entry are classified as Non-Pell.

First Generation Students comprise Students whose parents highest education level were both high school or lower are classified as First-Gen. All others were classified as Not First Generation.

Gender comprises Students are classified as Male or Female.

Combining the variables module 707 with the GapType module 708 and calculating for all undergraduate courses each year—term, the following Gaps by GPA 709 by college, and equity measure.

The Gaps by GPA module 709 comprises calculations where, for each subgroup within each gap type, the average GPA was calculated by first converting the grades into GPA, summing the GPA, then dividing the total GPA by the number of the students in each equity measure. The Gaps were calculated by taking the average GPA from students who were classified as a specific equity measure (URM, Pell, First Gen, Gender—Female) and students who were classified as a non-equity measure (Non-URM, Non-Pell, Not First Gen, Gender—Male).

Display module 710 provides display data and programming to show the Top 10 courses based on user selection options of:
Largest Achievement Gap,
Smallest Achievement Gap,
Largest Enrollment, and
Largest Gap & Highest Enrollment.

Figure 8:
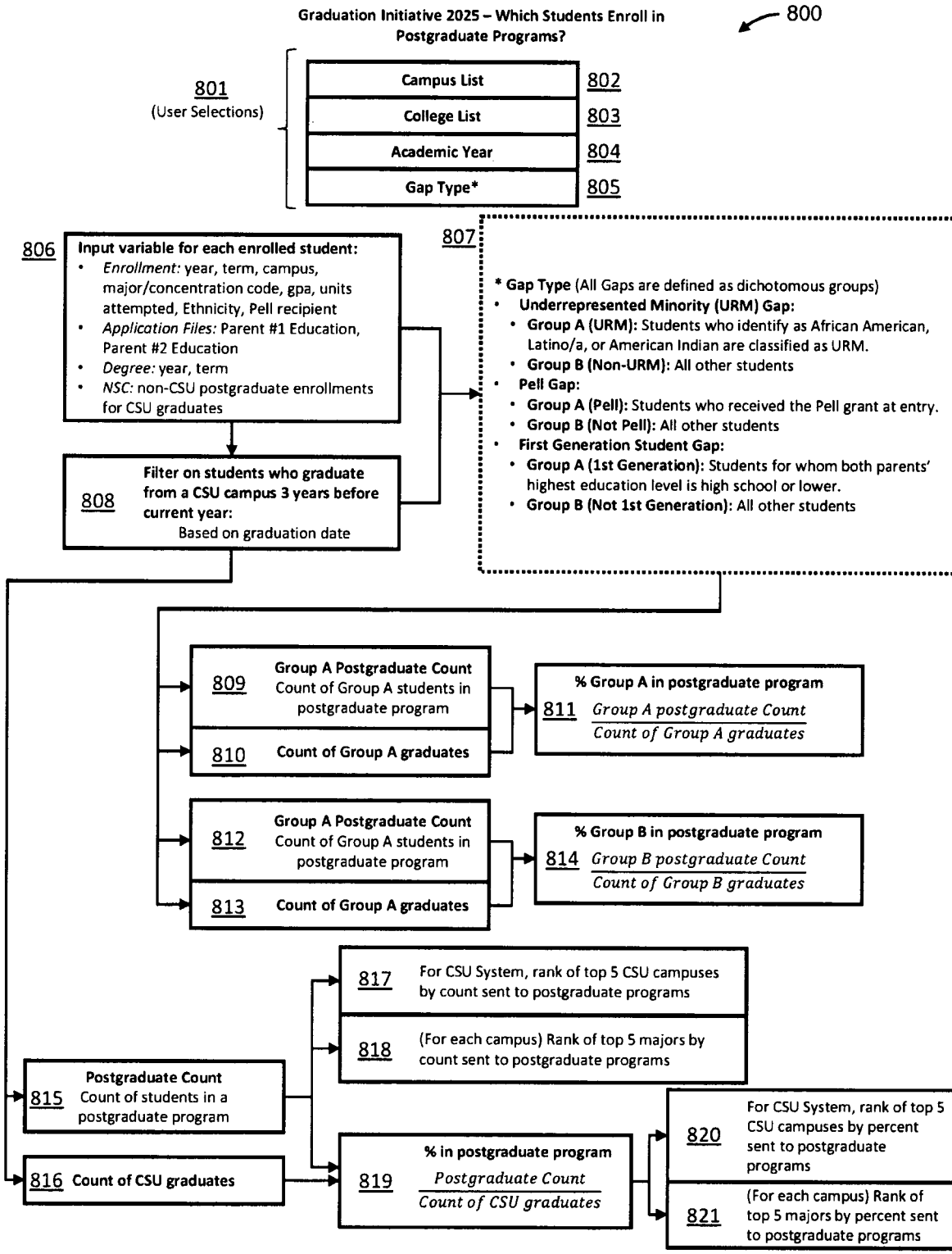
FIG. 8 is a graphic flowchart illustrating a post-graduate enrollment module and architecture for progress towards graduation using variables of the present invention.

FIG. 8 is a graphic flowchart illustrating a post-graduate enrollment module and architecture for progress towards graduation using variables of the present invention.

FIG. 8 shows the module comprising a plurality of calculation sub-modules using selected University variables for addressing the question: Which Students Enroll in Postgraduate Programs?

FIG. 8 shows that user selections 801 comprising (i). campus list module 802 (ii) college list module 803, and (iii) academic year module 804, can select from a group of variables 805 to provide an output of the post-graduate enrollment.

FIG. 8 shows that the POST GRADUATE ENROLLMENT VARIABLES module 805 includes Variable for each enrolled student. These variables comprise:
Enrollment: year, term, campus, major/concentration code, GPA, units attempted
Degree: year, term
NSC: college enrolled after graduation.

Filter module 806 the filter on students who graduate 3 years before current year. Filtering uses the variable based on graduation date.

Post-Bacc module 807 determines Students who enrolled in a post-bacc program, using the variables where:
NSC file shows student record of enrolled in a college after graduations
University enrollment file shows record student enrolled as a post-baccalaureate.

Gap Type module 808 receives data from enrolled variables 805, graduation date filter 806, and Post-Bacc variables 807. Gap Type module 808 includes Underrepresented Minority, Pell, and First Generation Students.

Underrepresented Minority (URM) comprise Students who identify as African American, Latino/a, or American Indian are classified as URM. All other students are classified as Non-URM.

Pell comprise Students who received the Pell grant at entry are classified as Pell students. Those who did not receive the Pell grant at entry are classified as Non-Pell.

First Generation Students comprise Students whose parents highest education level were both high school or lower are classified as First-Gen. All others were classified as Not First Gen.

User Selection Gap Type module 809 allows a user to select from URM/Non-URM, Pell/Non-Pell, and First Gen/Not First Gen.

Post-graduate module 810 provides a calculation of the % of graduated students who've enrolled in postgraduate program by calculating the Total number of students who have enrolled in a post-bacc program divided by the total number of students who graduated.

Post-Bacc Majors module 811 then calculates, for students enrolled in post-bacc, the top 5 majors student received their undergraduate degree in.

Post-Bacc College module 812 then determines the top 5 colleges when student enroll in a post baccalaureate program.

Display module 813 then sends data and programming instructions to display by: Count: total number of students for each major and for each university attended, and Percent: total count divided by number of students enrolled who enrolled in a post-back program.

Figure 9:
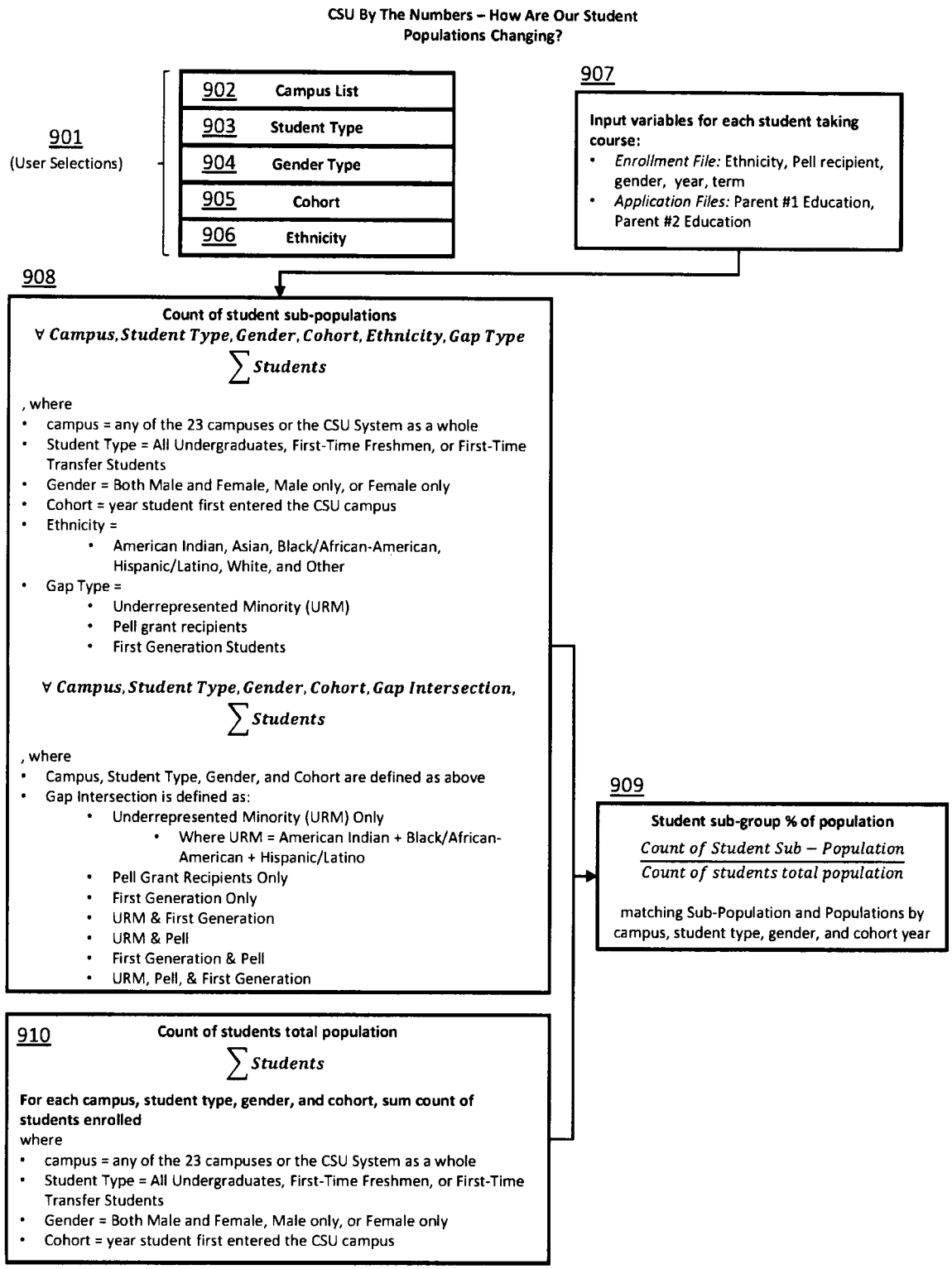
FIG. 9 is a graphic flowchart illustrating a student populations module and architecture for progress towards graduation using variables of the present invention.

FIG. 9 is a graphic flowchart illustrating a student populations module and architecture for progress towards graduation using variables of the present invention.

FIG. 9 shows the module comprising a plurality of calculation sub-modules using selected University variables for addressing the question: How Are Our Student Populations Changing?

FIG. 9 shows that user selections module 901 comprise (i). Campus List module 902 (ii) Student Type module 903 (iii) Gender Type module 904, (iv) Cohort module 905, and (v) Ethnicity 906 where these modules can select from a group of variables to provide an output to the student populations module.

FIG. 9 shows that the STUDENT POPULATIONS VARIABLES module 907 includes Variables for each student taking course, including from enrollment files and from application files. The Enrollment File comprises Ethnicity, Pell recipient, gender, year, and term. The Application Files comprise Parent #1 Education, and Parent #2 Education.

FIG. 9 shows Count module 908 which uses STUDENT POPULATION VARIABLES 907 to generate two (2) calculated figures in two different modules—a SUB-POPULATION COUNT module and a TOTAL POPULATION COUNT module, where counts of student sub-populations compared to counts of total student populations.

For the SUB-POPULATION COUNT module, for all ($\forall$=FORALL) Campus, Student Type, Gender, Cohort, Ethnicity, and Gap Type, sum ($\Sigma$) student sub-populations, where campus is defined as any of the possible campuses of a University system, or as the University System as a whole, where Student Type is defined as All Undergraduates, First-Time Freshmen, or First-Time Transfer Students, where Gender is defined as Both Male and Female, Male only, or Female only, where Cohort is defined as any year from 2005 forward, where Ethnicity is defined as American Indian, Asian, Black/African-American, Hispanic/Latino, White, and Other, and Gap Type is defined using variables of (i) Underrepresented Minority (URM), (ii) Pell grant recipients, and (iii) First Generation Students.

As for URM, Students who identify as African American, Latino/a, or American Indian are classified as URM. All other students are classified as Non-URM.

As for Pell, Students who received the Pell grant at entry are classified as Pell students. Those who did not receive the Pell grant at entry are classified as Non-Pell.

As for First Generation Students, Students whose parents highest education level were both high school or lower are classified as First-Gen. All others were classified as Not First Gen.

For the TOTAL POPULATION COUNT module, calculate for all ($\forall$=FORALL) Campus, Student Type, Gender, Cohort, and GAP INTERSECTION. Campus, Student Type, Gender, and Cohort are defined as above, where campus is defined as any of the possible campuses of a University system, or as the University System as a whole, where Student Type is defined as All Undergraduates, First-Time Freshmen, or First-Time Transfer Students, where Gender is defined as Both Male and Female, Male only, or Female only, and where Cohort is defined as any year from 2005 forward.

Gap Intersection is defined as URM only, Pell only, First Gen only, URM+First Gen, URM+Pell, FirstGen+Pell, and URM+Pell+FirstGen, where URM is defined as American Indian, Asian, Black/African-American, Hispanic/Latino.

FIG. 9 then calculates in the PERCENTAGE module 909, the ratio of the Sub-population Count divided by the Total Student Population Count, matching the Sub-population and Total Population by campus, student type, gender, and cohort year, as PERCENTAGE of the student sub-group to the total population.

FIG. 9 then also calculates in a TOTAL COUNT module 910, the count of the total student populations by campus, student type, gender, and cohort year.

Figure 10:
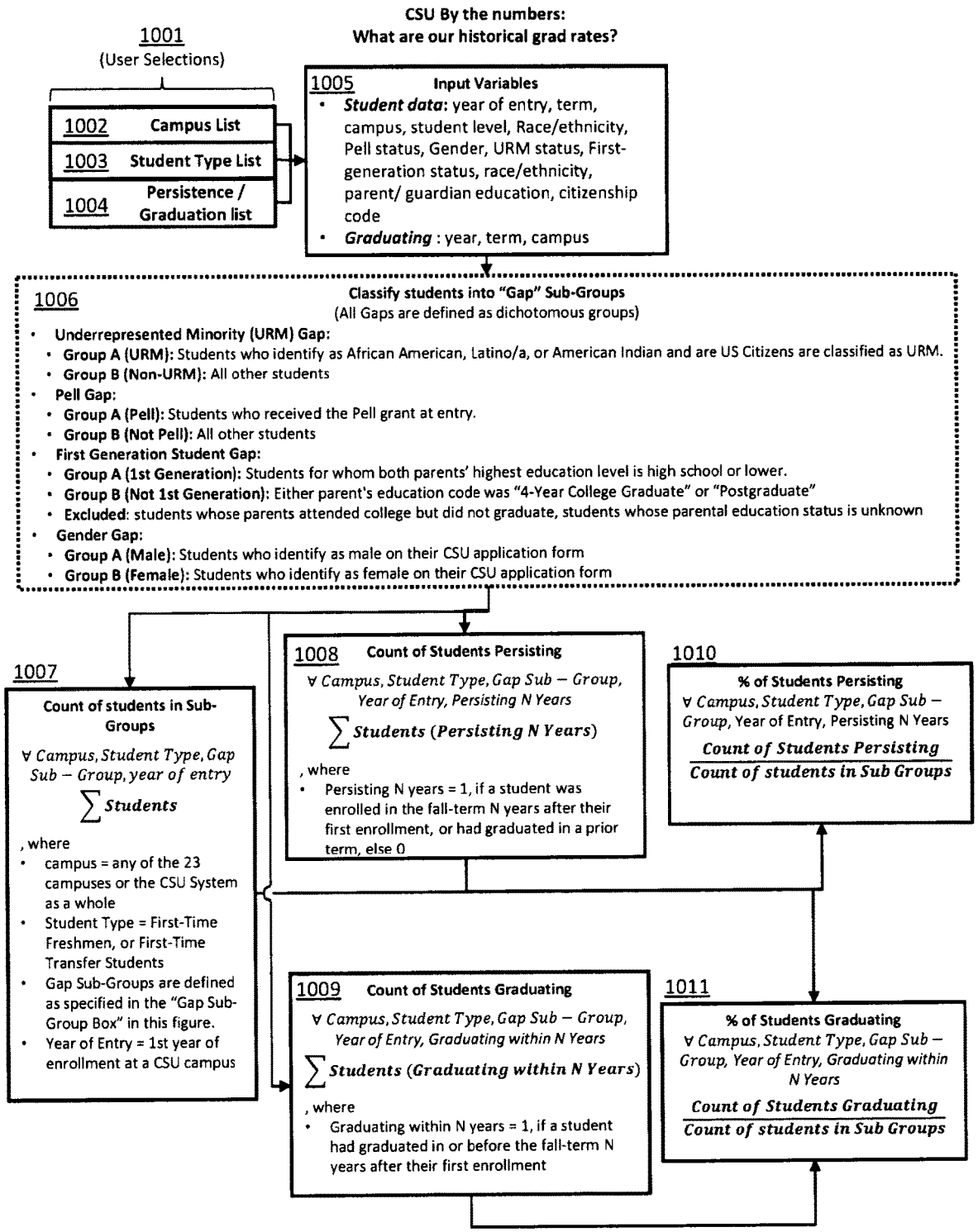
FIG. 10 is a graphic flowchart illustrating ahistorical graduation rate module and architecture for progress towards graduation using variables of the present invention.

FIG. 10 is a graphic flowchart illustrating a historical graduation rate module and architecture for progress towards graduation using variables of the present invention.

FIG. 10 shows the module comprising a plurality of calculation sub-modules using selected University variables for addressing the question: What are our historical grad rates?

FIG. 10 shows that user selections module 1001 comprises (i) Campus List 1002 (ii) Student Type List 1003, and (iii) Persistence/Graduation list 1004, allowing a user to select from a group of variables to provide an output of the historical graduation rate.

FIG. 10 shows that the HISTORICAL GRADUATION RATE VARIABLES module 1005 includes Variables for Student Data and Graduation.

Student data is defined as including year, term, campus, student level, Race/ethnicity, Pell status, Gender, URM status, First-generation status, race/ethnicity, parent/guardian education, and citizenship code.

Graduation is defined as including year, term, and campus.

FIG. 10 shows CLASSIFICATION module 1006 where students are classified into "Gap" Sub-Groups, with All Gaps defined as dichotomous groups. Classification module 1006 comprises URM Gap, Pell Gap, First Gen Gap, and Gender Gap groupings.

Underrepresented Minority (URM) Gap defines: Group A (URM) as Students who identify as African American, Latino/a, or American Indian and are US Citizens are classified as URM, and Group B (Non-URM) as All other students.

Pell Gap defines: Group A (Pell) as Students who received the Pell grant at entry, and Group B (Not Pell) as All other students.

First Generation Student Gap defines: Group A (1st Generation) as Students for whom both parents' highest education level is high school or lower, and Group B (Not 1st Generation) as Either parent's education code was "4-Year College Graduate" or "Postgraduate". Excluded from this definition are students whose parents attended college but did not graduate, and students whose parental education status is unknown.

Gender Gap defines: Group A (Male) as Students who identify as male on their University application form, and Group B (Female) as Students who identify as female on their University application form.

After classification, SUB-GROUPS module 1007 calculates the count of students in sub-groups.

Forall, $\forall$, Campus, student type, gap sub-group, and year of entry, the number of students is determined.

Campus is defined as any of the University system campuses or the University System as a whole Student Type is defined as First-Time Freshmen, or First-Time Transfer Students Gap Sub-Groups are defined as specified in the "Gap Sub-Group Box" in this figure.

Year of Entry is defined as 1st year of enrollment at a CSU campus

PERSISTING module 1008 provides where Forall, $\forall$, Campus, student type, gap sub-group, year of entry, and Persisting N years, the number of students Persisting N years is determined, where Persisting N years is defined as "1" if a student was enrolled in the fall term N-years after their first enrollment, or had graduated in a prior term, or else it is defined as "0".

GRADUATING module 1009 provides where Forall, $\forall$, Campus, student type, gap sub-group, year of entry, and Graduating within N years, the number of students graduating within N years is determined where graduating within N years is defined as "1" if a student had graduated in or before the fall-term N years after their first enrollment.

PERCENTAGE PERSISTING module 1010 provides where Forall, $\forall$, Campus, student type, gap sub-group, year of entry, and Persisting N years, the number of students Persisting N years is determined as a ratio of the count of students in sub-groups.

PERCENTAGE GRADUATING module 1011 provides where Forall, $\forall$, Campus, student type, gap sub-group, year of entry, and Graduating within N years, the percentage of students Graduating N years is determined as ratio of the number of students in subgroups.

Figure 11:
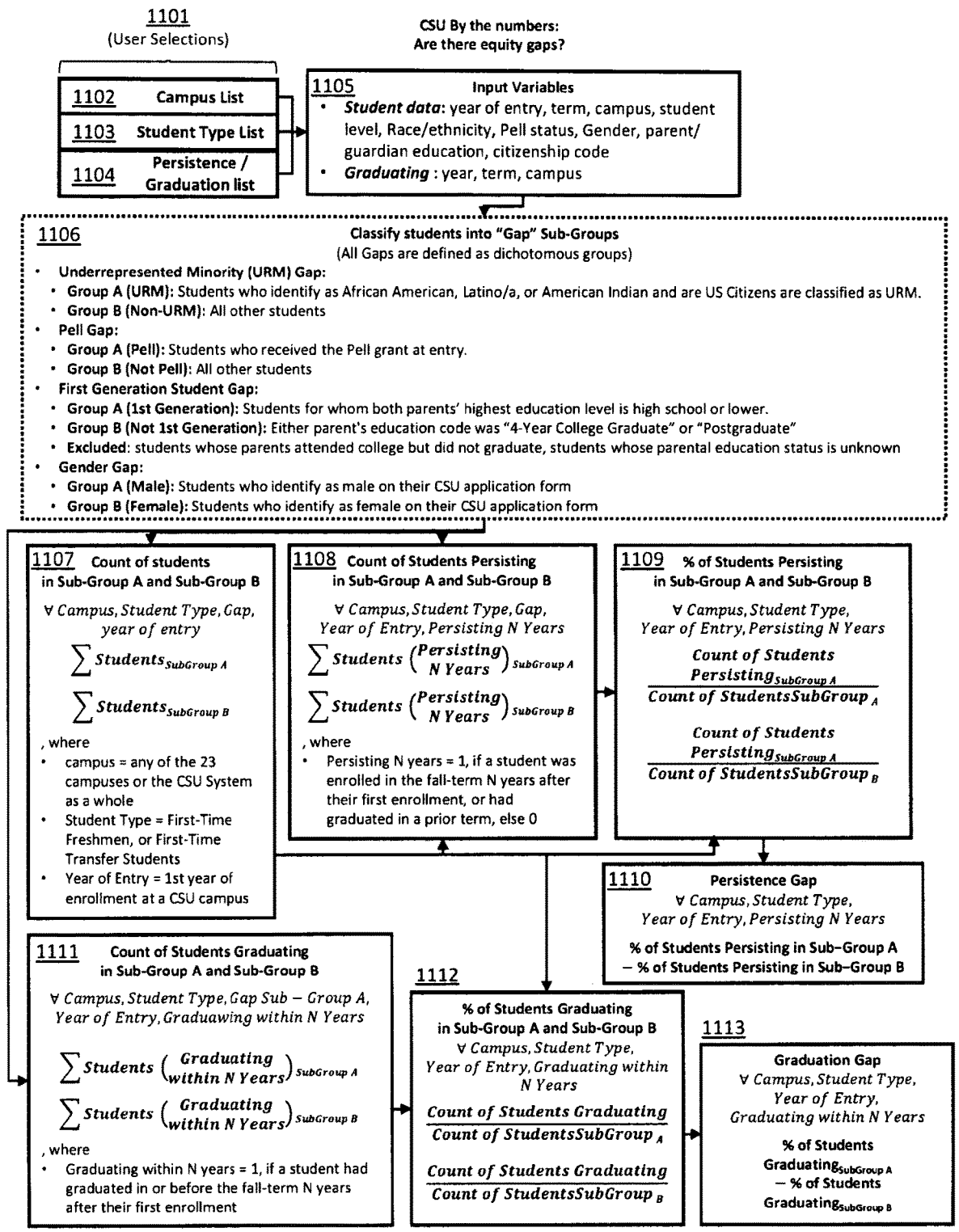
FIG. 11 is a graphic flowchart illustrating an equity gaps module and architecture for progress towards graduation using variables of the present invention.

FIG. 11 is a graphic flowchart illustrating an equity gaps module and architecture for progress towards graduation using variables of the present invention.

FIG. 11 shows that user selections module 1101 comprising (i). Campus List 1102 (ii) Student Type List 1103, and (iii) Persistence/Graduation list 1104, where a user can select from a group of variables to provide an output of the equity gaps.

FIG. 11 shows that the EQUITY GAPS VARIABLES module 1105 includes Variables, comprising student data and graduation data.

Student data is defined as year, term, campus, student level, Race/ethnicity, Pell status, Gender, URM status, First-generation status, race/ethnicity, parent/guardian education, citizenship code.

Graduating data is defined as year, term, campus.

GAP SUB_GROUP module 1106 classifies students into Gap Subgroups using URM Gap, Pell Gap, First Generation Gap, and Gender Gap.

Underrepresented Minority (URM) Gap is defined as:

Group A (URM) is defined as Students who identify as African American, Latino/a, or American Indian and are US Citizens are classified as URM; Group B (Non-URM) is defined as All other students.

Pell Gap:

Group A (Pell) is defined as Students who received the Pell grant at entry; Group B (Not Pell) is defined as All other students.

First Generation Student Gap is defined as:

Group A (1st Generation) is defined as Students for whom both parents' highest education level is high school or lower;

Group B (Not 1st Generation) is defined as Either parent's education code was "4-Year College Graduate" or "Post-graduate"

Excluded is defined as students whose parents attended college but did not graduate, students whose parental education status is unknown Gender Gap is defined as:

Group A (Male) is defined as Students who identify as male on their CSU application form; Group B (Female) is defined as Students who identify as female on their CSU application form.

Subgroup A-B Count module 1107 calculates the count of students in Sub-group A and Sub-group B. Module 1107 provides where Forall, ∀, Campus, student type, gap, and year of entry, a count of students in Subgroup A and Subgroup B is determined where campus is defined as any of the campuses or the System as a whole, Student Type is defined as First-Time Freshmen, or First-Time Transfer Students, and Year of Entry is defined as 1st year of enrollment at a campus.

SubGroup A-B Persisting module 1108 calculates the count of students persisting in Sub-Group A and Subgroup B. Module 1108 provides where Forall, ∀, Campus, student type, gap, and year of entry, and Persisting N years, a count of students persisting N years in Subgroup A and Subgroup B is determined where Persisting N years is defined as 1, if a student was enrolled in the fall-term N years after their first enrollment, or had graduated in a prior term, else 0.

Percentage Persisting module 1109 calculates, where Forall, ∀, Campus, student type, gap, and year of entry, and Persisting N years, the percentage of students in Subgroup A and Subgroup B as a ratio of the count of students persisting in Subgroup A to the count of students in Subgroup A, and a ratio of the count of students persisting in Subgroup B to the count of students in Subgroup B.

Persistence Gap module 1110 calculates, where Forall, ∀, Campus, student type, year of entry, and Persisting N years, the present of students persisting in subgroup a and in subgroup B.

Count Graduating A-B module 1111 calculates the count of students graduating in subgroup A and in subgroup B, where Forall, ∀, Campus, student type, gap subgroup A, year of entry, and Graduating in N years, the sum of students graduating within N years for subgroup A and for subgroup B, where if graduating within N years is defined as 1 if a student had graduated in or before the fall term N years after their first enrollment.

Percent Graduating module 1112 calculates the percentage of students graduating in subgroup A and subgroup B, where Forall, ∀, Campus, student type, year of entry, and graduating within N years, the ratio of the count of students graduating to the count of the students in subgroup A is determined, and the ratio of the count of students graduating to the count of students in subgroup B is determined.

Graduation Gap 1113 then calculates, where Forall, ∀, Campus, student type, year of entry, and graduating in N years, the percentage of students graduating in subgroup A is subtracted from the percentage of students graduating in subgroup B.

Figure 12:
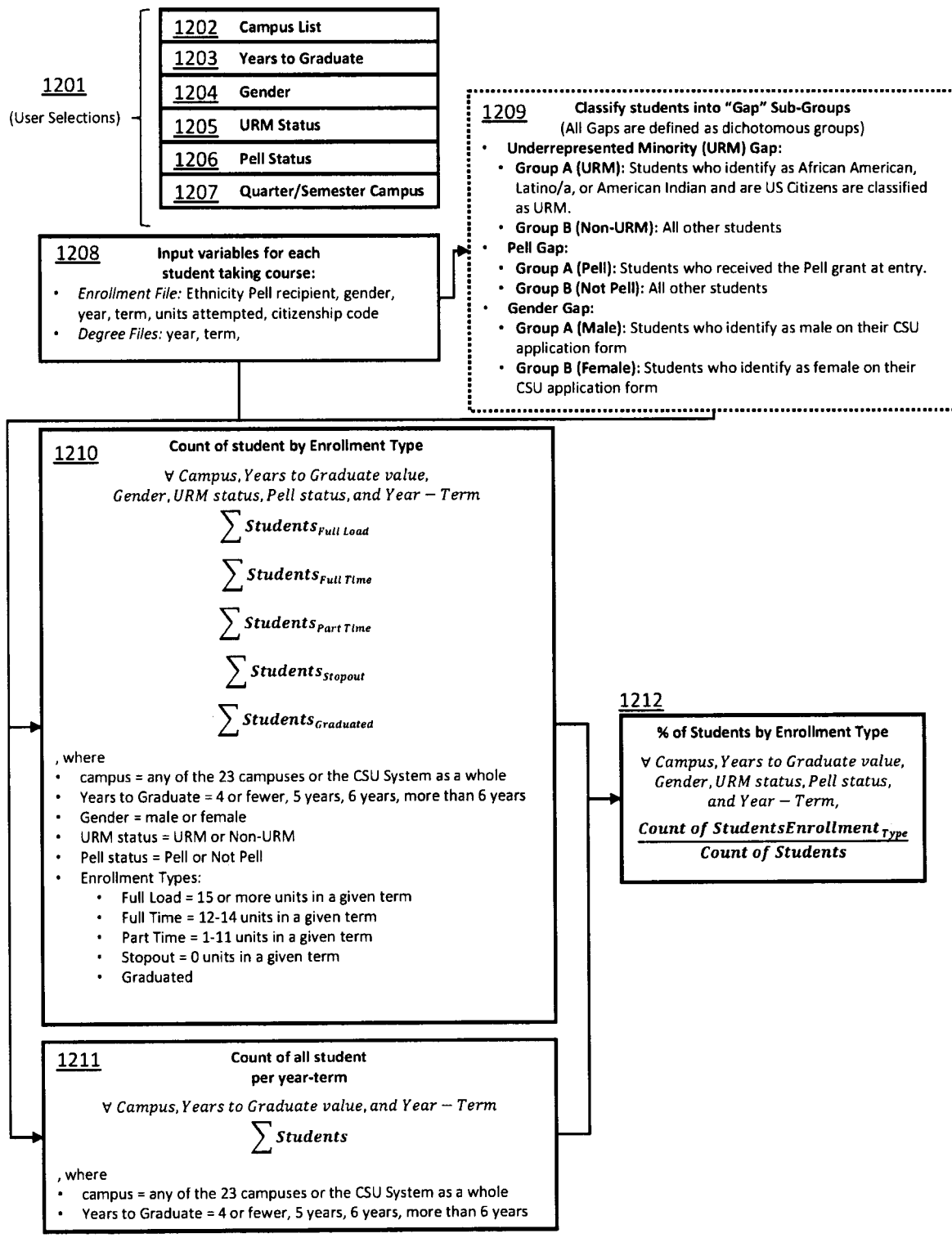
FIG. 12 is a graphic flowchart illustrating a full units load module and architecture for progress towards graduation using variables of the present invention.

FIG. 12 is a graphic flowchart illustrating a full units load module and architecture for progress towards graduation using variables of the present invention.

FIG. 12 shows the module comprising a plurality of calculation sub-modules using selected University variables for addressing the question: How Many Students are Taking Full Units Loads?

FIG. 12 shows that (User Selections) module 1201 comprises (i) Campus List module 1202, (ii) Years to Graduate module 1203, (iii) Gender Type module 1204, (iv) URM Status module 1205, (v) Pell Status module 1206, and (vi) Quarter/Semester Campus module 1207, where a user can select from a group of variables to provide an output of the full units load.

FIG. 12 shows that the FULL UNITS LOAD VARIABLES module 1208 includes variables for each student taking course, including an enrollment file and a degree file. Enrollment File includes Ethnicity, Pell recipient, gender, year, term, units attempted and citizenship code. Degree Files include year, and term.

Gap subgroup module 1209 classifies students into Gap Subgroups using URM Gap, Pell Gap, and Gender Gap.

Underrepresented Minority (URM) Gap is defined as:

Group A (URM) is defined as Students who identify as African American, Latino/a, or American Indian and are US Citizens are classified as URM; Group B (Non-URM) is defined as All other students.

Pell Gap:

Group A (Pell) is defined as Students who received the Pell grant at entry; Group B (Not Pell) is defined as All other students.

Gender Gap is defined as:

Group A (Male) is defined as Students who identify as male on their CSU application form; Group B (Female) is defined as Students who identify as female on their CSU application form.

Count by Enrollment Type module 1210 then calculates, where Forall, ∀, Campus, years to graduate value, Gender, URM status, Pell status, and Year-Term, the total # of students for the following values grouped by years to graduate, gender, urm status, pell grant status, and campus type, where campus is defined as any of the campuses or the System as a whole, where Years to Graduate is defined as 4 or fewer, 5 years, 6 years, more than 6 years, where Gender is defined as male or female, where URM status is defined as URM or Non-URM, where Pell status is defined as Pell or Not Pell, and where Enrollment Types are defined as:

Full Load (15+ units)
Full time (12-14 units)
Part Time (1-11 units)
Stopout (0 units)
Graduated.

Count Per Year-term module 1211 then provides, where Forall, ∀, Campus, years to graduate value, Gender, URM status, Pell status, and Year-Term, the sum of students where campus is defined as any of the campuses or the System as a whole, where Years to Graduate is defined as 4 or fewer, 5 years, 6 years, more than 6 years, Finally, in Percent by Enrollment module 1212, where Forall, ∀, Campus, years to graduate value, Gender, URM status, Pell status, and Year-Term, the ratio of the count of students enrolled by type to the count of students is determined.

Figure 13:
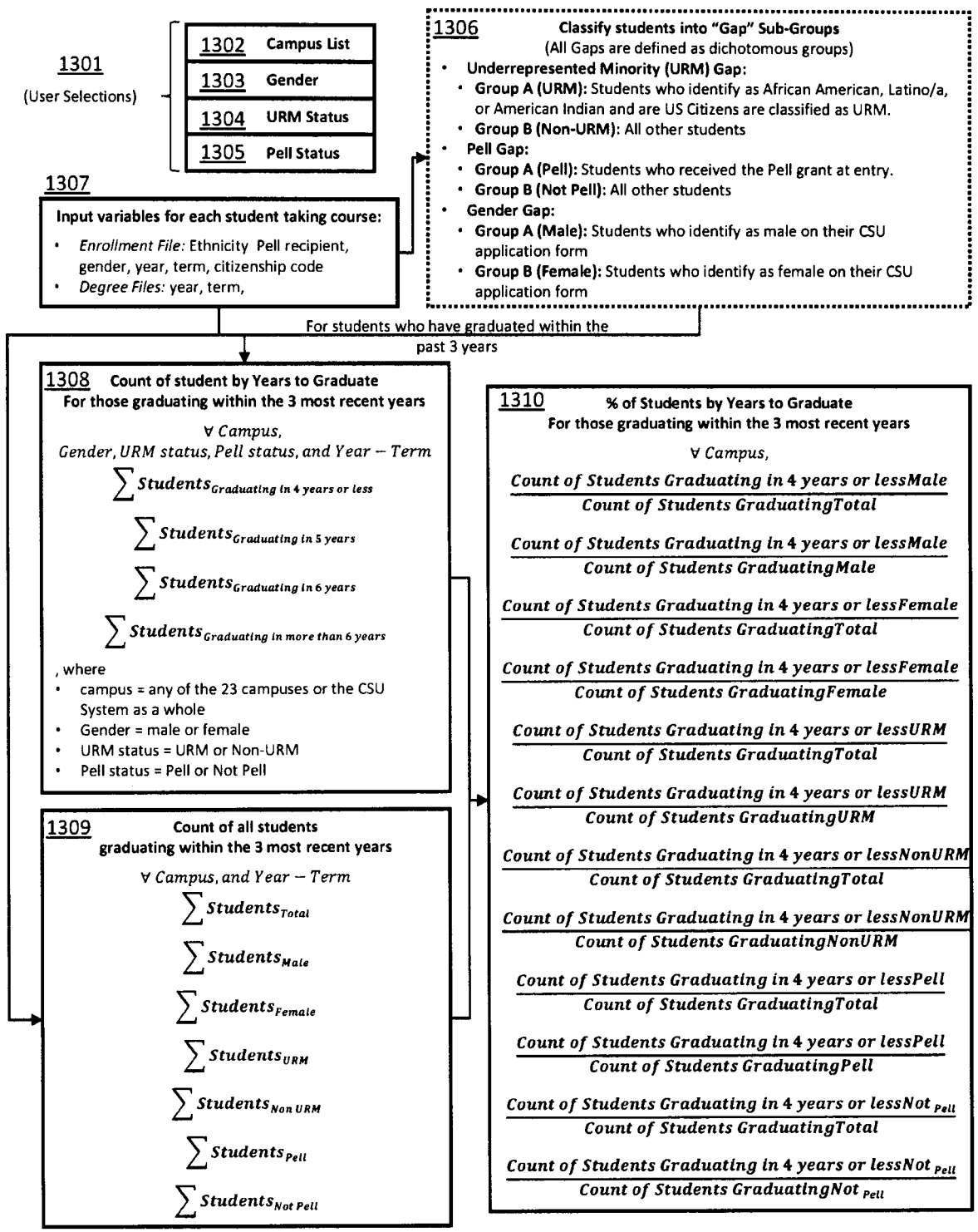
FIG. 13 is a graphic flowchart illustrating a student background vs. time to degree module and architecture for progress towards graduation using variables of the present invention.

FIG. 13 is a graphic flowchart illustrating a student background vs. time to degree module and architecture for progress towards graduation using variables of the present invention.

FIG. 13 shows the module comprising a plurality of calculation sub-modules using selected University variables for generating a display for addressing the question: How do Student Backgrounds Impact Time to Degree?

FIG. 13 shows that (User Selections) module 1301 comprises (i) Campus List module 1302, (ii) Gender Type module 1303, (iii) URM Status module 1304, and (iv) Pell Status module 1305, provides where a user can select from a group of variables to provide an output of the student background vs. time to degree.

FIG. 13 shows that the TIME TO DEGREE VARIABLES module 1307 includes variables for each student taking course, including an enrollment file and a degree file. Enrollment File includes Ethnicity, Pell recipient, gender, year, term, units attempted and citizenship code. Degree Files include year, and term.

Gap subgroup module 1306 classifies students into Gap Subgroups using URM Gap, Pell Gap, and Gender Gap.

Underrepresented Minority (URM) Gap is defined as:

Group A (URM) is defined as Students who identify as African American, Latino/a, or American Indian and are US Citizens are classified as URM; Group B (Non-URM) is defined as All other students.

Pell Gap:

Group A (Pell) is defined as Students who received the Pell grant at entry; Group B (Not Pell) is defined as All other students.

Gender Gap is defined as:

Group A (Male) is defined as Students who identify as male on their CSU application form; Group B (Female) is defined as Students who identify as female on their CSU application form.

Count by Enrollment Type module 1308 then calculates, where Forall, $\forall$, Campus, years to graduate value within the last 3 years, Gender, URM status, Pell status, and Year-Term, the total # of students for the following values grouped by years to graduate, gender, urm status, pell grant status, and campus type, where campus is defined as any of the campuses or the System as a whole, where Years to Graduate is defined as 4 or fewer, 5 years, 6 years, more than 6 years, where Gender is defined as male or female, where URM status is defined as URM or Non-URM, where Pell status is defined as Pell or Not Pell.

Then, in the Graduating in Last 3 Years module 1309, where Forall, $\forall$, Campus and Year-Term, the sum is calculated for total students, male students, female students, URM students, non-URM students, Pell students, and not-Pell students.

Finally, in Percentage Graduate in Last 3 Years module 1310, output of module 1308 and 1309 are combined to provide, where Forall, $\forall$, Campus, a series of ratios are provided, including the count of student graduating in 4 years (category) to the count of all students graduating with the category.

Figure 14:
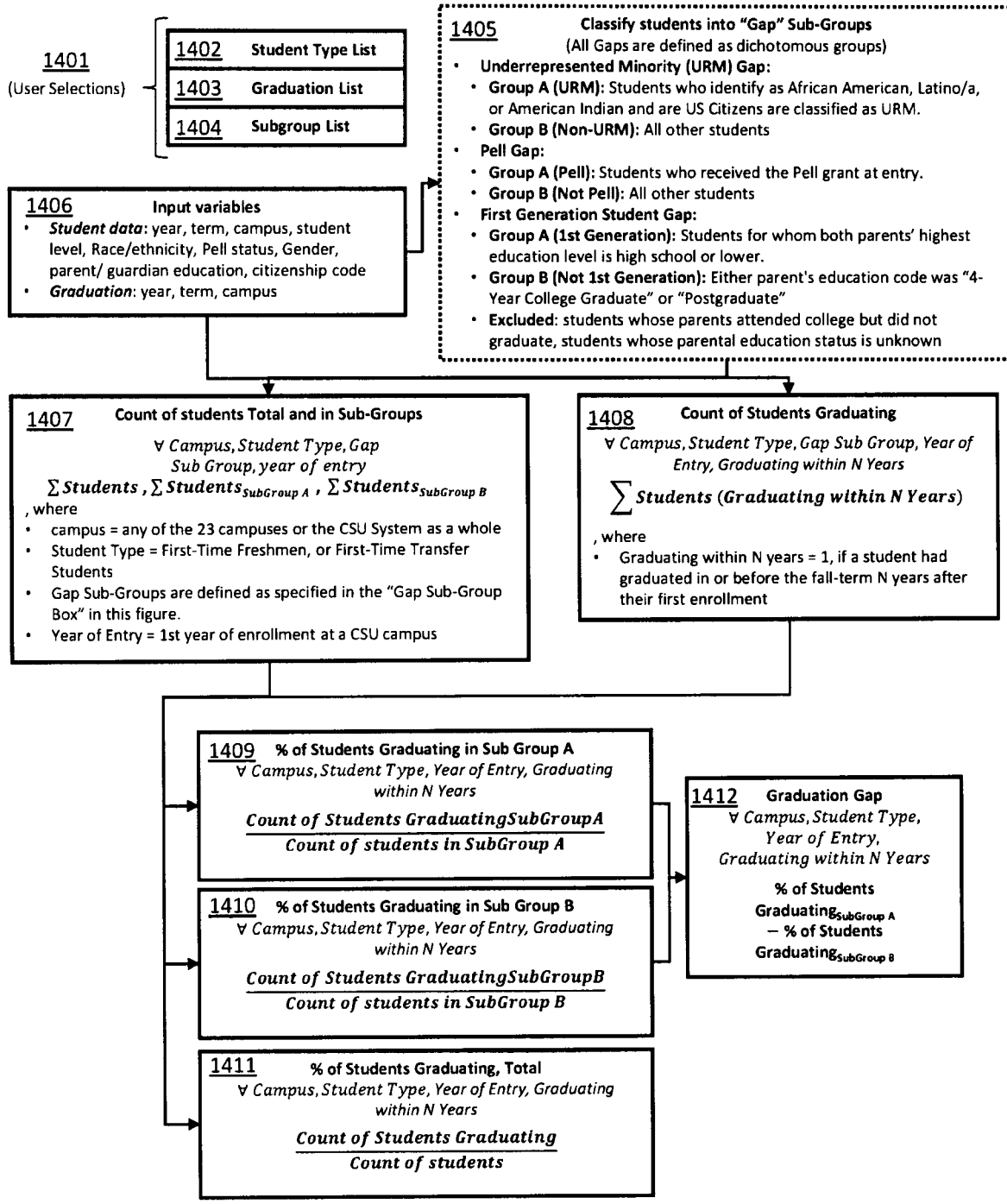
FIG. 14 is a graphic flowchart illustrating a State-wide peer comparison module and architecture for progress towards graduation using variables of the present invention.

FIG. 14 is a graphic flowchart illustrating a State-wide peer comparison module and architecture for progress towards graduation using variables of the present invention.

FIG. 14 shows the module comprising a plurality of calculation sub-modules using selected University variables for generating a display for addressing the question: How do we compare to our State-wide peers?

FIG. 14 shows that user selections module 1401 comprises (i) Student Type List module 1402, (ii) Graduation List module 1403, and (iii) a Subgroup List module 1404, provide where a user can select from a group of variables to provide an output of the State-wide peer comparison.

GAP SUB_GROUP module 1405 classifies students into Gap Subgroups using URM Gap, Pell Gap, First Generation Gap, and Gender Gap.

Underrepresented Minority (URM) Gap is defined as:

Group A (URM) is defined as Students who identify as African American, Latino/a, or American Indian and are US Citizens are classified as URM; Group B (Non-URM) is defined as All other students.

Pell Gap:

Group A (Pell) is defined as Students who received the Pell grant at entry; Group B (Not Pell) is defined as All other students.

First Generation Student Gap is defined as:

Group A (1st Generation) is defined as Students for whom both parents' highest education level is high school or lower;

Group B (Not 1st Generation) is defined as Either parent's education code was "4-Year College Graduate" or "Postgraduate".

Excluded is defined as students whose parents attended college but did not graduate, students whose parental education status is unknown.

FIG. 14 shows that the STATE WIDE PEER COMPARISON VARIABLES module 1406 includes variables selected from student data and graduation data, where Student data includes year, term, campus, student level, Race/ethnicity, Pell status, Gender, URM status, First-generation status, race/ethnicity, parent/guardian education, and citizenship code, and Graduation includes year, term, and campus.

Module 1407 provides, where Forall, $\forall$, Campus, Student Type, Gap Subgroup, and Year of entry, the sum of students, students in subgroup A, and subgroup B, where campus is defined as any of the campuses or the System as a whole, where Student Type is defined as First-Time Freshmen, or First-Time Transfer Students, where Gap Sub-Groups are defined as specified in the "Gap Sub-Group Box" in this figure, and where Year of Entry is defined as 1st year of enrollment at a campus.

Count Graduating A-B module 1408 calculates the count of students graduating, where Forall, $\forall$, Campus, student type, gap subgroup, year of entry, and Graduating in N years, the sum of students graduating within N years, where if graduating within N years is defined as 1 if a student had graduated in or before the fall term N years after their first enrollment.

Percent Graduating module 1409 calculates the percentage of students graduating in subgroup A and subgroup B and in total, where Forall, $\forall$, Campus, student type, year of entry, and graduating within N years, the ratio of the count of students graduating to the count of the students in subgroup A is determined, and the ratio of the count of students graduating to the count of students in subgroup B is determined, the ratio of the count of students graduating to the count of students is determined.

Graduation Gap 1412 then calculates, where Forall, $\forall$, Campus, student type, year of entry, and graduating in N years, the percentage of students graduating in subgroup A is subtracted from the percentage of students graduating in subgroup B.

Figure 15:
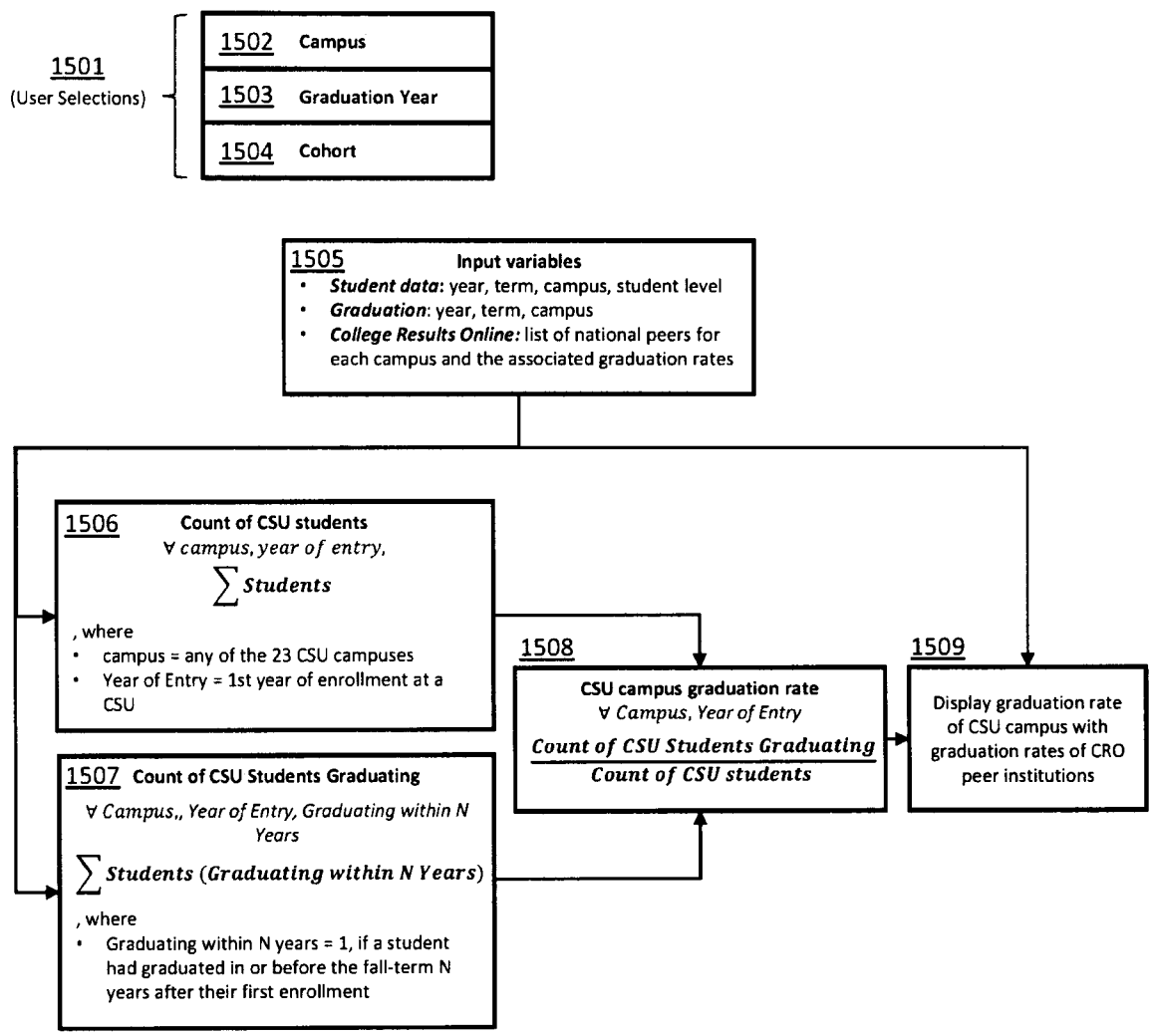
FIG. 15 is a graphic flowchart illustrating a National peer comparison module and architecture for progress towards graduation using variables of the present invention.

FIG. 15 is a graphic flowchart illustrating a National peer comparison module and architecture for progress towards graduation using variables of the present invention.

FIG. 15 shows the module comprising a plurality of calculation sub-modules using selected University variables for generating a display for addressing the question: How do we compare to our National peers?

FIG. 15 shows that user selections module 1501 comprising (i) Campus module 1502. (ii) Graduation Year module 1503 and (iii) Cohort module 1504, providers where a user can select from a group of variables to provide an output of the National peer comparison.

FIG. 15 shows that the NATIONAL PEER COMPARISON VARIABLES module 1505 includes variables includes student data, graduation data, and CRO data, where Student data includes year, term, campus, student level, Graduation includes year, term, campus, and College Results Online: is defined as a list of national peers for each campus and the associated graduation rates.

CRO National Peers Methodology

CRO applies an algorithm comparing the chosen school to all other public and private not-for-profit institutions in the CRO database. Each comparison receives a "similarity score", ranging from 0 (least similar) to 1000 (identical), based on how similar the two schools are in terms of 12 institutional and student characteristics Module 1506, where Forall, ∀, Campus, year of entry, the sum of students is calculated where campus is defined as any of the campuses, and year of entry is defined as 1st year of enrollment at the university.

Module 1507, where Forall, ∀, Campus, student type, year of entry, and graduating within N years, the sum of students graduating within N years is calculated, where graduating within N years is defined as "1" if a student had graduated in or before the fall term N year after their first enrollment.

Module 1508 then determines a campus graduation rate, where Forall, ∀, Campus, year of entry, a ratio is calculated for the total # of students graduating to the count of students.

Module 1509 then Displays distribution of graduation rate for University campus and it's national peers.

Figure 16:
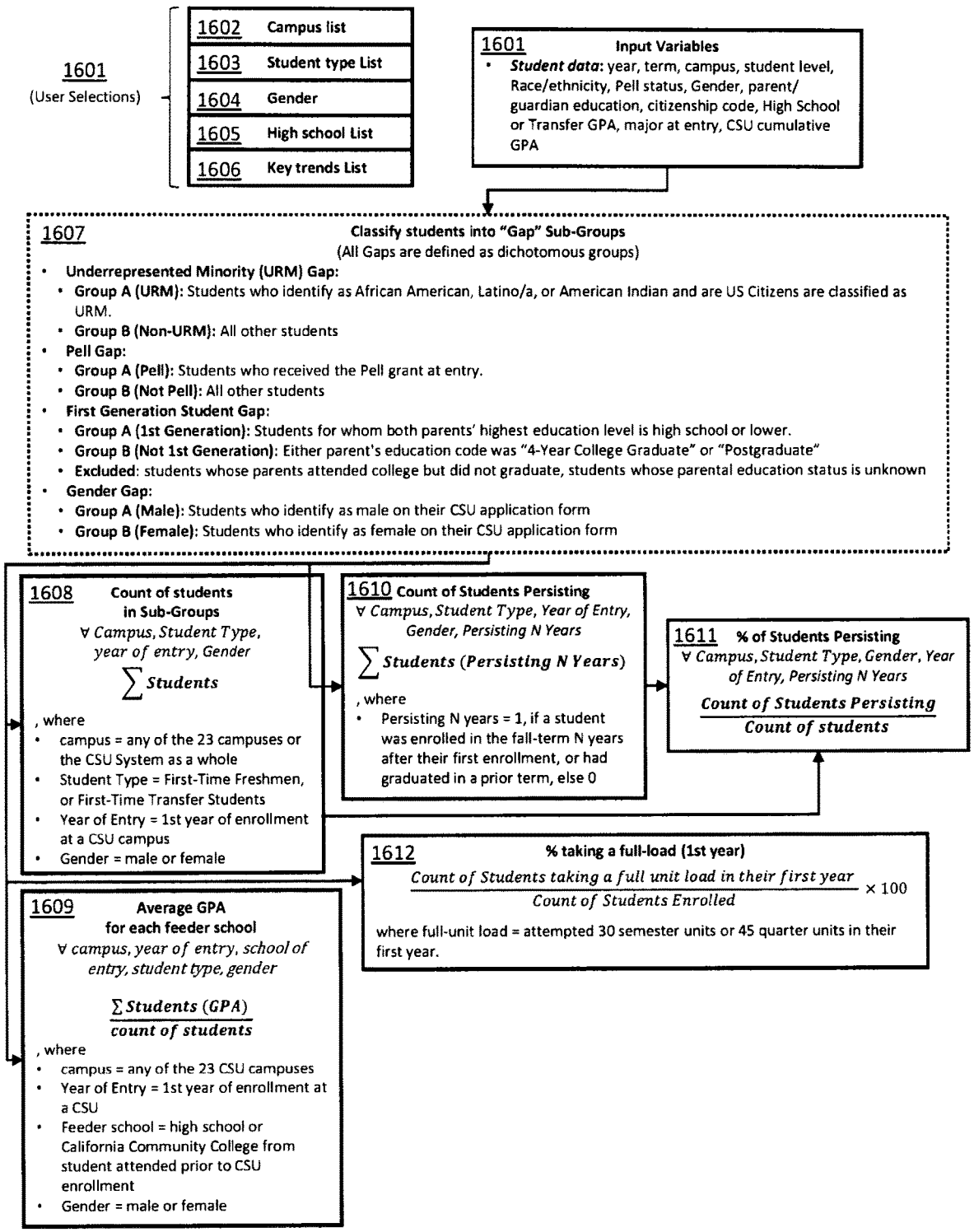
FIG. 16 is a graphic flowchart illustrating a high school and community college feeder schools module and architecture for progress towards graduation using variables of the present invention.

FIG. 16 is a graphic flowchart illustrating a high school and community college feeder schools module and architecture for progress towards graduation using variables of the present invention.

FIG. 16 shows the module comprising a plurality of calculation sub-modules using selected University variables for generating a display for addressing the question: Who are our top HS and CC Feeder Schools?

FIG. 16 shows that (User Selections) module 1600 comprises (i) Campus list module 1602, (ii) student type list module 1602, (iii) Gender List module 1604, (iv) High school List module 1605, and (v) Key trends List module 1606, which provides that a user can select from a group of variables to provide an output of the high school and community college feeder schools.

FIG. 16 shows that the HIGH SCHOOL AND COMMUNITY COLLEGE FEEDER SCHOOLS VARIABLES module 1601 includes variables of student data: year, term, campus, student level, Race/ethnicity, Pell status, Gender, URM status, First-generation status, race/ethnicity, parent/ guardian education, citizenship code, transfer GPA, major at entry University cumulative GPA.

GAP SUB_GROUP module 1607 classifies students into Gap Subgroups using URM Gap, Pell Gap, First Generation Gap, and Gender Gap.

Underrepresented Minority (URM) Gap is defined as:

Group A (URM) is defined as Students who identify as African American, Latino/a, or American Indian and are US Citizens are classified as URM; Group B (Non-URM) is defined as All other students.

Pell Gap:

Group A (Pell) is defined as Students who received the Pell grant at entry; Group B (Not Pell) is defined as All other students.

First Generation Student Gap is defined as:

Group A (1st Generation) is defined as Students for whom both parents' highest education level is high school or lower;

Group B (Not 1st Generation) is defined as Either parent's education code was "4-Year College Graduate" or "Postgraduate".

Excluded is defined as students whose parents attended college but did not graduate, students whose parental education status is unknown.

Gender is defined on the entry submitted in the student application form.

Module 1608 provides, where Forall, ∀, Campus, Student Type, Year of entry, and Gender, the sum of students, where campus is defined as any of the campuses or the System as a whole, where Student Type is defined as First-Time Freshmen, or First-Time Transfer Students, where Year of Entry is defined as 1st year of enrollment at a campus, and wherein gender is defined as male or female.

Module 1609 provides, where Forall, ∀, Campus, Student Type, Year of entry, student type, and Gender, the sum of students GPA divided by the count of students.

Module 1610 provides, where Forall, ∀, Campus, Student Type, Year of entry, Gender, and persisting N years, the sum of students persisting N years.

Module 1611 provides, where Forall, ∀, Campus, Student Type, Year of entry, Gender, and Persisting N years, the count of students persisting divided by the count of students.

Module 1612 then provides the percentage of students taking a full load in their first year, by dividing the count of student taking a full unit load in their first years by the count of students enrolled and multiplying the result by 100, where a full unit load is defined as attempted 30 semester units or 45 quarter units in their first year.

Figure 17:
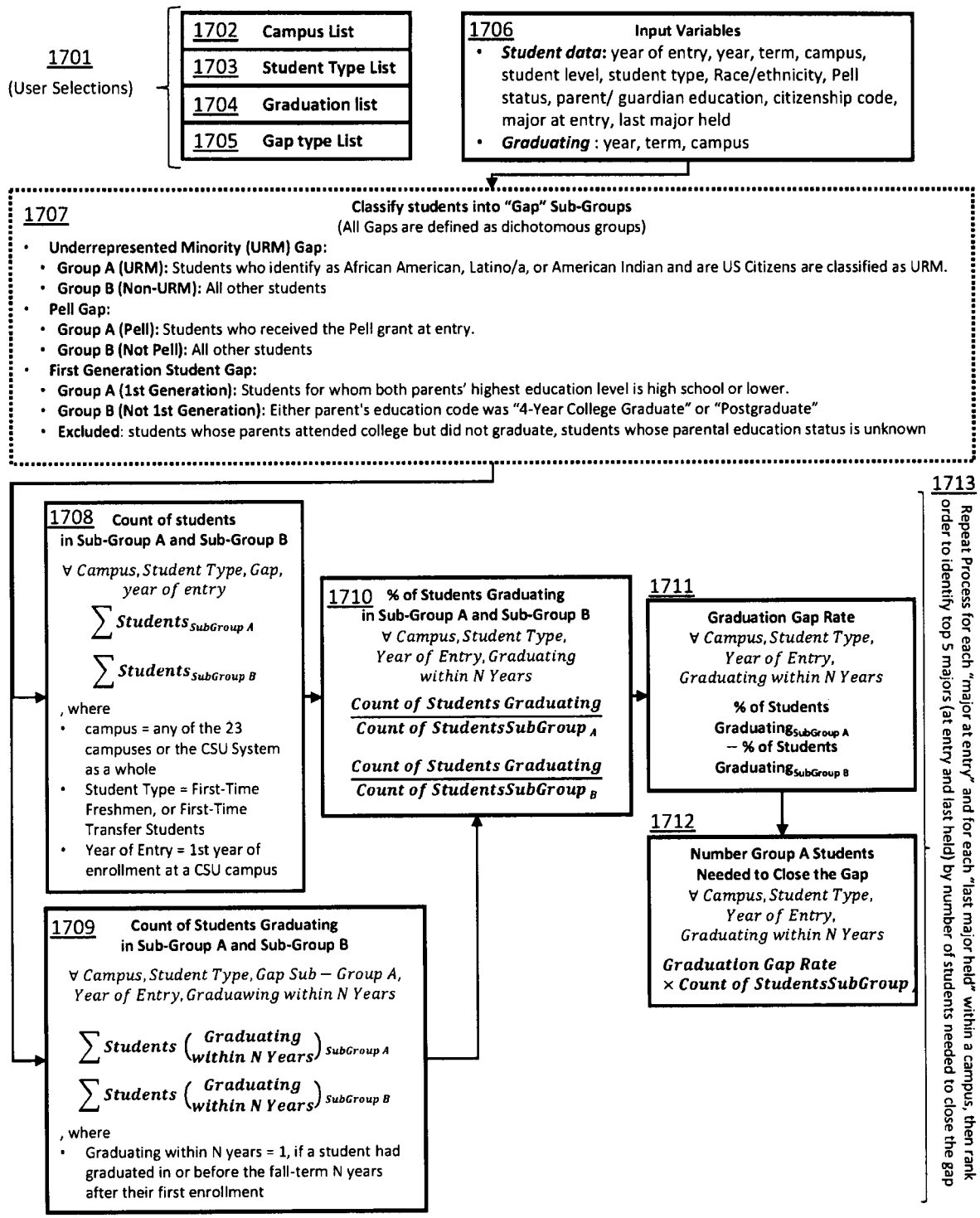
FIG. 17 is a graphic flowchart illustrating an equity gap by campus module and architecture for progress towards graduation using variables of the present invention.

FIG. 17 is a graphic flowchart illustrating an equity gap by campus module and architecture for progress towards graduation using variables of the present invention.

FIG. 17 shows Equity Dashboard [1] and shows the module comprising a plurality of calculation sub-modules using selected University variables for generating a display for addressing the question: What Does the Equity Gap Look Like on My Campus?

FIG. 17 shows that user selections module 1701 comprises (i) Campus List module 1702 (ii) Student Type List module 1703 (iii) Graduation list module 1704, and (iv) Gap type List module 1705, which provides that a user can select from a group of variables to provide an output of the equity gap by campus.

FIG. 17 shows that the EQUITY GAPS BY CAMPUS VARIABLES module 1706 includes variables of: Student data: year, term, campus, student level, student type, Pell status, Gender, URM status, First-generation status; and Graduation data: year, term, campus.

Module 1707 shows how to classify students into gap subgroups. All gaps are defined as dichotomous groups. Under represented minority URM gap comprises Group A who are students who identify as African-American, Latino, or American Indian, and are US citizens, and Group B non-URM is comprised of all other students. Pell gap is divided into group A and group B. Group A are students who received the Pell grant at entry. Group B are all other students. First generation student gap comprises group A students for whom both parents highest education level is high school or lower, or group B where either parents education code was four year college graduate or postgraduate. Excluded from this group are students whose parents attended college but did not graduate, and students whose parental education status is unknown.

Module 1708 receives the output from 1707 and provides the count of students in subgroup a and subgroup b. For all campus, student type, gap, and year of entry, the Sum of the students in subgroup a, and the Sum of students in subgroup B, is calculated, where campus is defined as any of the campuses or the system as a whole, where students type is defined as first time freshman or first time transfer students, and where year of entry is defined as first year of enrollment at a campus.

Module 1709 receives the output from 1707 and provides the Count of students graduating in subgroup a and subgroup b. For all campus, student type, gap subgroup a, year of entry, and graduating within N years, the Sum of the students graduating within N years in subgroup a, and the Sum of students graduating within N years in subgroup B, is calculated, where graduating within N years is defined as 1 if a student had graduated in or before the fall term N years after their first enrollment.

Module 1710 provides the percent of students graduating in subgroup a and subgroup b. For all campus, student type, year of entry, and graduating within N years, the number of students graduating as a ratio of the Number of students in subgroup a, and the number of students graduating as a ratio of the number of students in subgroup b, is calculated.

Module 1711 then takes the output from module 1710 to calculate a graduation gap rate. For all campus, student type, year of entry, and graduating within N years, the percentage of students graduating in sub group B is subtracted from the percentage of students graduating in sub group a.

Module 1712 is then able to provide the number of group a students needed to close the gap. For all campus, student type, year of entry, and graduating within N years, the graduation gap rate is multiplied by the number of students in subgroup a.

Module 1713 then calculates the Total students needed to reduce the equity gap to 0 for each major at entry, which is delivered to module 1711 Close the gap, which also receives input from module 1710.

Figure 18:
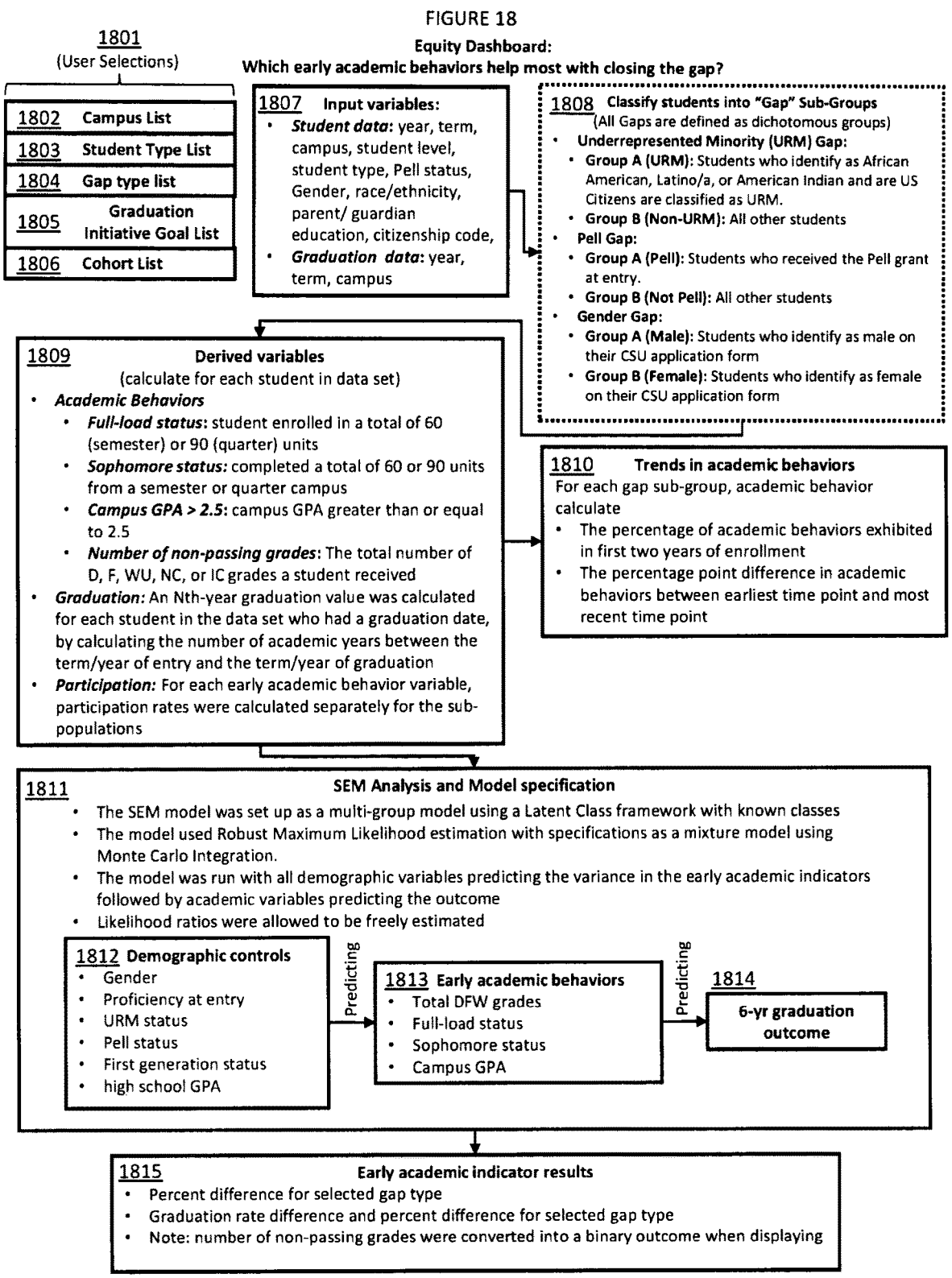
FIG. 18 is a graphic flowchart illustrating an academic behaviors module and architecture for progress towards graduation using variables of the present invention.

FIG. 18 is a graphic flowchart illustrating an academic behaviors module and architecture for progress towards graduation using variables of the present invention.

FIG. 18 shows Equity Dashboard [2] and shows the module comprising a plurality of calculation sub-modules using selected University variables for generating a display for addressing the question: Which early academic behaviors help most with closing the gap?

FIG. 18 shows that user selections module 1801 comprises (i) Campus List module 1802, (ii) Student Type List module 1803, (iii) Gap type list module 1804, (iv) Graduation Initiative Goal List module 1805, and (v) Cohort List module 1806, which provides that a user can select from a group of variables to provide an output of the academic behaviors.

FIG. 18 shows that the ACADEMIC BEHAVIORS VARIABLES module 1807 includes variables of: (1) Student data: year, term, campus, student level, student type, Pell status, Gender, URM status, First-generation status, race/ethnicity, parent/guardian education, citizenship code; and Graduation data: year, term, campus; and (2) Gap type: First-generation status, URM status, Pell status.

Module 1808 shows how to classify students into gap subgroups. All gaps are defined as dichotomous groups. Under represented minority URM gap comprises Group A who are students who identify as African-American, Latino, or American Indian, and are US citizens, and Group B non-URM is comprised of all other students. Pell gap is divided into group A and group B. Group A are students who received the Pell grant at entry. Group B are all other students. Gender gap comprises group A students who identify as male, or group B who identify as female.

Derived variables module 1809 receives input from module 1807 and generates: Full-load status: student enrolled in a total of 60 (semester) or 90 (quarter) units; Sophomore status: completed a total of 60 or 90 units from a semester or quarter campus; Campus GPA>2.5: campus GPA greater than or equal to 2.5; Number of non-passing grades: The total number of D, F, WU, NC, or IC grades a student received; Graduation: An Nth-year graduation value was calculated for each student in the data set who had a graduation date, by calculating the number of academic years between the term/year of entry and the term/year of graduation; and Participation: For each early academic behavior variable, participation rates were calculated separately for the sub-populations.

Trends in academic behaviors module 1810 receives output from module 1809, and then For each gap type, calculates: the percentage of academic behaviors exhibited in first two years of enrollment; and the percentage point difference in academic behaviors between earliest time point and most recent time point.

Module 1811 provides SEM Analysis and Model specification to receive the output from module 1809 and generate multiple predictive outputs. The SEM model was set up as a multi-group model using a Latent Class framework with known classes. The model used Robust Maximum Likelihood estimation with specifications as a mixture model using Monte Carlo Integration. The model was run with all demographic variables predicting the variance in the early academic indicators followed by academic variables predicting the outcome. Likelihood ratios were allowed to be freely estimated.

Module 1812, within module 1810 generates Demographic controls selected from: Gender, Proficiency at entry, URM status, Pell status, First generation status, and high school GPA.

Module 1813 receives output from 1812 and calculates Early academic behaviors, including: Total DFW grades, Full-load status, Sophomore status, and Campus GPA.

Module 1814 then receives output from module 1813 and generates a 6-yr graduation outcome.

In module 1815, the entire SEM module 1810 then outputs to provide Early academic indicator results, including: Percent difference for selected gap type, and the Graduation rate difference and percent difference for selected gap type. Note that the number of non-passing grades are converted into a binary outcome when displaying.

Figure 19:
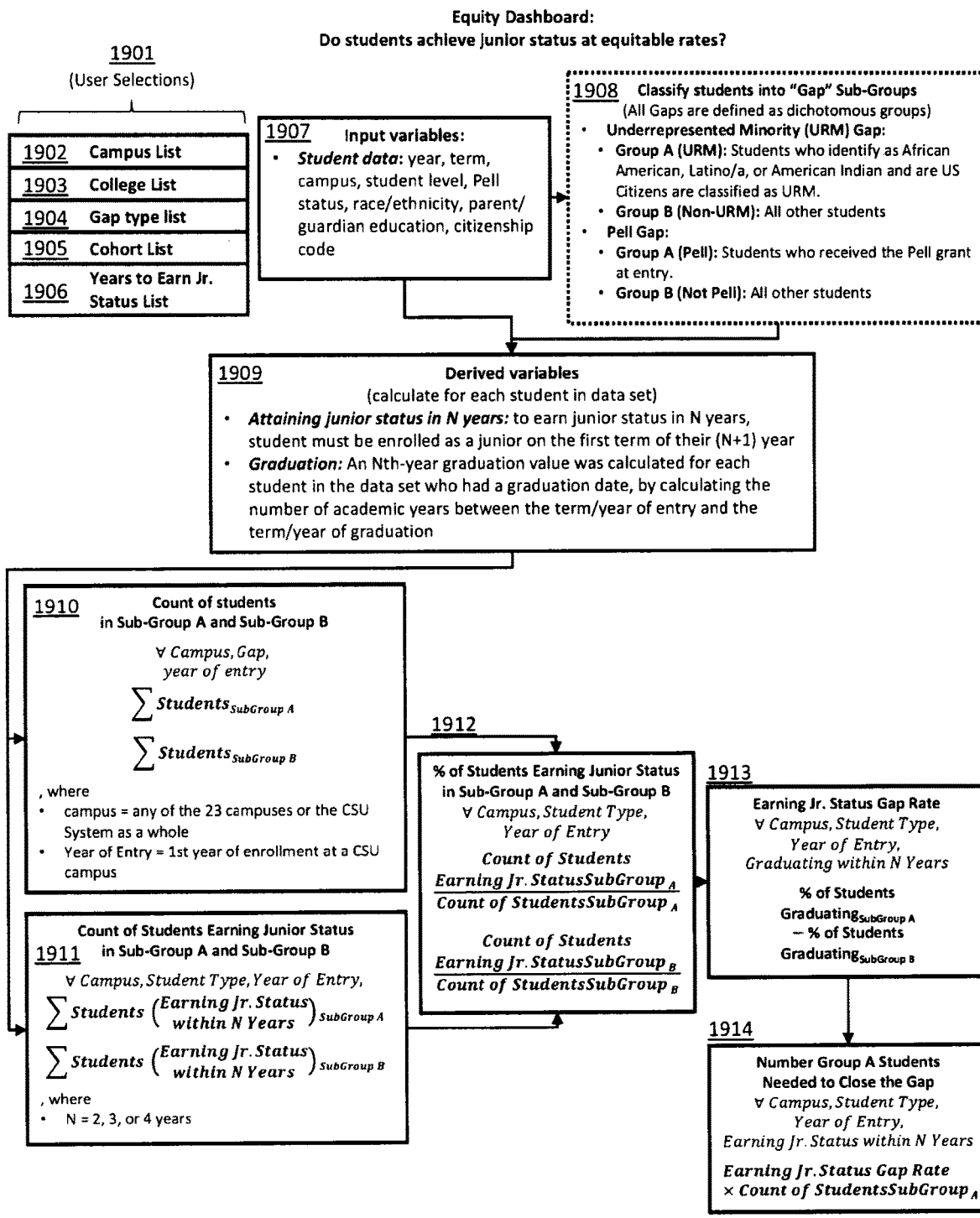
FIG. 19 is a graphic flowchart illustrating a junior status achievement module and architecture for progress towards graduation using variables of the present invention.

FIG. 19 is a graphic flowchart illustrating a junior status achievement module and architecture for progress towards graduation using variables of the present invention.

FIG. 19 shows Equity Dashboard [3] and shows the module comprising a plurality of calculation sub-modules using selected University variables for generating a display for addressing the question: Do students achieve junior status at equitable rates?

FIG. 19 shows that user selections module 1901 comprises (i) Campus List module 1902 (ii) College List module 1903 (iii) Gap type List module 1904 (iv) Cohort List module 1905, and (v) Student level List module 1906, which provides that a user can select from a group of variables to provide an output of the junior status achievement.

FIG. 19 shows that the JUNIOR STATUS ACHIEVEMENT VARIABLES module 1907 includes variables of: Student data: year, term, campus, student level, Pell status, Gender, URM status, First-generation status, race/ethnicity, parent/guardian education, citizenship code.

Module 1908 shows how to classify students into gap subgroups. All gaps are defined as dichotomous groups. Under represented minority URM gap comprises Group A who are students who identify as African-American, Latino, or American Indian, and are US citizens, and Group B non-URM is comprised of all other students. Pell gap is divided into group A and group B. Group A are students who received the Pell grant at entry. Group B are all other students.

Module 1909 then provides derived variables from the combined received output from 1907 and 1908 by calculating for each data set: Attaining junior status in N years: to earn junior status in N years, student must be enrolled as a junior on the first term of their (N+1) year; and Graduation: An Nth-year graduation value was calculated for each student in the data set who had a graduation date, by calculating the number of academic years between the term/year of entry and the term/year of graduation.

Module 1910 then provides the number of students in subgroup a and subgroup b, by adding up the students in subgroup a and adding the students in subgroup b for all campus, gap, and year of entry, where campus is defined as any of the campuses or the system as a whole, and year of entry is defined as the first year of enrollment at a campus.

Module 1911 then calculates the number of students earning junior status in subgroup a and subgroup b. For all campus, gap, and year of entry, the module adds up the number of students in sub group a earning junior status within N years, and adds up the number of students in sub group b earning junior status within N years, where N is 2, 3, or 4-years.

Module 1912 then calculate the percentage of students earning junior status in subgroup a and subgroup b. For all campus, gap, and year of entry, the module calculates the ratio of the Count of students earning junior status in subgroup a to the count of students in subgroup a, and the module calculates the ratio of the Count of students earning junior status in subgroup b to the count of students in subgroup b.

Module 1913 then provides the gap rate for students earning junior status. For all campus, gap, and year of entry, and graduating within N years, the module subtracts the percentage of students graduating in subgroup b from the percentage of students graduating in sub group a.

Module 1914 is then able to provide the number of group a students needed to close the gap. For all campus, student type, year of entry, and earning Jr. status within N years, the Earning Jr. status gap rate is multiplied by the number of students in subgroup a.

Figure 20:
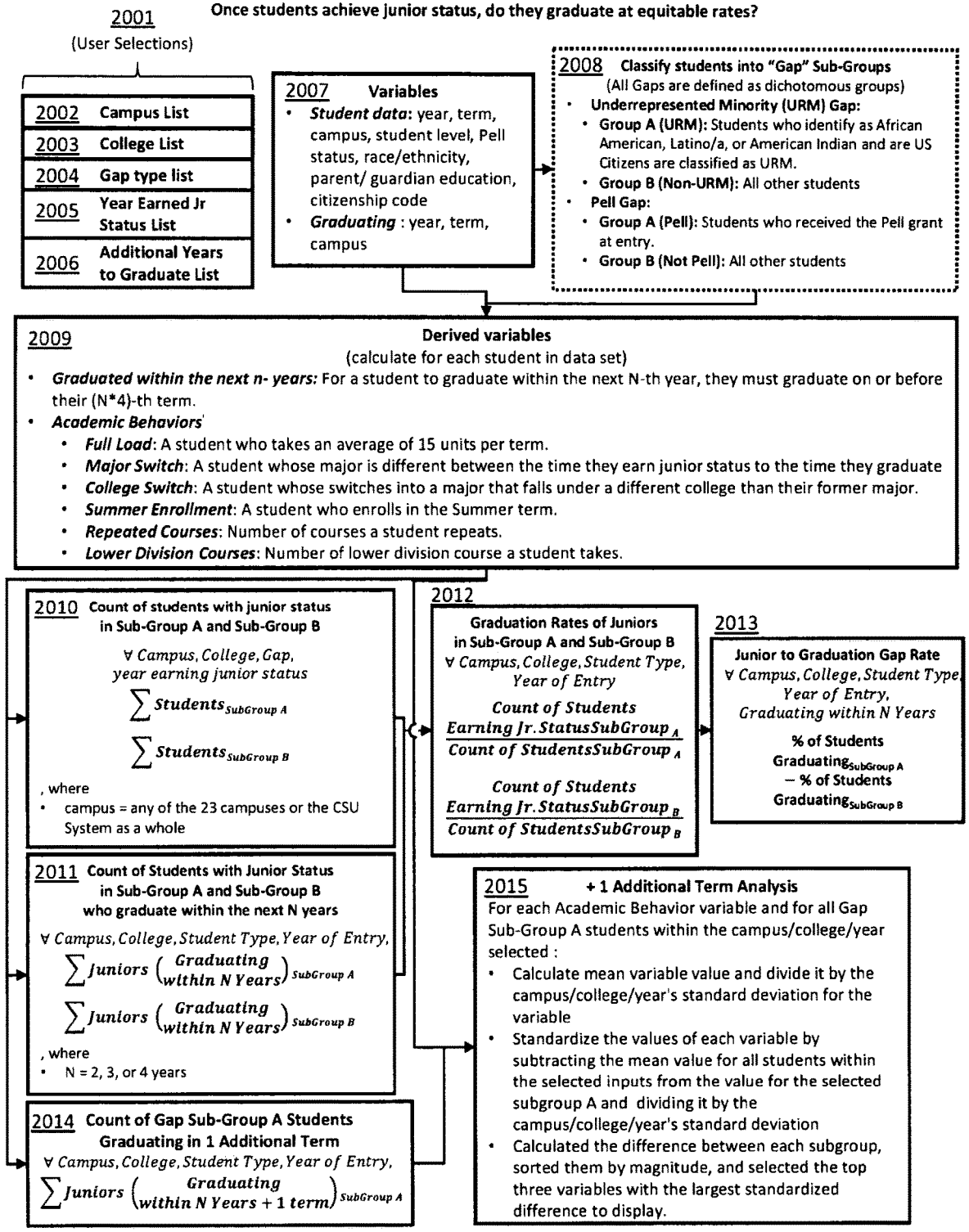
FIG. 20 is a graphic flowchart illustrating a post-junior status module and architecture for progress towards graduation using variables of the present invention.

FIG. 20 is a graphic flowchart illustrating a post-junior status module and architecture for progress towards graduation using variables of the present invention.

FIG. 20 shows an Equity gap module, and specifically shows the module comprising a plurality of calculation sub-modules using selected University variables for generating a display for addressing the question: Once students achieve junior status, do they graduate at equitable rates?

FIG. 20 shows that user selections module 2001 comprises (i) Campus List module 2002 (ii) College List module 2003 (iii) Gap type List module 2004, (iv) Junior status List module 2005, and (v) Graduation List module 2006, which provides that a user can select from a group of variables to provide an output of the post-junior status.

FIG. 20 shows that the POST-JUNIOR STATUS VARIABLES module 2007 includes variables for: Student data: year, term, campus, student level, Pell status, Gender, URM status, First-generation status, race/ethnicity, parent/guardian education, citizenship code; and for Graduating: year, term, campus.

Module 2008 shows how to classify students into gap subgroups. All gaps are defined as dichotomous groups. Under represented minority URM gap comprises Group A who are students who identify as African-American, Latino, or American Indian, and are US citizens, and Group B non-URM is comprised of all other students. Pell gap is divided into group A and group B. Group A are students who received the Pell grant at entry. Group B are all other students.

Module 2009 Derived variables then receives the output from 2007 and 2008 to generate: (1) Graduation within the next n-years: For a student to graduate within the next N-th year, they must graduate on or before their (N*4)-th term; and (2) Academic behaviors comprising: Full Load: A student who takes an average of 15 units per term; Major Switch: A student whose major is different from the time they achieve junior status to the time the receive their degree; College Switch: A student whose switches into a major that falls under a different college than their former major; Summer Enrollment: A student who enrolls in the Summer term; Repeated Courses: Number of courses a student repeats; and Lower Division Courses: Number of lower division course a student takes.

Module 2010 Analysis then receives the output from Module 2009 to provide the number of students in subgroup a and subgroup b, by adding up the students in subgroup a and adding the students in subgroup b for all campus, gap, and year of entry, where campus is defined as any of the campuses or the system as a whole.

Module 2011 then calculates the number of students earning junior status in subgroup a and subgroup b who graduate within N years. For all campus, gap, and year of entry, the module adds up the number of students in sub group a earning junior status graduating within N years, and adds up the number of students in sub group b earning junior status graduating within N years, where N is 2, 3, or 4-years.

Module 2012 then calculate the percentage of graduating students earning junior status in subgroup a and subgroup b. For all campus, gap, and year of entry, the module calculates the ratio of the Count of students earning junior status in subgroup a to the count of students in subgroup a, and the module calculates the ratio of the Count of students earning junior status in subgroup b to the count of students in subgroup b.

Module 2013 then provides the gap rate for graduating students earning junior status. For all campus, gap, and year of entry, and graduating within N years, the module subtracts the percentage of students graduating in subgroup b from the percentage of students graduating in sub group a.

Module 2014 is then able to provide the number of group a students needed to close the gap. For all campus, student type, year of entry, and calculating Juniors graduating within N years+1 for subgroup a.

Module 2015 then provides a+1 additional term analysis, for each Academic Behavior variable and for all Gap Sub-Group A students within the campus/college/year selected. The module performs these functions: Calculate mean variable value and divide it by the campus/college/year's standard deviation for the variable; Standardize the values of each variable by subtracting the mean value for all students within the selected inputs from the value for the selected subgroup A and dividing it by the campus/college/year's standard deviation; and Calculate the difference between each subgroup, sorting them by magnitude, and selecting the top three variables with the largest standardized difference to display.

Figure 21:
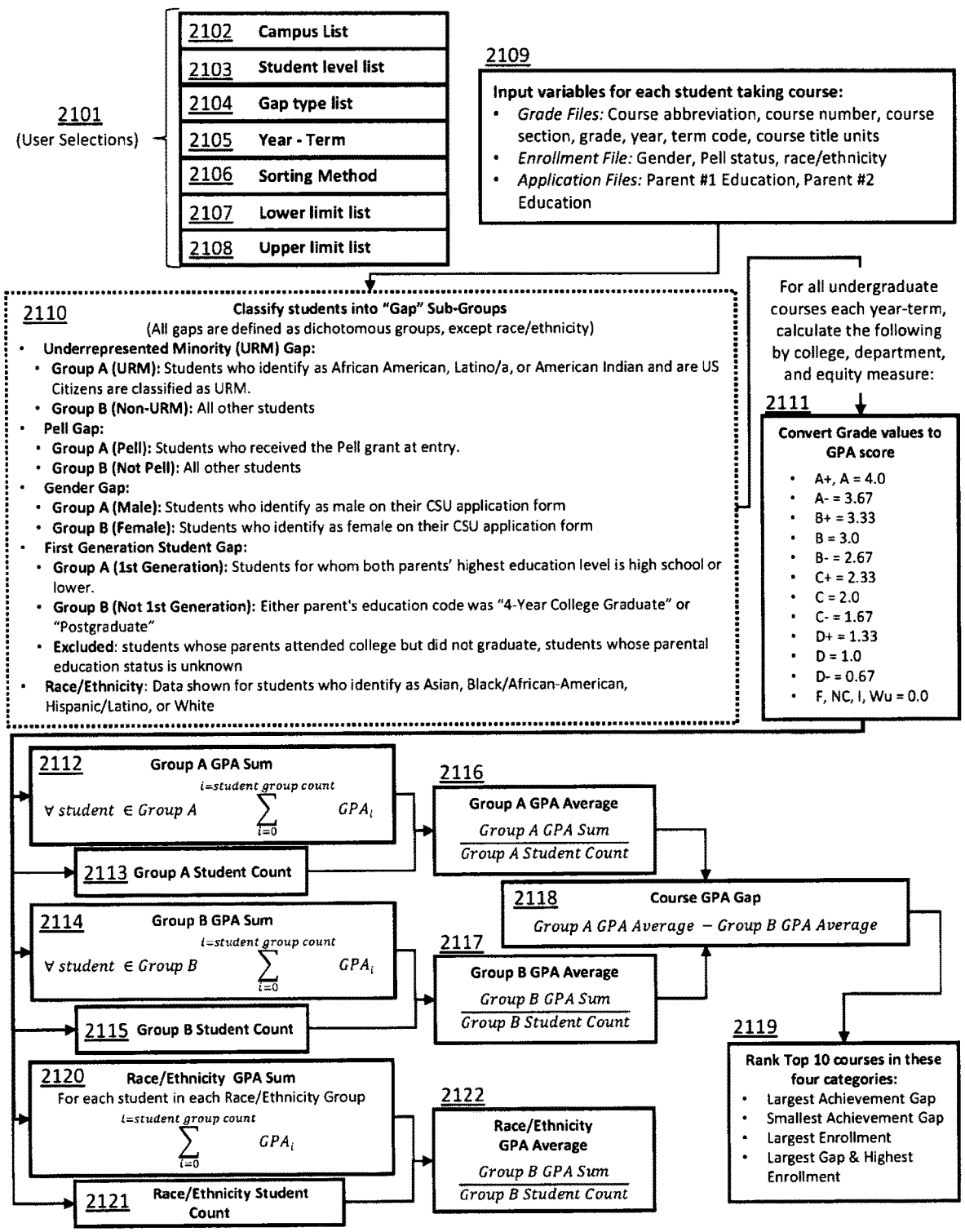
FIG. 21 is a graphic flowchart illustrating a GPA equity gap by course module and architecture for progress towards graduation using variables of the present invention.

FIG. 21 is a graphic flowchart illustrating a GPA equity gap by course module and architecture for progress towards graduation using variables of the present invention.

FIG. 21 shows an Equity Dashboard [4] and shows the module comprising a plurality of calculation sub-modules using selected University variables for generating a display for addressing the question: Which Courses Have the Largest GPA Equity Gaps?

FIG. 21 shows that user selections module 2101 comprises (i) Campus List module 2102 (ii) Student level List module 2103 (iii) Gap type List module 2104, (iv) Year-term module 2105, (v) Sorting method module 2106, (vi) Lower limit List module 2107, and (vii) Upper limit List module 2108, which provides that a user can select from a group of variables to provide an output of the GPA equity gap by course and the Which Courses Have the Largest GPA Equity Gaps query.

FIG. 21 shows that the GPA EQUITY GAP BY COURSE VARIABLES module 2109 is calculated where Forall, ∀, undergraduate courses each year-term, the variables are calculated by college, department, and equity measure. The variables include, for each student taking course: Grade Files: Course abbreviation, course number, course section, grade, year, term code, course title units; Enrollment File: Ethnicity, Pell recipient; and Application Files: Parent #1 Education, Parent #2 Education.

Module 2110 Gap type variables receives output from 2109 and generates: First-generation status; URM status; Pell status; Gender; and Race/ethnicity.

Module 2111 Gaps by GPA, then calculates, Forall, ∀, undergraduate courses each year-term, the variables are calculated by college, department, and equity measure.

Modules 2112/2113 and modules 2114/2115 provide, For each subgroup within each gap type, the average GPA was calculated by first converting the grades into GPA, summing the GPA, then dividing the total GPA by the number of the students in each equity measure.

Module 2118 Gap was calculated by taking the average GPA from students who were classified as a specific gap type in 2116 and 2117 URM, Pell, First Gen, Gender, Female.

Module 2120/2121 the calculates Gaps by Ethnicity and Gender, calculates for URM gap type choice, average GPA is calculated for each ethnicity: White, Asian, Black, and Latino/a. to obtain in module 2122 the ethnicity/race GPA average.

Module 2119 then receives the output from 2118 and provides that Top 10 courses are displayed based on user selection options of: Largest Achievement Gap; Smallest Achievement Gap; Largest Enrollment; and Largest Gap & Highest Enrollment.

Figure 22:
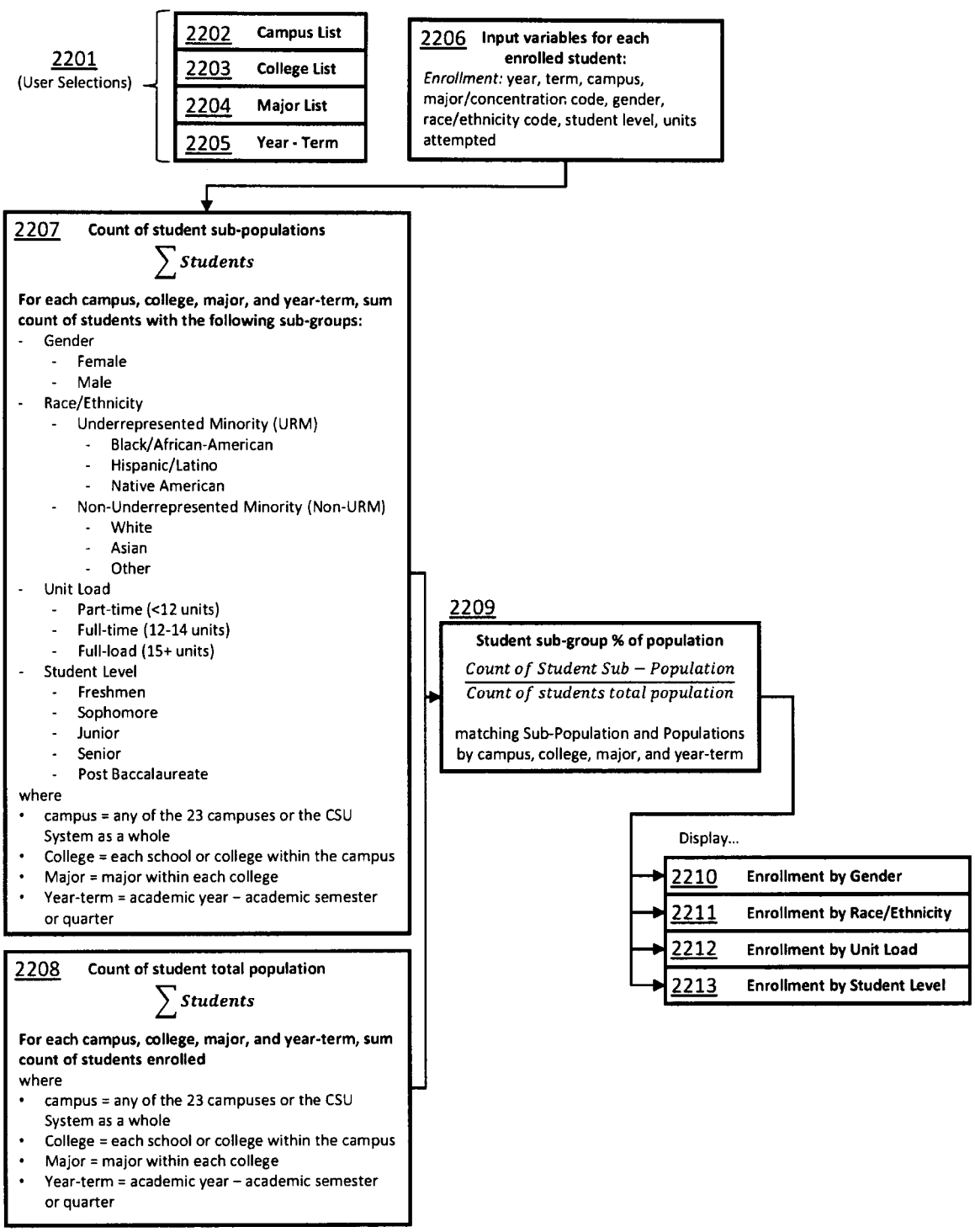
FIG. 22 is a graphic flowchart illustrating a faculty view of student-type module and architecture for progress towards graduation using variables of the present invention.

FIG. 22 is a graphic flowchart illustrating a faculty view of student-type module and architecture for progress towards graduation using variables of the present invention.

FIG. 22 shows Faculty module, and specifically shows the module comprising a plurality of calculation sub-modules using selected University variables for generating a display for addressing the question: Who Are My Students?

FIG. 22 shows that user selections module 2201 comprises (i) Campus List module 2202 (ii) College List module 2203 (iii) Major List module 2204, and (iv) Year-Term module 2205, which provides that a user can select from a group of variables to provide an output of the Who Are My Students query.

FIG. 22 shows that the FACULTY VIEW OF STUDENT TYPE VARIABLES module 2206 includes Enrollment: year, term, campus, major/concentration code, sex code, race/ethnicity code, student level, units attempted.

Module 2207 then receives output from 2206 and generates, for each year-term, sum count of students with the following variable values: Gender—Female or Male; Ethnicity—White, Asian, Black, LatinX, Native American, Other; Unit Load—Part-time (<12 units), Full-time (12-14 units)—Full-load (15+ units); Student Level—Freshmen, Sophomore, Junior, Senior, Post Bacc., where campus is defined as any of the campuses or the System as a whole, College is defined as each school or college within the campus, Major is defined as major within each college, and Year-term is defined as academic year—academic semester or quarter.

Module 2208 the provides the Count of student total population. For each campus, college, major, and year-term, sum count of students enrolled where campus is defined as any of the campuses or the System as a whole, College is defined as each school or college within the campus, Major is defined as major within each college, and Year-term is defined as academic year—academic semester or quarter.

Module 2209 provides the calculation to Divide total number by total number of students enrolled per year term.

This output is then used to generate a Display comprising:
Module 2210 Enrollment by Gender;
Module 2211 Enrollment by Ethnicity;
Module 2212 Enrollment by Unit Load; and
Module 2213 Enrollment by Student Level.

Figure 23:
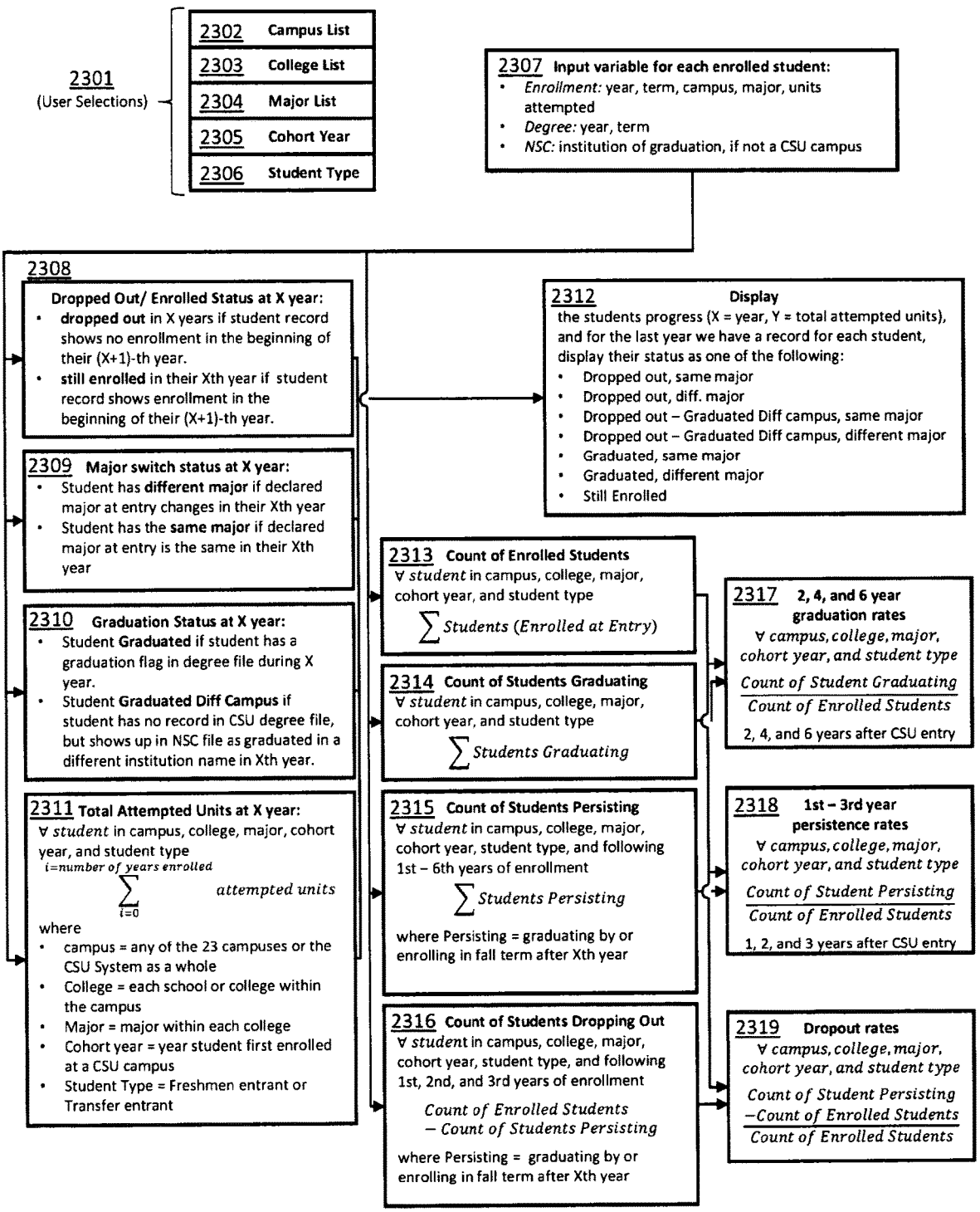
FIG. 23 is a graphic flowchart illustrating a faculty-view progress rate module and architecture for progress towards graduation using variables of the present invention.

FIG. 23 is a graphic flowchart illustrating a faculty-view progress rate module and architecture for progress towards graduation using variables of the present invention.

FIG. 23 shows Faculty module, and specifically shows the module comprising a plurality of calculation sub-modules using selected University variables for generating a display for addressing the question: How Quickly Do They Progress?

FIG. 23 shows that user selections module 2301 comprises (i) Campus List module 2302, (ii) College List module 2303, (iii) Major List module 2304, (iv) Cohort Year module 2305, and (v) Student Type module 2306, which provides that a user can select from a group of variables to provide an output of the How Quickly Do They Progress query.

FIG. 23 shows that the FACULTY VIEW PROGRESS RATE VARIABLES module 2307 includes variables for each enrolled student: Enrollment: year, term, campus, major/concentration code, GPA, units attempted; Degree: year, term; and NSC: college graduated.

Module 2308 then provides the number Dropped Out/ Enrolled Status at X year, where dropped out in X years if student record shows no enrollment in the beginning of their (X+1)-th year; and still enrolled in their Xth year if student record shows enrollment in the beginning of their (X+1)-th year.

Module 2309 provides Major switch status at X year, where if Student has different major if declared major at entry changes in their Xth year; and Student has the same major if declared major at entry is the same in their Xth year.

Module 2310 provides Graduation Status at X year, where a is consider Student Graduated if student has a record in degree file during X year; and Student Graduated Diff Campus if student has no record in University degree file, but shows up in NSC file as graduated in a different college name in Xth year.

Module 2311 provides Total Attempted Units at X year, where Sum of attempted units from matriculation date to the student's Xth year. is calculated $\forall$ students in campus, college, major, cohort year, and student type, and i is the number of years enrolled and ii=0, where campus is defined as any of the campuses or the System as a whole, College is defined as each school or college within the campus, Major is defined as major within each college, Cohort year is defined as year student first enrolled at a campus, and Student Type is defined as Freshmen entrant or Transfer entrant.

Modules 2308-2311 then output to display module 2312 and to modules 2313 to 2316.

Module 2312 provides a Display the students progress (X=year, Y=total attempted units), and for the last year we have a record for each student, display their status as one of the following: Dropped out, same major; Dropped out, diff. major; Dropped out—Graduated Diff campus, same major; Dropped out—Graduated Diff campus, different major; Graduated, same major; Graduated, different major; and Still Enrolled.

Modules 2313 to 2316 provide a Statistical Summary: Number of enrolled students; 2, 4, 6 year Grad Rate; 1, 2, 3 year Persistence Rates; and Dropout Rate.

Module 2317 is then generated using outputs from module 2313 and 2314 to provide 2, 4, 6 year graduation rates. Module 2318 is then generated using outputs from module 2313 and 2315 to provide 1st-3rd year persistence rates. Module 2319 is then generated using outputs from module 2313 and 2316 to provide dropout rates.

Figure 24:
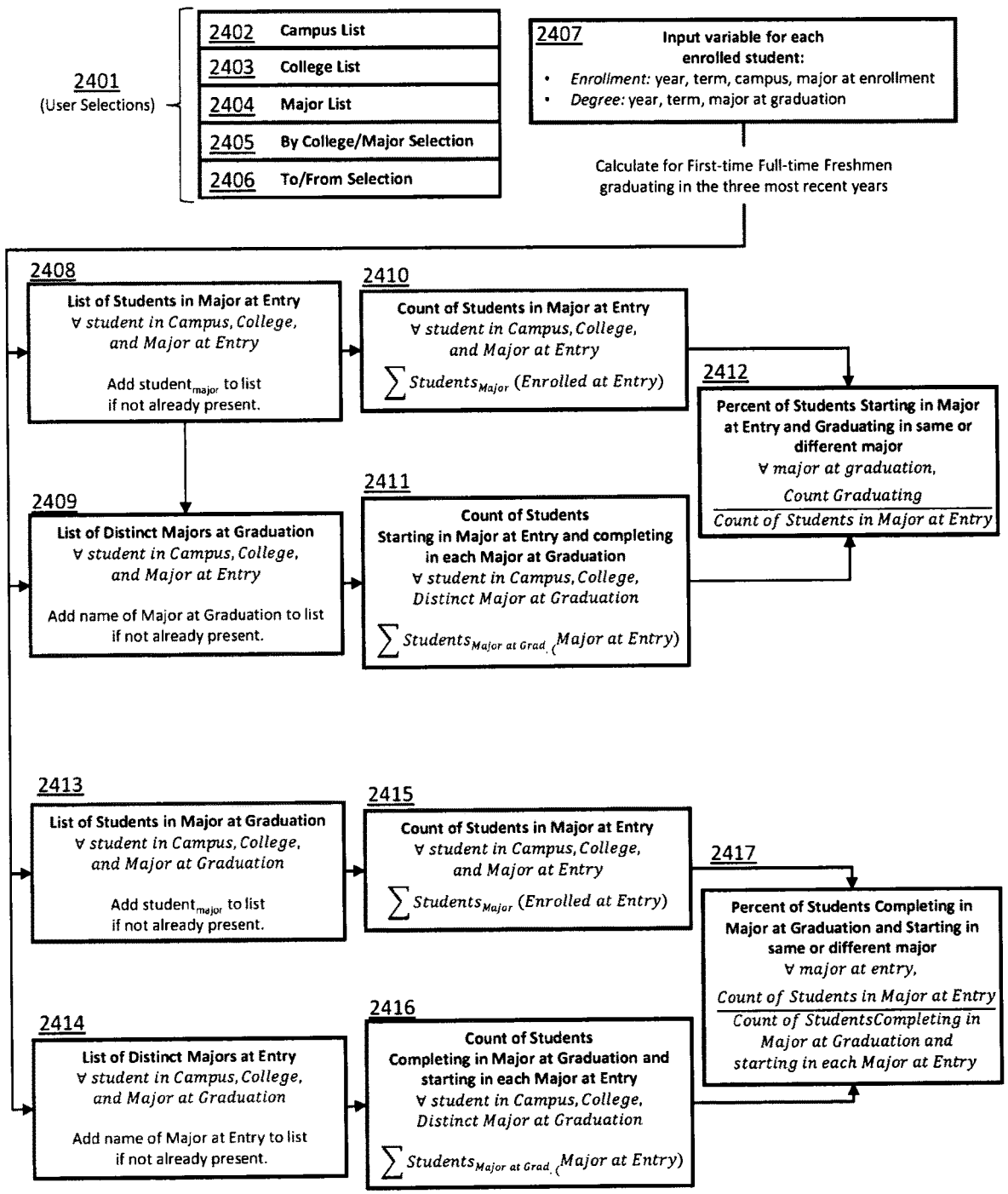
FIG. 24 is a graphic flowchart illustrating a faculty-view majors view module and architecture for progress towards graduation using variables of the present invention.

FIG. 24 is a graphic flowchart illustrating a faculty-view majors view module and architecture for progress towards graduation using variables of the present invention.

FIG. 24 shows Faculty module, and specifically shows the module comprising a plurality of calculation sub-modules using selected University variables for generating a display for addressing the question: What Paths Do They Follow?

FIG. 24 shows that user selections module 2401 comprises (i) Campus List module 2402, (ii) College List module 2403, (iii) Major List module 2404, (iv) By College/Major module 2405, and (v) To/From College/Major module 2406, which provides that a user can select from a group of variables to provide an output of the What Paths Do They Follow query.

FIG. 24 shows that the FACULTY-VIEW MAJORS-VIEW VARIABLES module 2407 includes variable for each enrolled student: Enrollment: year, term, campus, major/concentration code; Degree: year, term, major at graduation.

Then, from module 2407, calculate for First-time Full-time Freshmen graduating over the past three years, to provide module 2408, 2409, 2413, and 2314.

Module 2408 provides List of Students in Major at Entry, $\forall$ (Forall) students in campus, college, and Major at entry, to Add student major to list if not already present.

Module 2410 then sums from 2408 the number of students in Major at entry.

Module 2409 provides List of Distinct Majors at Graduation $\forall$ (Forall) students in campus, college, and Major at entry, to Add name of Major at Graduation to list if not already present.

Module 2411 then sums from 2409 the number of students starting in Major at entry and completing in each major at graduation.

Module 2412 the receives the output from 2410 and 2411 to calculate Percent of Students Starting in Major at Entry and Graduating in same or different major, For all ($\forall$) major at graduation, Count Graduating divided by the Count of students in major at Entry.

Module 2413 provides List of Students in Major at Graduation $\forall$ (Forall) students in campus, college, and Major at graduation, to Add student major to list if not already present.

Module 2415 then sums from 2413 the number of students in the major at entry.

Module 2414 provides List of Distinct Majors at Entry $\forall$ (Forall) students in campus, college, and Major at graduation, to Add name of Major at Entry to list if not already present.

Module 2416 then sums from 2414 then number of Students Completing in Major at Graduation and starting in each Major at Entry.

Module 2417 the receives the output from 2415 and 2416 to calculate Percent of Students Completing in Major at Graduation and Starting in same or different major, For all ($\forall$) major at entry, Count of Students in Major at Entry divided by the Count of students Completing in major at Graduation and starting in each major at entry.

Figure 25:
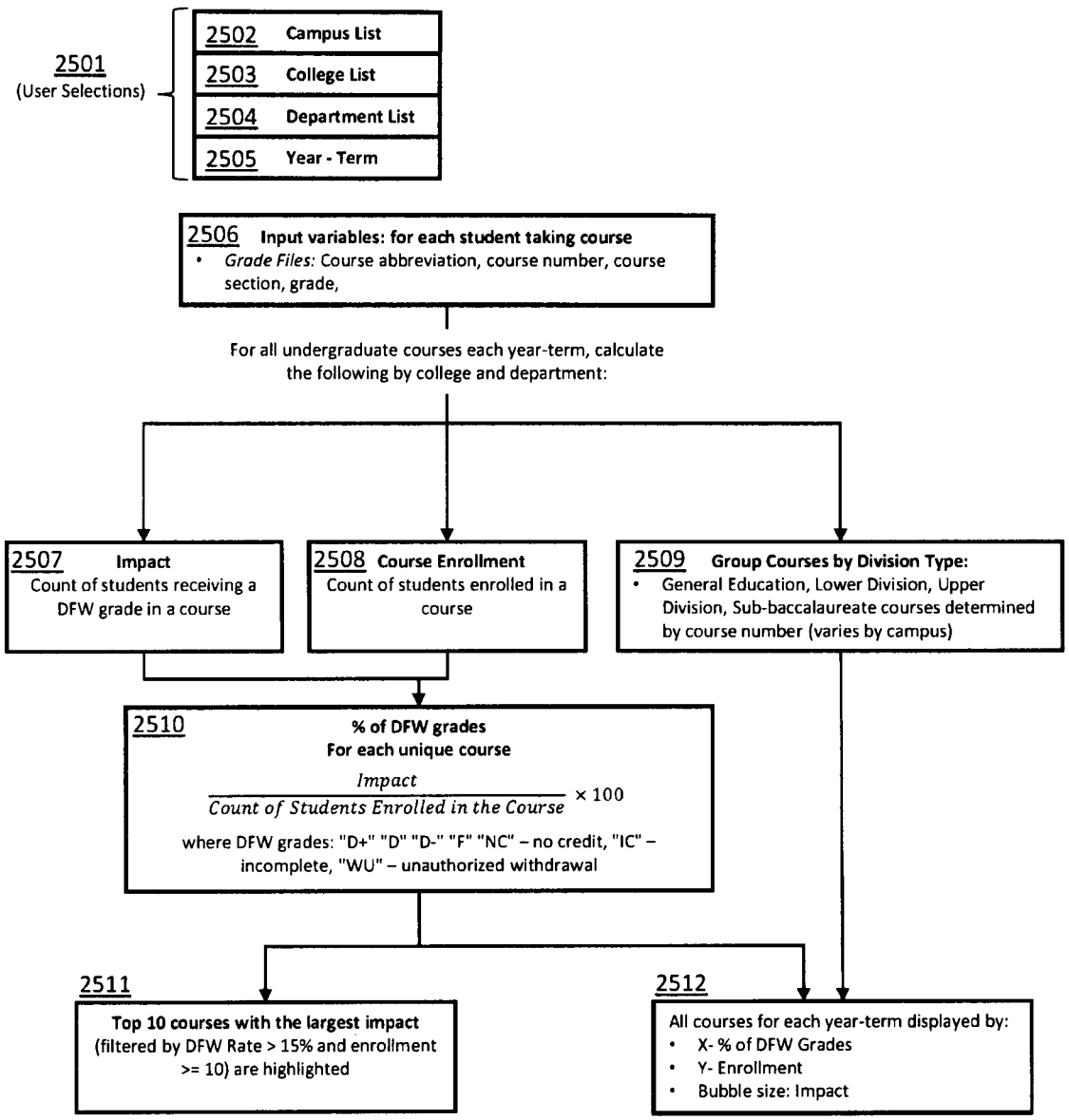
FIG. 25 is a graphic flowchart illustrating a faculty view course struggle module and architecture for progress towards graduation using variables of the present invention.

FIG. 25 is a graphic flowchart illustrating a faculty view course struggle module and architecture for progress towards graduation using variables of the present invention.

FIG. 25 shows Faculty module, and specifically shows the module comprising a plurality of calculation sub-modules using selected University variables for generating a display for addressing the question: In Which Courses Do They Struggle?

FIG. 25 shows that User Selections module 2501 comprises (i) Campus List module 2502, (ii) College List module 2503, (iii) Department List module 2504, and (iv) Year—Term module, 2505 which provides that a user can select from a group of variables to provide an output of the Which Courses Do They Struggle query.

FIG. 25 shows that the COURSE STRUGGLE VARIABLES module 2506 includes variables for each student taking course: Grade Files: Course abbreviation, course number, course section, grade.

Then, for modules 2507, 2508, and 2509, For all undergraduate courses each year-term, calculate the following by college and department: Impact in 2507 by calculating Count of students receiving a DFW grade in a course; Course enrollment in 2508 by calculating Count of students enrolled in a course; and Group Courses by Division Type in 2509 by calculating the General Education, Lower Division, Upper Division, Sub-baccalaureate courses determined by course number (varies by campus).

Module 2510 then provides % of DFW Grades for each unique Course by calculating, For each unique course (course abbreviation, course number), calculate the total number of students who receive a DFW grade (specifically: "D+" "D" "D-" "F" "NC"—no credit, "IC"—incomplete, "WU"—unauthorized withdrawal) then dividing by the total number of students enrolled in the course.

Then, Module 2511 and module 2512, displays are generated, where: Module 2512 All courses for each year-term displayed by: X— % of DFW Grades, Y— Enrollment, and Bubble size; and Module 2511 the Top 10 courses with the largest impact (filtered by DFW Rate>15% and enrollment>=10) are highlighted.

Figure 26:
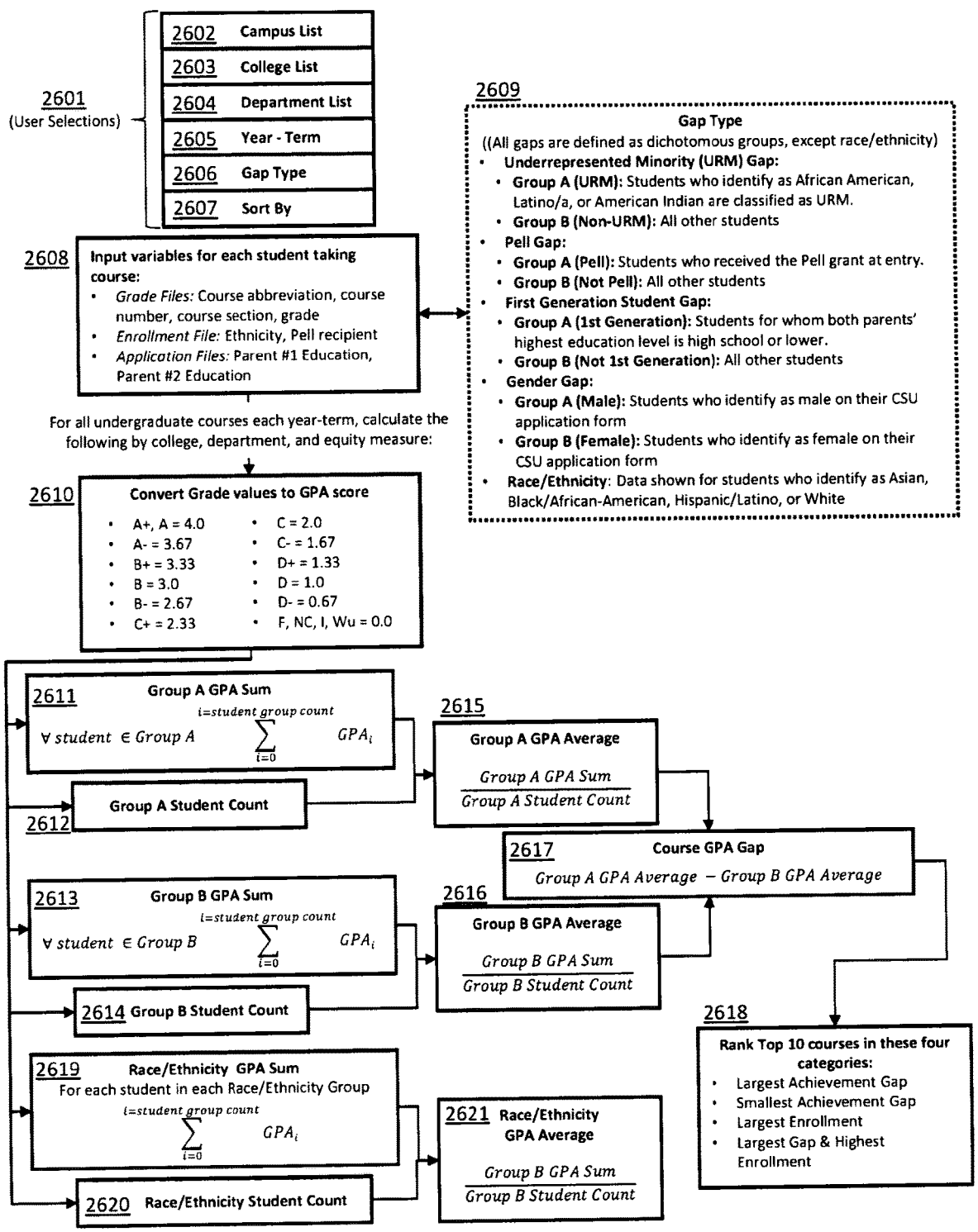
FIG. 26 is a graphic flowchart illustrating a faculty-view GPA equity gap module and architecture for progress towards graduation using variables of the present invention.

FIG. 26 is a graphic flowchart illustrating a faculty-view GPA equity gap module and architecture for progress towards graduation using variables of the present invention.

FIG. 26 shows Faculty module, and specifically shows the module comprising a plurality of calculation sub-modules using selected University variables for generating a display for addressing the question: Which Courses Have the Largest GPA Equity Gaps?

FIG. 26 shows that User Selections module 2601 comprises (i), Campus List module 2602, (ii) College List module 2603, (iii), Department List module 2604, (iv) Year—Term module 2605, (v) Gap Type module 2606, and (vi) Sort by gap/enrollment module 2607, which provides that a user can select from a group of variables to provide an output of the faculty-view GPA equity gap.

FIG. 26 shows that the FACULTY-VIEW GPA EQUITY GAP VARIABLES module 2608 includes variables for each student taking course: Grade Files: Course abbreviation, course number, course section, grade; Enrollment File: Ethnicity, Pell recipient; and Application Files: Parent #1 Education, Parent #2 Education.

Module 2609 Gap Type then generates and provides a URM gap, a Pell gap, a 1st Gen gap, a gender Gap, and a race/Ethnicity gap.

The Underrepresented Minority (URM) gaps is calculated as: Students who identify as African American, Latino/a, or American Indian are classified as URM. All other students are classified as Non-URM. The Pell is calculated as: Students who received the Pell grant at entry are classified as Pell students. Those who did not receive the Pell grant at entry are classified as Non-Pell. The First Generation Students gap is calculated as: Students whose parents highest education level were both high school or lower are classified as First-Gen. All others were classified as Not First Gen. The Gender gaps is calculated as Students are classified as Male or Female. The race/ethnicity gap is calculated by Data shown for students who identify as Asian, Black/African-American, Hispanic/Latino, or White.

Modules 2610 to 2618 then calculate Gaps by GPA.

Module 2610 converts grade values into GPA scores. For each subgroup within each gap type, the average GPA was calculated by first converting the grades into GPA, summing the GPA in 2611, 2613, 2619, then dividing the total GPA by the number of the students 2612, 2614, 2620 in each equity measure to obtain a Group A GPA average 2615, Group B GPA average 2616, and race/ethnicity GPA average 2621.

For all undergraduate courses each year-term, calculate the following by college, department, and equity measure.

Module 2617 provides where Group A GPA average 2615, Group B GPA average 2616 are combined to provide a Course GPA Gap by subtracting Group B GPA average from Group A GPA average.

Module 2618 then takes the output from 2617 to provide Top 10 courses in these categories, provides displayed based on user selection options of: Largest Achievement Gap, Smallest Achievement Gap, Largest Enrollment, and Largest Gap & Highest Enrollment.

Module 2621 provides a race/ethnicity GPA average by calculating the ration of Group B GPA sum to the Group B student count.

Figure 27:
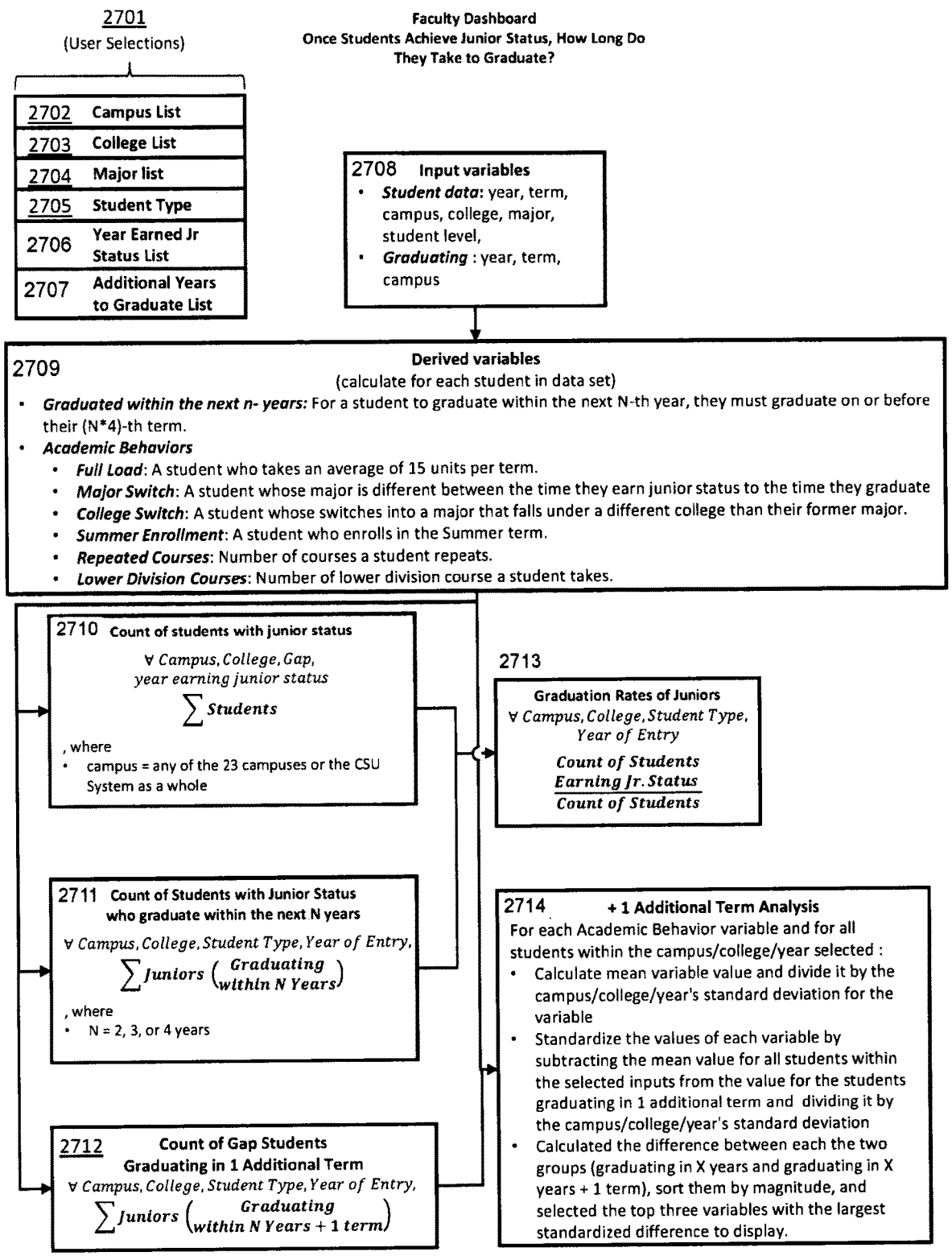
FIG. 27 is a graphic flowchart illustrating a faculty-view junior status achievement module and architecture for progress towards graduation using variables of the present invention.

FIG. 27 is a graphic flowchart illustrating a faculty-view junior status achievement module and architecture for progress towards graduation using variables of the present invention.

FIG. 27 shows Faculty module, and specifically shows the module comprising a plurality of calculation sub-modules using selected University variables for generating a display for addressing the question: Once Students Achieve Junior Status, How Long Do They Take to Graduate?

FIG. 27 shows that User Selections module 2701 comprises (i) Campus List module 2702, (ii) College List module 2703, (iii) Major List module 2704, (iv) Student Type module 2705, (v) Jr. Status by $20xx$-$20yy$ module 2706 where xx-yy represent a range of, e.g. 3 years, and (vi) Graduating in 2-4 Years 2707, which provides that a user can select from a group of variables to provide an output of the Once Students Achieve Junior Status, How Long Do They Take to Graduate query.

FIG. 27 shows that the FACULTY-VIEW JUNIOR STATUS ACHIEVEMENT VARIABLES module 2708 includes variables for each: student data: year, term, major/concentration code, campus, college, student level; and graduating data: year, term, campus.

Module 2709 generates and provides Derived variables that are calculated for each student in data set. The variable for—Graduated within the next n-years comprises: For a student to graduate within the next N-th year, they must graduate on or before their $(N*4)$-th term. The variable for academic behaviors comprises: Full Load: A student who takes an average of 15 units per term.; Major Switch: A student whose major is different between the time they earn junior status to the time they graduate; College Switch: A student whose switches into a major that falls under a different college than their former major; Summer Enrollment: A student who enrolls in the Summer term; Repeated Courses: Number of courses a student repeats; Lower Division Courses: Number of lower division course a student takes.

Module 2710 generates and provides a Count of students with junior status, ∀ (forall) campus, college, gap, and year earning junior status.

Module 2711 generates and provides, ∀ (forall) campus, college, student type, and year of entry, a Count of Students with Junior Status who graduate within the next N years.

Module 2712 generates and provides, ∀ (forall) campus, college, student type, and year of entry, a Count of Gap Students Graduating in 1 Additional Term.

Module 2713 then generates and provides, ∀ (forall) campus, college, student type, and year of entry, Graduation Rates of Juniors by calculating the ration of the count of students earning junior status to the count of students.

Module 2714 then generates and provides a +1 additional term analysis. For each Academic Behavior variable and for all students within the campus/college/year selected: Calculate mean variable value and divide it by the campus/college/year's standard deviation for the variable; Standardize the values of each variable by subtracting the mean value for all students within the selected inputs from the value for the students graduating in 1 additional term and dividing it by the campus/college/year's standard deviation; Calculated the difference between each the two groups (graduating in X years and graduating in X years+1 term), sort them by magnitude, and selected the top three variables with the largest standardized difference to display.

Figure 28:
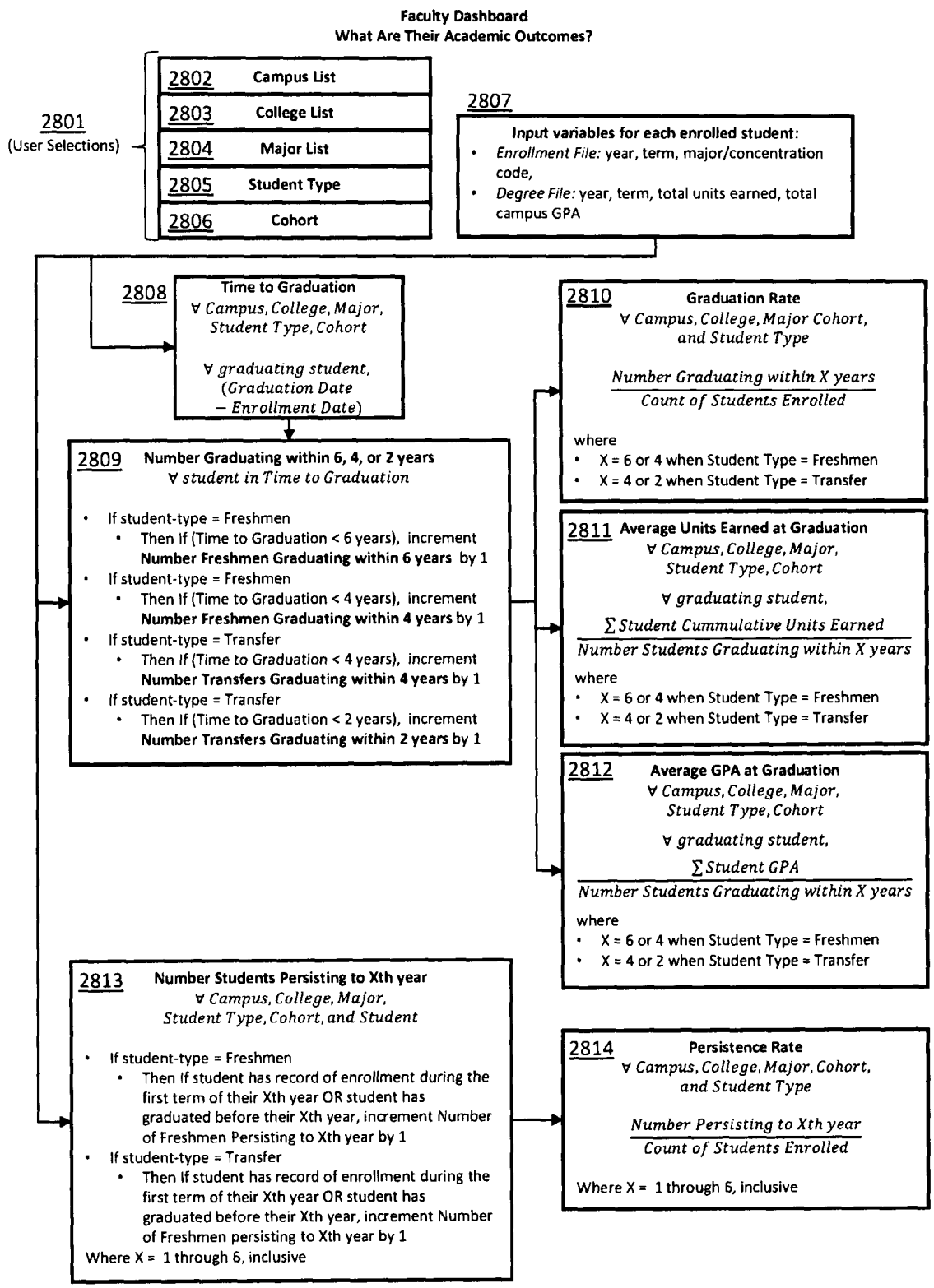
FIG. 28 is a graphic flowchart illustrating a faculty-view academic outcomes module and architecture for progress towards graduation using variables of the present invention.

FIG. 28 is a graphic flowchart illustrating a faculty-view academic outcomes module and architecture for progress towards graduation using variables of the present invention.

FIG. 28 shows Faculty module, and specifically shows the module comprising a plurality of calculation sub-modules using selected University variables for generating a display for addressing the question: What Are Their Academic Outcomes?

FIG. 28 shows that user selections module 2801 comprises (i) Campus List module 2802, (ii) College List module 2803, (iii) Major List module 2804, (iv) Student Type module 2805, and (v) Cohort module 2806, which provides that a user can select from a group of variables to provide an output of the What Are Their Academic Outcomes query.

FIG. 28 shows that the ACADEMIC OUTCOMES VARIABLES module 2807 includes variables for each enrolled student: Enrollment File variable: year, term, major/concentration code; and Degree File variable: year, term, total units earned, total campus GPA.

Module 2808 generates and provides Time to Graduation $\forall$ (forall) campus, college, major, student type, and cohort, and V (graduation date—enrollment date).

Module 2809 generates and provides the Number Graduating within 6, 4, or 2 years, where for all student in Time to Graduation, determine: If student-type is defined as Freshmen, and If (Time to Graduation<6 years), increment Number Freshmen Graduating within 6 years by 1; and If student-type is defined as Freshmen and If (Time to Graduation<4 years), increment Number Freshmen Graduating within 4 years by 1; and If student-type is defined as Transfer, and If (Time to Graduation<4 years), increment Number Transfers Graduating within 4 years by 1; and If student-type is defined as Transfer and If (Time to Graduation<2 years), increment Number Transfers Graduating within 2 years by 1.

Module 2810 generates and provides the Graduation Rate, (for-all) campus, college, major, student type, and cohort, by calculating the ratio of the number graduating within X years by the count of students enrolled, where X=6 or 4 when Student Type=Freshmen, and X=4 or 2 when Student Type=Transfer.

Module 2811 generates and provides the Average Units Earned at Graduation (forall) campus, college, major, student type, and cohort, by calculating the ratio of the sum of student cumulative units earned by the number of students graduating within X years, where X=6 or 4 when Student Type=Freshmen, and X=4 or 2 when Student Type=Transfer.

Module 2812 generates and provides the Average GPA at Graduation (forall) campus, college, major, student type, and cohort, by calculating, forall graduating students, the ratio of student GPA by the number of students graduating within X years, where X=6 or 4 when Student Type=Freshmen, and X=4 or 2 when Student Type=Transfer.

Module 2813 generates and provides the Number Students Persisting to Xth year (forall) campus, college, major, student type, and cohort, where: If student-type=Freshmen, and Then If student has record of enrollment during the first term of their Xth year OR student has graduated before their Xth year, increment Number of Freshmen Persisting to Xth year by 1; and If student-type=Transfer, and Then If student has record of enrollment during the first term of their Xth year OR student has graduated before their Xth year, increment Number of Freshmen persisting to Xth year by 1, Where X=1 through 6, inclusive.

Module 2814 generates and provides the Persistence Rate (forall) campus, college, major, student type, and cohort, by calculating the ratio of the number persisting to the Xth year by the count of students enrolled, Where X=1 through 6, inclusive.

Figure 29:
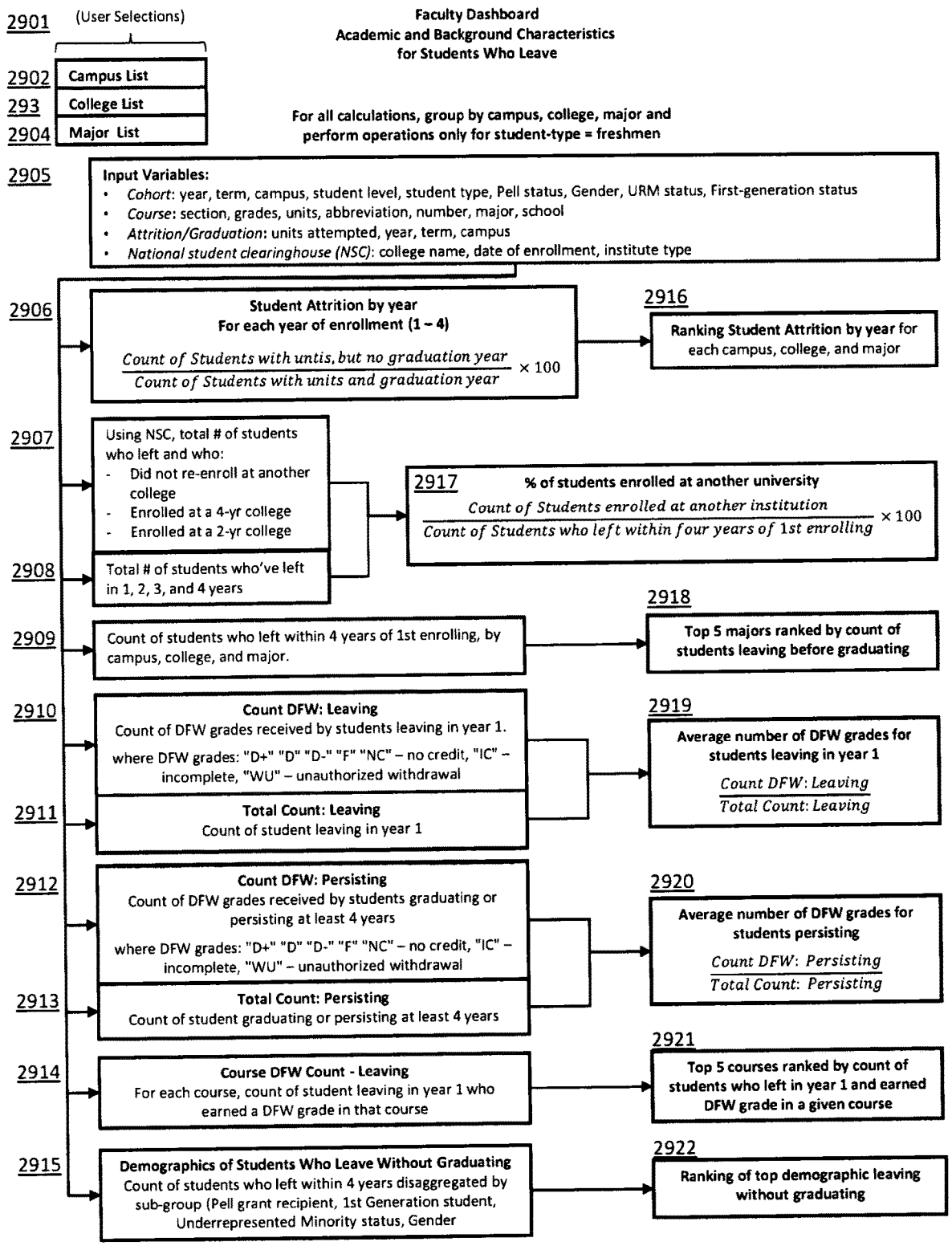
FIG. 29 is a graphic flowchart illustrating a faculty-view student departure module and architecture for progress towards graduation using variables of the present invention.

FIG. 29 is a graphic flowchart illustrating a faculty-view student departure module and architecture for progress towards graduation using variables of the present invention.

FIG. 29 a Faculty module, and specifically shows the module comprising a plurality of calculation sub-modules using selected University variables for generating a display for addressing the subject: Academic and Background Characteristics for Students Who Leave.

FIG. 29 shows that user selections module 2901 comprises (i) Campus List module 2902 (ii) College List module 2903 and (iii) Major List module 2904, which provides that a user can select from a group of variables to provide an output of the What are the Academic and Background Characteristics for Students Who Leave query.

FIG. 29 shows that the STUDENT DEPARTURE VARIABLES module 2905 includes variables: Cohort variable—year, term, campus, student level, student type, Pell status, Gender, URM status, First-generation status; Course variable—section, grades, units, abbreviation, number, major, school; Attrition/Graduation variable—units attempted, year, term, campus; and National student clearinghouse variable—college name, date of enrollment, institute type.

Module 2906 generates and provides Student attrition by year, for years 1-4, by calculating the ration of count of students with units and no graduation year by the count of students with units and graduation year (×100).

Module 2916 receives the output from 2906 and generates and provides a Ranking Student Attrition by year for each campus, college, and major.

Module 2906 and 2907 calculate, respectively, Using NSC, total # of students who left and who: Did not re-enroll at another college, Enrolled at a 4-yr college, or Enrolled at a 2-yr college, and the Total # of students who've left in 1, 2, 3, and 4 years.

Module 2917 then generates and provides from 2907 and 2908, the % of students enrolled at another university.

Module 2909 then generates and provides a count of students who left within 4 years of 1st enrolling, by campus, college, and major.

Module 2918 the receives the output from 2909 and generates for display the Top 5 majors ranked by count of students leaving before graduating.

Module 2910 then generates and provides a Count DFW: Leaving by calculating the Count of DFW grades received by students leaving in year 1, where DFW grades: "D+" "D" "D−" "F" "NC"—no credit, "IC"—incomplete, "WU"—unauthorized withdrawal.

Module 2911 then generates and provides a Total Count: Leaving by calculating the Count of student leaving in year 1.

Module 2919 the receives the output from 2910 and 2911 and generates for display the Average number of DFW grades for students leaving in year 1.

Module 2912 then generates and provides a Count DFW: Persisting by calculating the Count of DFW grades received by students graduating or persisting at least 4 years where DFW grades: "D+" "D" "D−" "F" "NC"—no credit, "IC"—incomplete, "WU" unauthorized withdrawal.

Module 2913 then generates and provides a Total Count: Persisting by calculating the count of student graduating or persisting at least 4 years.

Module 2920 the receives the output from 2912 and 2913 and generates for display the Average number of DFW grades for students persisting.

Module 2914 then generates and provides a Course DFW Count—Leaving by calculating, For each course, count of student leaving in year 1 who earned a DFW grade in that course.

Module 2921 the receives the output from 2914 and generates for display the Top 5 courses ranked by count of students who left in year 1 and earned DFW grade in a given course.

Module 2915 then generates and provides a Demographics of Students Who Leave Without Graduating by calculating the Count of students who left within 4 years disaggregated by sub-group (Pell grant recipient, 1st Generation student, Underrepresented Minority status, Gender.

Module 2922 the receives the output from 2915 and generates for display the Ranking of top demographic leaving without graduating.

Figure 30:
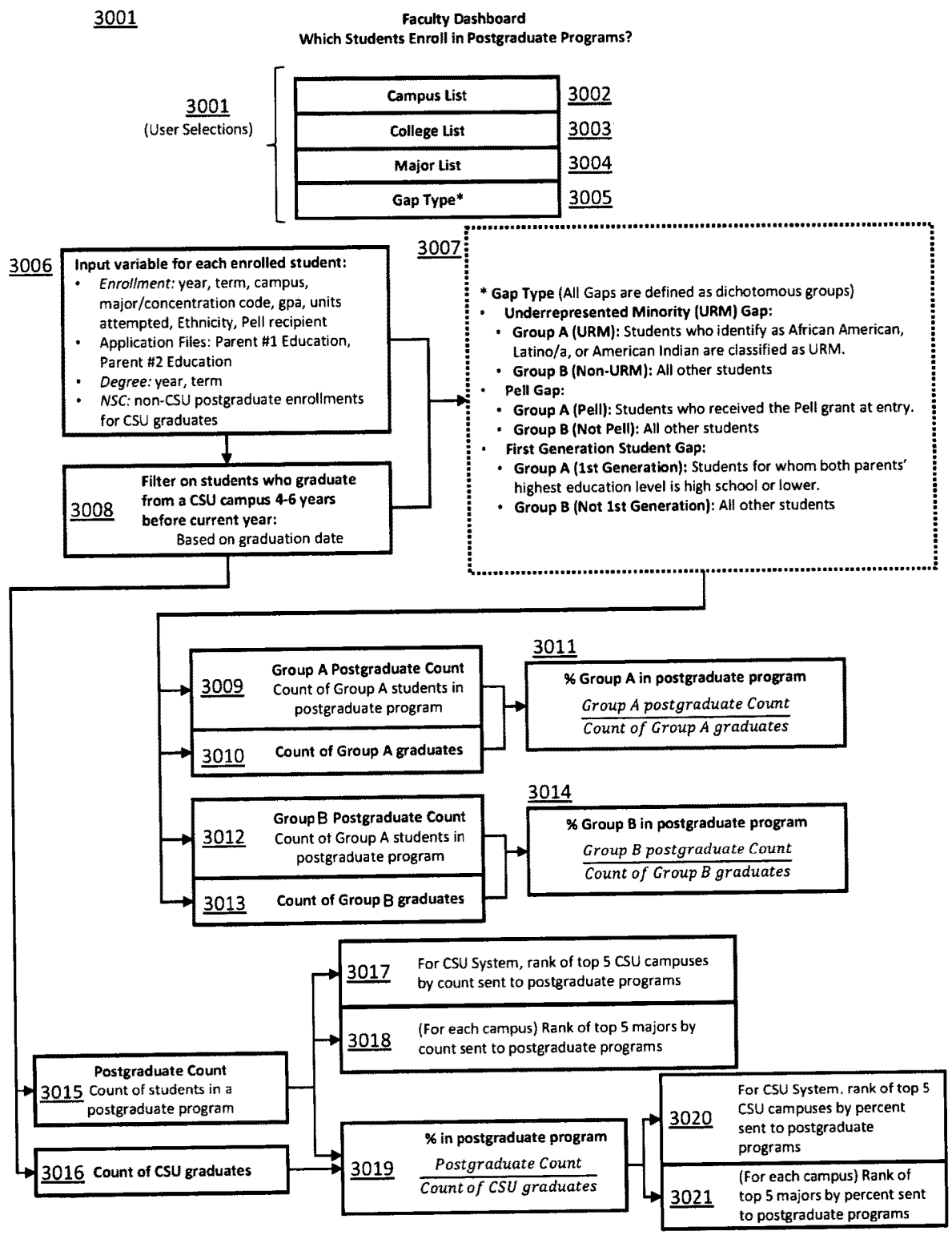
FIG. 30 is a graphic flowchart illustrating a faculty-view post-graduate enrollment module and architecture for progress towards graduation using variables of the present invention.

FIG. 30 is a graphic flowchart illustrating a faculty-view post-graduate enrollment module and architecture for progress towards graduation using variables of the present invention.

FIG. 30 shows Faculty module, and specifically shows the module comprising a plurality of calculation sub-modules using selected University variables for generating a display for addressing the question: Which Students Enroll in Postgraduate Programs?

FIG. 30 shows that user selections module 3001 comprises (i) Campus List module 3002 (ii) College List module 3003, and (iii) major List module 3004, and (iv) Gap type 3005 which provides that a user can select from a group of variables to provide an output of the Which Students Enroll in Postgraduate Programs query.

FIG. 30 shows that the FACULTY VIEW POSTGRADUATE ENROLLMENT VARIABLES module 3006 includes variable for each enrolled student: (i) Enrollment: year, term, campus, major/concentration code, GPA, units attempted; (ii) Degree: year, term; and (iii) NSC: college enrolled after graduation.

Module 3007 provides Gap Types: Underrepresented Minority (URM)—Students who identify as African American, Latino/a, or American Indian are classified as URM. All other students are classified as Non-URM; Pell—Students who received the Pell grant at entry are classified as Pell students. Those who did not receive the Pell grant at entry are classified as Non-Pell; First Generation Students—Students whose parents highest education level were both high school or lower are classified as First-Gen. All others were classified as Not First Gen.

Module 3008 provides Filter on students who graduated 4-6 years from current year based on graduation date.

Module 3009 then generates and provides a Group A Postgraduate Count by calculating the Count of Group A students in postgraduate program.

Module 3010 then generates and provides a Count of Group A graduates.

Module 3011 then receives output from 3009 and 3010 and generates and provides for display a % Group A in postgraduate program.

Module 3012 then generates and provides a Group B Postgraduate Count

Module 3013 then generates and provides a Count of Group B graduates.

Module 3014 then receives output from 3012 and 3013 and then generates and provides a % Group B in postgraduate program.

Module 3015 then generates and provides a Postgraduate Count.

Module 3016 then generates and provides a Count of Univ. graduates.

Module 3017 then generates and provides, For Univ. System, rank of top 5 CSU campuses by count sent to postgraduate programs.

Module 3018 then generates and provides, (For each campus) Rank of top 5 majors by count sent to postgraduate programs.

Module 3019 then receives output from 3015 and 3016 to generate and provide a display of the % in postgraduate program.

Module 3020 then receives output from 3019 and generates and provides a display for the university System, rank of top 5 system campuses by percent sent to postgraduate programs.

Module 3021 also receives output from 3019 and generates and provides a display a (For each campus) Rank of top 5 majors by percent sent to postgraduate programs.

Figure 31:
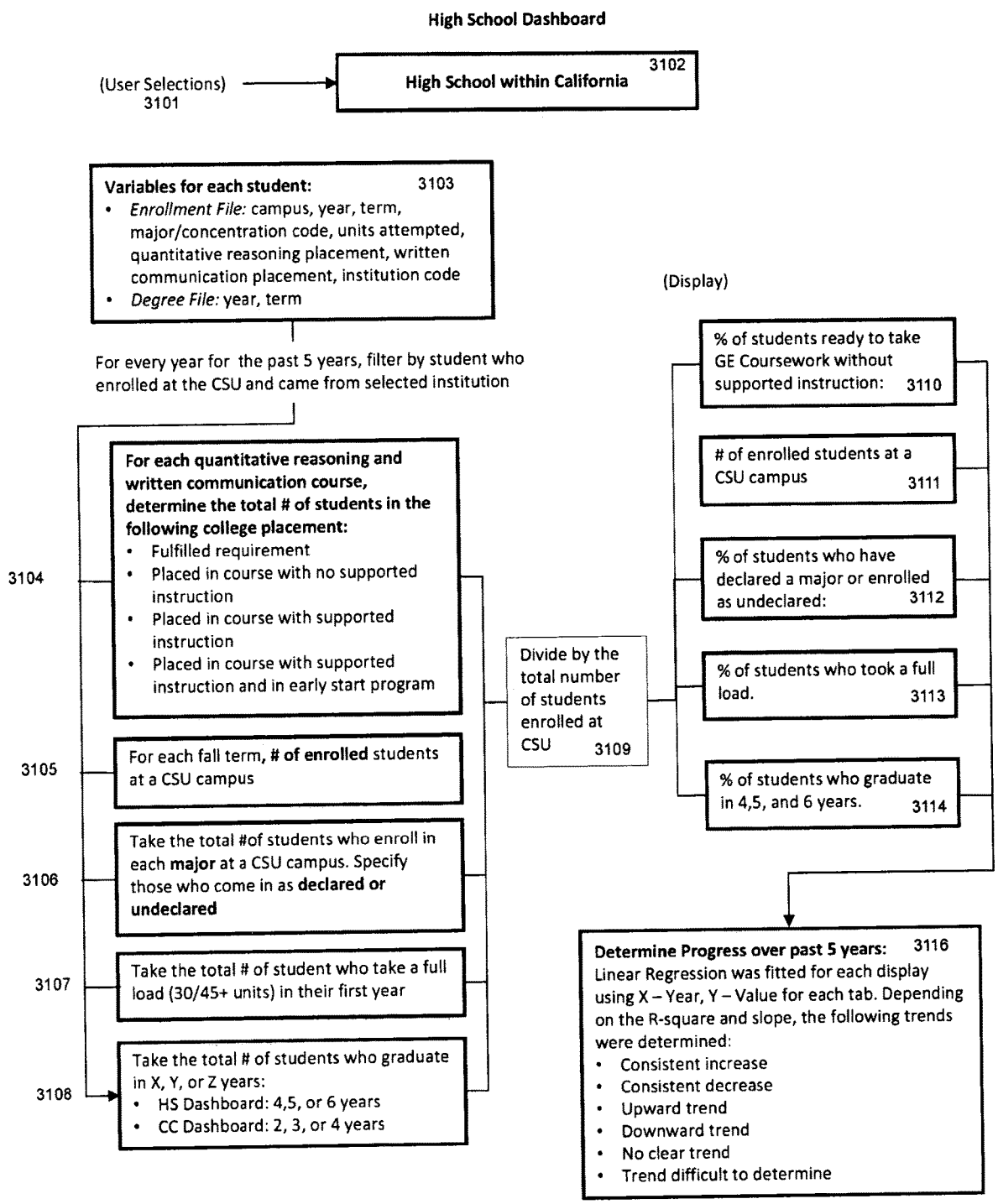
FIG. 31 is a graphic flowchart illustrating an in-state high school module and architecture for progress towards graduation using variables of the present invention.

FIG. 31 is a graphic flowchart illustrating an in-state high school module and architecture for progress towards graduation using variables of the present invention.

FIG. 31 shows High School Dashboard module, and specifically shows the module comprising a plurality of calculation sub-modules using selected University variables for generating a display for addressing the subject: High School within the State.

FIG. 31 shows that the IN-STATE HIGH SCHOOL VARIABLES module 3103 includes variables for each student: Enrollment File variable—campus, year, term, major/concentration code, units attempted, quantitative reasoning placement, written communication placement, institution code; and Degree File variable—year, term.

Then, for every year for the past 5 years, filter by student who enrolled at the University and came from selected institution.

Module 3104 generates and provides for each quantitative reasoning and written communication course, determine the total # of students in the following college placement: Fulfilled requirement; Placed in course with no supported instruction; Placed in course with supported instruction; Placed in course with supported instruction and in early start program.

Module 3105 generates and provides For each fall term, # of enrolled students at a University campus.

Module 3106 generates and provides the total # of students who enroll in each major at a University campus, and Specify those who come in as declared or undeclared.

Module 3107 generates and provides the total # of student who take a full load (30/45+ units) in their first year.

Module 3108 generates and provides the total # of students who graduate in X, Y, or Z years: HS Dashboard: 4, 5, or 6 years; CC Dashboard: 2, 3, or 4 years.

Module 3109 receives the output from 3103-3107 and performs a calculation to Divide by the total number of students enrolled at University.

Module 3110 provides % of students ready to take GE Coursework without supported instruction.

Module 3111 provides # of enrolled students at a University campus.

Module 3112 provides % of students who have declared a major or enrolled as undeclared.

Module 3113 provides % of students who took a full load.

Module 3114 provides % of students who graduate in 4, 5, and 6 years.

Module 3115 provides Determine Progress over past 5 years:

Module 3116 receives the output from modules 3110-3114 and generates and provides a Linear Regression was fitted for each display using X—Year, Y—Value for each tab. Depending on the R-square and slope, the following trends were determined and displayed: Consistent increase, Consistent decrease, Upward trend, Downward trend, No clear trend; and Trend difficult to determine.

Figure 32:
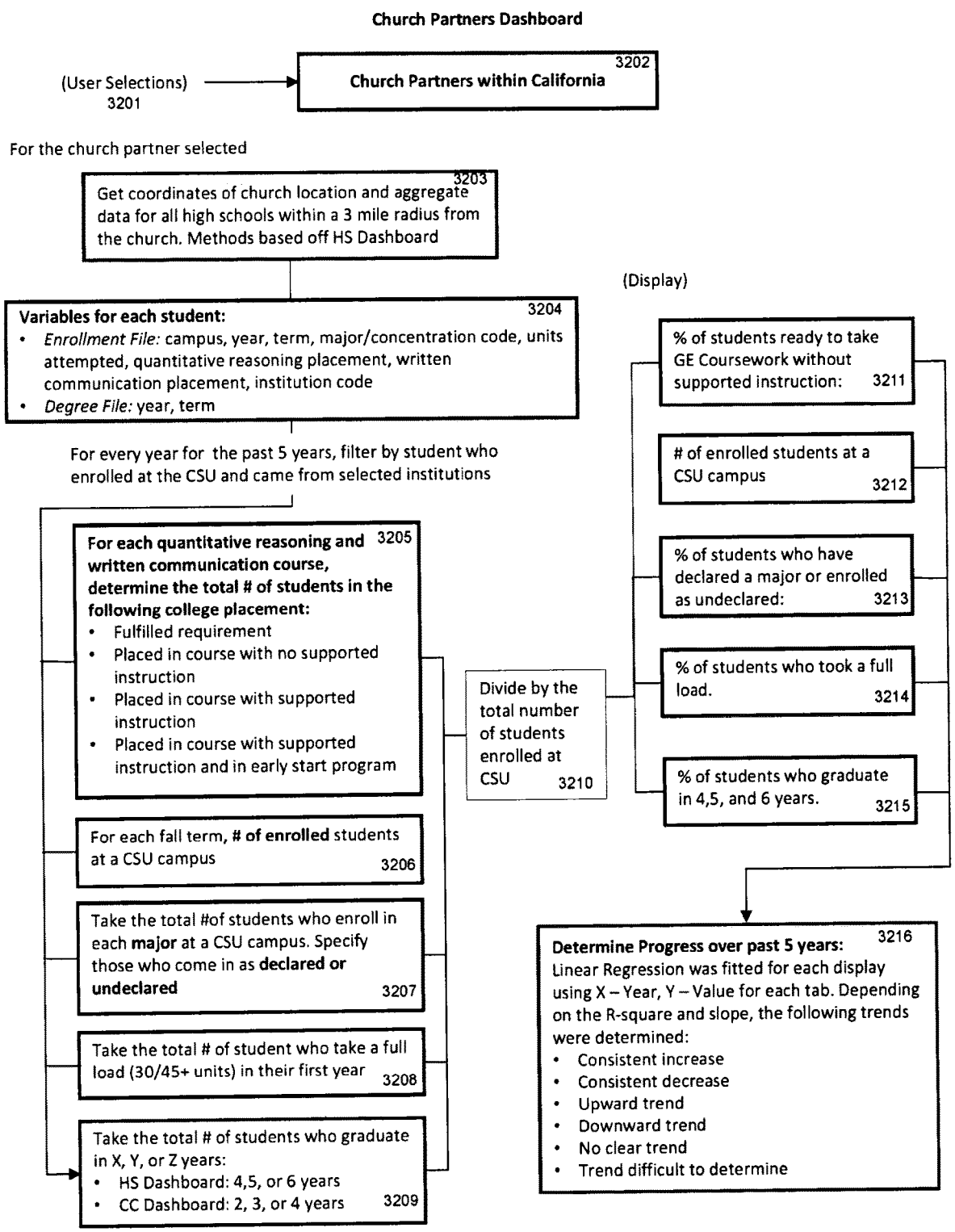
FIG. 32 is a graphic flowchart illustrating an in-state church partners module and architecture for progress towards graduation using variables of the present invention.

FIG. 32 is a graphic flowchart illustrating an in-state church partners module and architecture for progress towards graduation using variables of the present invention.

FIG. 32 shows Church Partners Dashboard module, and specifically shows the module comprising a plurality of calculation sub-modules using selected University variables for generating a display for addressing the subject: Church Partners within the State.

Module 3203 provides Get coordinates of church location and aggregate data for all high schools within a 3 mile radius from the church. Methods based off HS Dashboard FIG. 32 shows that the CHURCH PARTNER VARIABLES module 3204 includes variables for each student: Enrollment File variable—campus, year, term, major/concentration code, units attempted, quantitative reasoning placement, written communication placement, institution code; and Degree File variable—year, term.

Then, for every year for the past 5 years, filter by student who enrolled at the University and came from selected institution.

Module 3205 provides for each quantitative reasoning and written communication course, determine the total # of students in the following college placement: Fulfilled requirement; Placed in course with no supported instruction; Placed in course with supported instruction; Placed in course with supported instruction and in early start program.

Module 3206 generates and provides for display, For each fall term, # of enrolled students at a University campus Module 3207 generates and provides for display Take the total # of students who enroll in each major at a University campus. Specify those who come in as declared or undeclared.

Module 3208 generates and provides for display for taking the total # of student who take a full load (30/45+ units) in their first year.

Module 3209 generates and provides for display Take the total # of students who graduate in X, Y, or Z years: HS Dashboard: 4, 5, or 6 years; CC Dashboard: 2, 3, or 4 years Module 3210 then receives the output from modules 3205-3209 and performs a calculation to Divide by the total number of students enrolled at University.

Module 3211 then receives the output from 3210 and generates and provides for display % of students ready to take GE Coursework without supported instruction.

Module 3212 also receives the output from 3210 and generates and provides for display # of enrolled students at a University campus.

Module 3213 also receives the output from 3210 and generates and provides for display % of students who have declared a major or enrolled as undeclared.

Module 3214 also receives the output from 3210 and generates and provides for display % of students who took a full load.

Module 3215 also receives the output from 3210 and generates and provides for display % of students who graduate in 4, 5, and 6 years.

Module 3216 receives output from modules 3211-3215 and generates and provides for display a determination of Progress over past 5 years. The calculation is performed where Linear Regression was fitted for each display using X—Year, Y—Value for each tab. Depending on the R-square and slope, the following trends were determined and displayed: Consistent increase; Consistent decrease; Upward trend; Downward trend; No clear trend; Trend difficult to determine.

Figure 33:
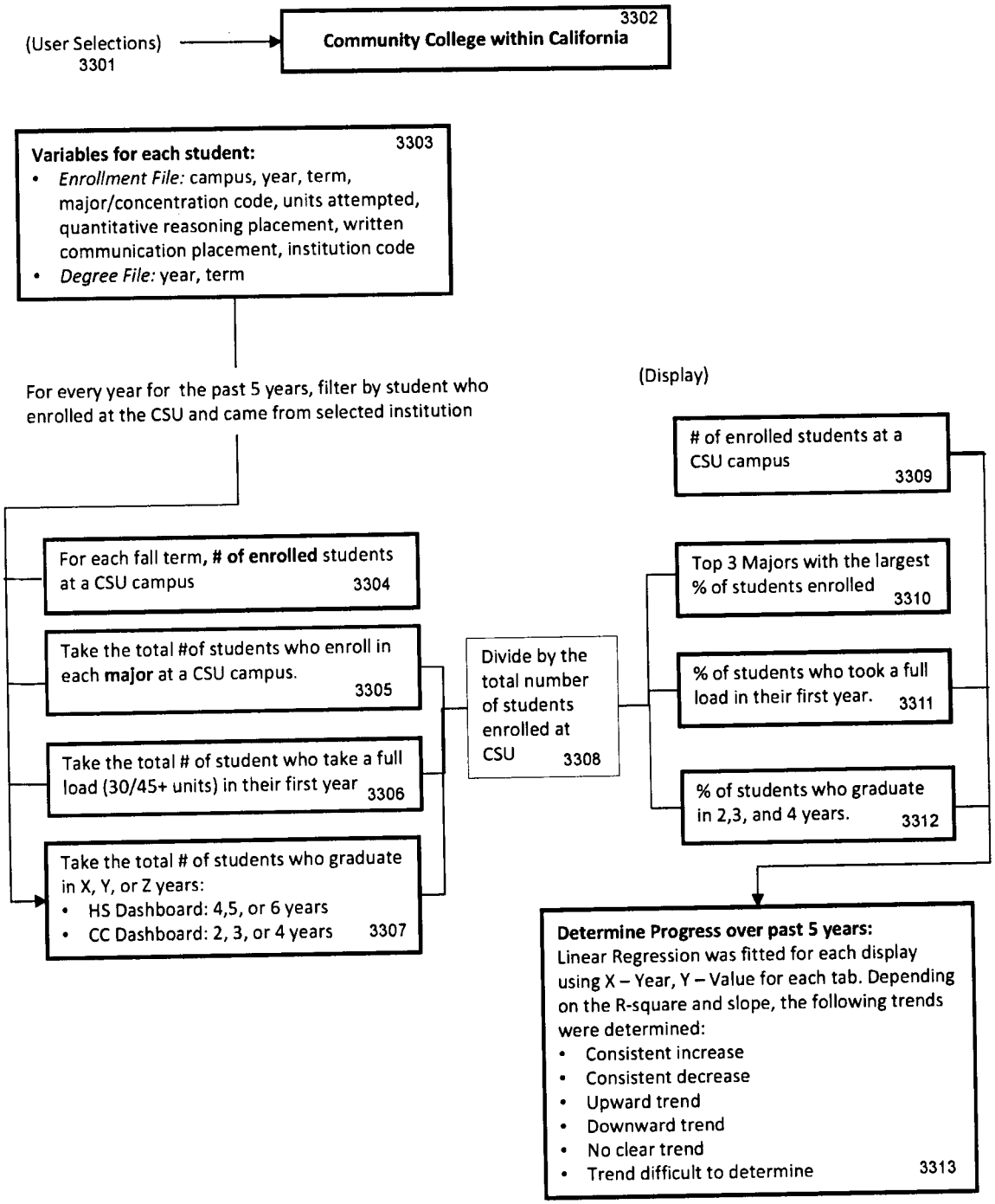
FIG. 33 is a graphic flowchart illustrating an in-state community college module and architecture for progress towards graduation using variables of the present invention.

FIG. 33 is a graphic flowchart illustrating a community college module and architecture for progress towards graduation using variables of the present invention.

FIG. 33 shows Community College Dashboard module, and specifically shows the module comprising a plurality of calculation sub-modules using selected University variables for generating a display for addressing the subject: COMMUNITY COLLEGE within the State.

FIG. 33 shows that the COMMUNITY COLLEGE VARIABLES module 3303 includes variables for each student: Enrollment File variable—campus, year, term, major/concentration code, units attempted, quantitative reasoning placement, written communication placement, institution code; and Degree File variable—year, term.

Then, for every year for the past 5 years, filter by student who enrolled at the University and came from selected institution.

Module 3303 generates and provides for display for each quantitative reasoning and written communication course, determine the total # of students in the following college placement: Fulfilled requirement; Placed in course with no supported instruction; Placed in course with supported instruction; Placed in course with supported instruction and in early start program.

Module 3304 generates and provides for display For each fall term, # of enrolled students at a University campus.

Module 3305 generates and calculates the total # of students who enroll in each major at a University campus. Specify those who come in as declared or undeclared.

Module 3306 generates and calculates the total # of student who take a full load (30/45+ units) in their first year.

Module 3307 generates and calculates the total # of students who graduate in X, Y, or Z years: HS Dashboard: 4, 5, or 6 years; CC Dashboard: 2, 3, or 4 years.

Module 3308 then receives the output from modules 3304-3307 and perform a calculation to Divide by the total number of students enrolled at University.

Module 3309 then receives the output from 3308 and generates and provides for display # of enrolled students at a University campus.

Module 3310 also receives the output from 3308 and generates and provides for display % of students who have declared a major or enrolled as undeclared.

Module 3311 also receives the output from 3308 and generates and provides for display % of students who took a full load.

Module 3312 also receives the output from 3308 and generates and provides for display % of students who graduate in 2, 3, 4 years.

Module 3313 then receives the output from modules 3309-3312 and generates and determines Progress over past 5 years using a Linear regression calculation.

Linear Regression was fitted for each display using X—Year, Y—Value for each tab. Depending on the R-square and slope, the following trends were determined and generated for display: Consistent increase; Consistent decrease; Upward trend; Downward trend; No clear trend; Trend difficult to determine.

Figure 34:
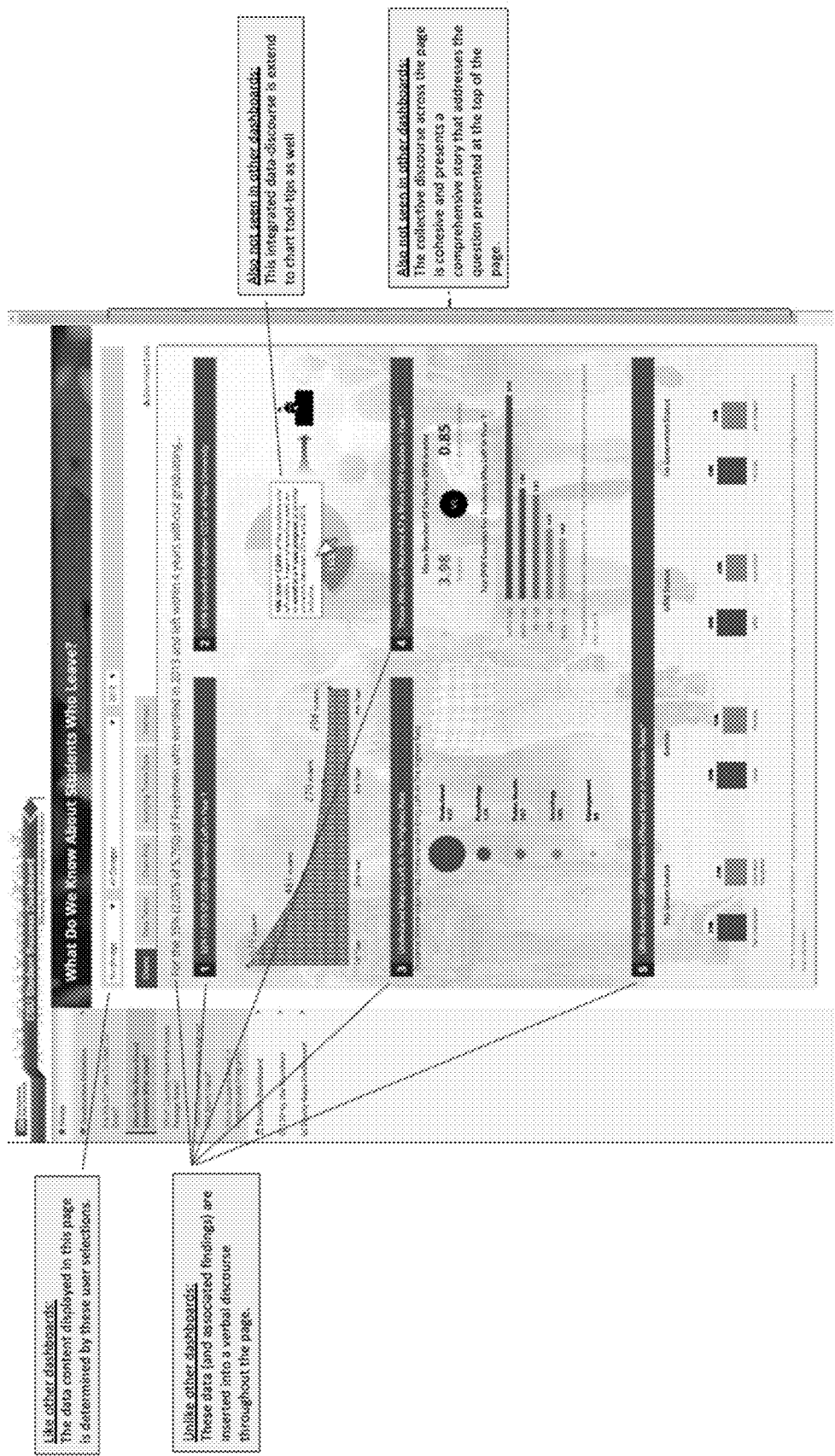
FIG. 34 is an example of a Student Success Dashboard graphic interface screen illustrating certain aspects of preferred embodiments of the invention and shows a page providing information about What Do We Know About Students Who Leave?

Referring now to FIG. 34, FIG. 34 shows an example of a Student Success Dashboard graphic interface screen illustrating certain aspects of preferred embodiments of the invention and shows a page providing information about What Do We Know About Students Who Leave? FIG. 34 shows menu options on the left side of the page with tab menus displayed across a ribbon feature at the top. Multiple graphs are generated and displayed on each page, including trend graphs, pie charts, bar graphs, and population size/comparison displays. Distilling big data into manageable and easy to understand displays provides for rapid understanding across multiple groups of shareholders and decision-makers, ultimately improving and enhancing the quality of education services provided.

Figure 35:
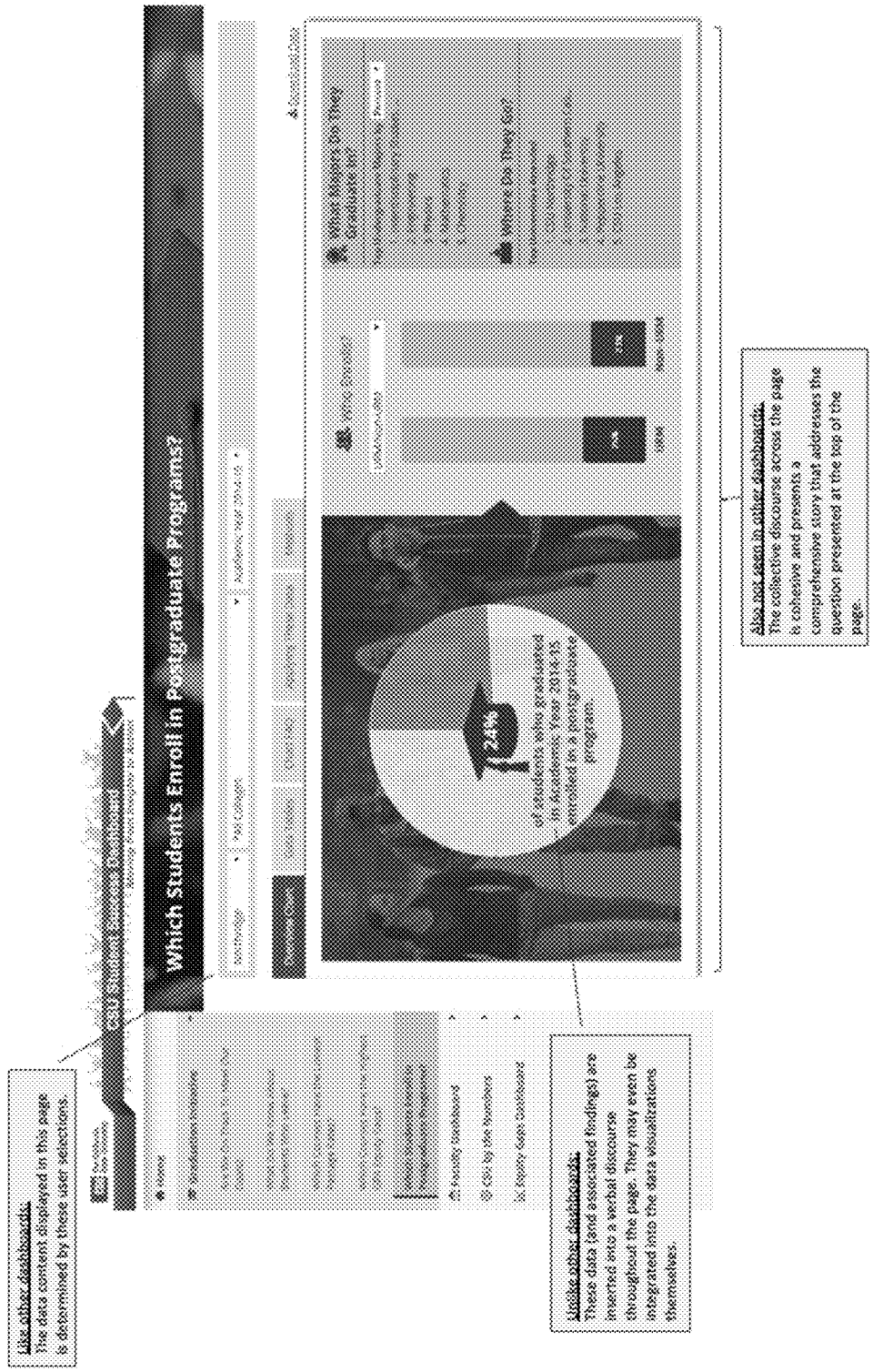
FIG. 35 is an example of a Student Success Dashboard graphic interface screen illustrating certain aspects of preferred embodiments of the invention and shows a page providing information about Which Students Enroll in Postgraduate Programs?

Referring now to FIG. 35, FIG. 35 shows an example of a Student Success Dashboard graphic interface screen illustrating certain aspects of preferred embodiments of the invention and shows a page providing information about Which Students Enroll in Postgraduate Programs? FIG. 35 also shows menu options on the left side of the page with tab menus displayed across a ribbon feature at the top. Multiple graphs are generated and displayed on each page, including trend graphs, pie charts with text and number labelling layered on the graphs for emphasis, bar graphs, and population size/comparison displays. Distilling big data into manageable and easy to understand displays provides for rapid understanding across multiple groups of shareholders and decision-makers.

Figure 36:
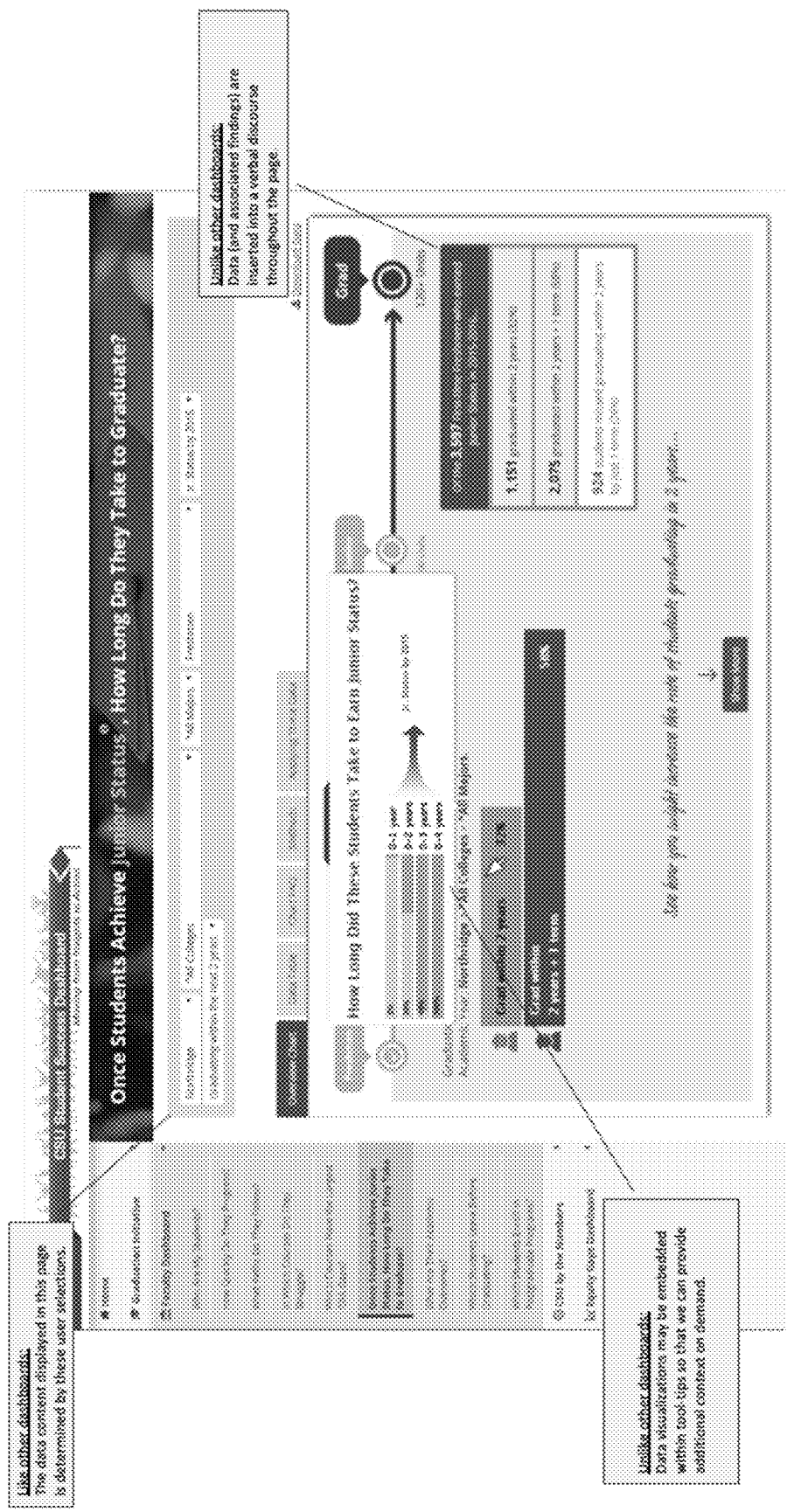
FIG. 36 is an example of a Student Success Dashboard graphic interface screen illustrating certain aspects of preferred embodiments of the invention and shows a page providing information about Once Students Achieve Junior Status How Long Do They Take to Graduate?

Referring now to FIG. 36, FIG. 36 shows an example of a Student Success Dashboard graphic interface screen illustrating certain aspects of preferred embodiments of the invention and shows a page providing information about Once Students Achieve Junior Status How Long Do They Take to Graduate? FIG. 36 also shows menu options on the left side of the page with tab menus displayed across a ribbon feature at the top. Multiple graphs are generated and displayed on each page, including trend graphs, pie charts with text and number labelling layered on the graphs for emphasis, slidable bar graphs, population size/comparison displays, and dynamic/changeable pop-up displays are available. Distilling big data into manageable and easy to understand displays provides for rapid understanding across multiple groups of shareholders and decision-makers.

Figure 37:
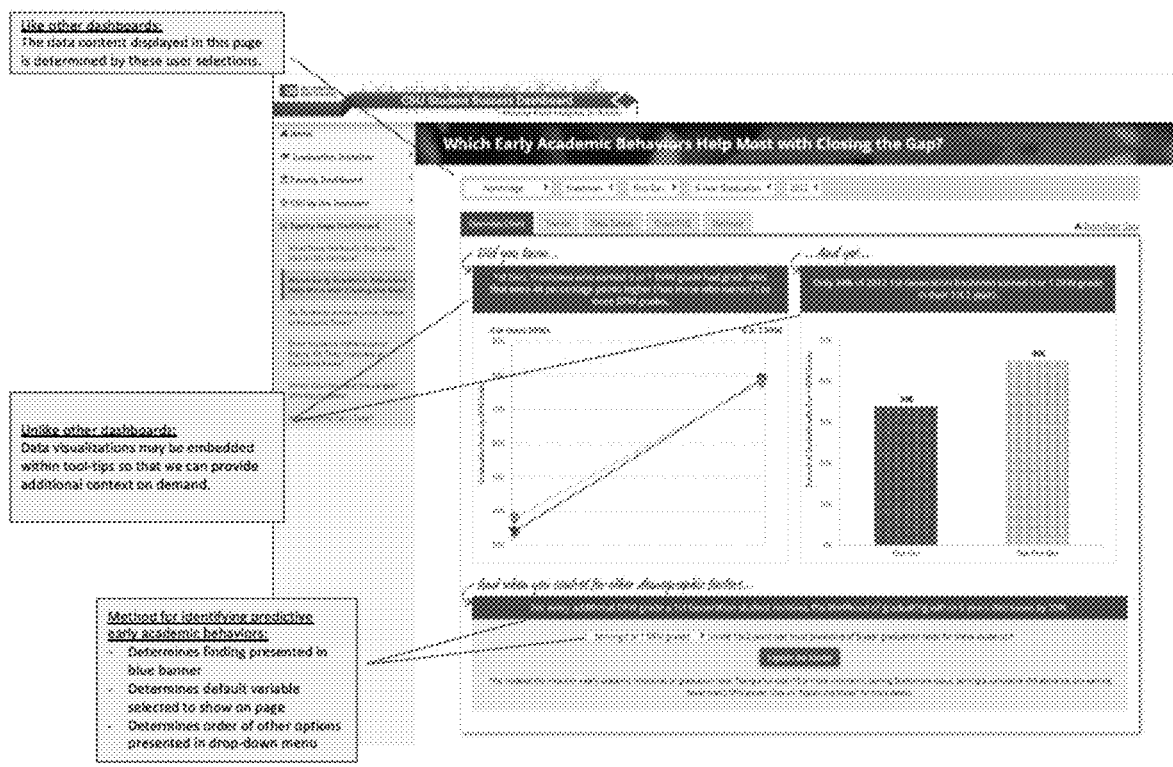
FIG. 37 is an example of a Student Success Dashboard graphic interface screen illustrating certain aspects of preferred embodiments of the invention and shows a page providing information about Which Early Academic Behaviors Help Most with Closing the Gap?

Referring now to FIG. 37, FIG. 37 shows an example of a Student Success Dashboard graphic interface screen illustrating certain aspects of preferred embodiments of the invention and shows a page providing information about Which Early Academic Behaviors Help Most with Closing the Gap? FIG. 37 also shows menu options on the left side of the page with tab menus displayed across a ribbon feature at the top. Multiple graphs are generated and displayed on each page, including predictive bannering, links to key variables, links to other pages, method for identifying key academic indicators, comparative trend graphs, pie charts with text and number labelling layered on the graphs for emphasis, bar graphs, and population size/comparison displays. Distilling big data into manageable and easy to understand displays provides for rapid understanding across multiple groups of shareholders and decision-makers.

Figure 38:
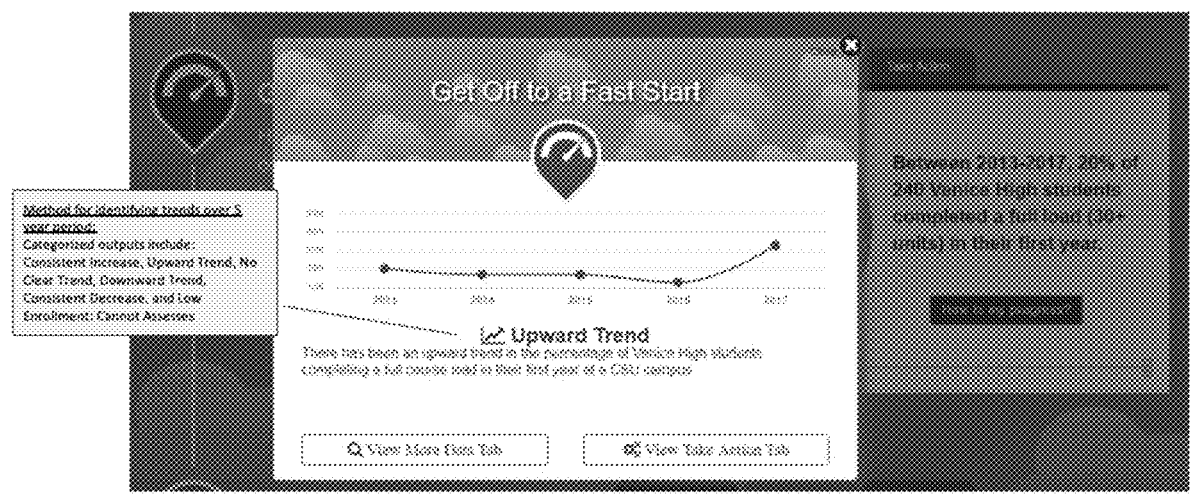
FIG. 38 is an example of a Student Success Dashboard graphic interface screen illustrating certain aspects of preferred embodiments of the invention and shows a page providing information about identifying trends such as "Getting Off to a fast Start".

Referring now to FIG. 38, FIG. 38 shows an example of a Student Success Dashboard graphic interface screen illustrating certain aspects of preferred embodiments of the invention and shows a page providing information about identifying trends such as "Getting Off to a fast Start". FIG. 38 also shows menu options on the left side of the page with tab menus displayed across a ribbon feature at the top. Multiple graphs are generated and displayed on each page, including links to other pages, method for identifying key academic indicators, comparative trend graphs, pie charts with text and number labelling layered on the graphs for emphasis, bar graphs, and population size/comparison displays. Distilling big data into manageable and easy to understand displays provides for rapid understanding across multiple groups of shareholders and decision-makers.

Figure 39:
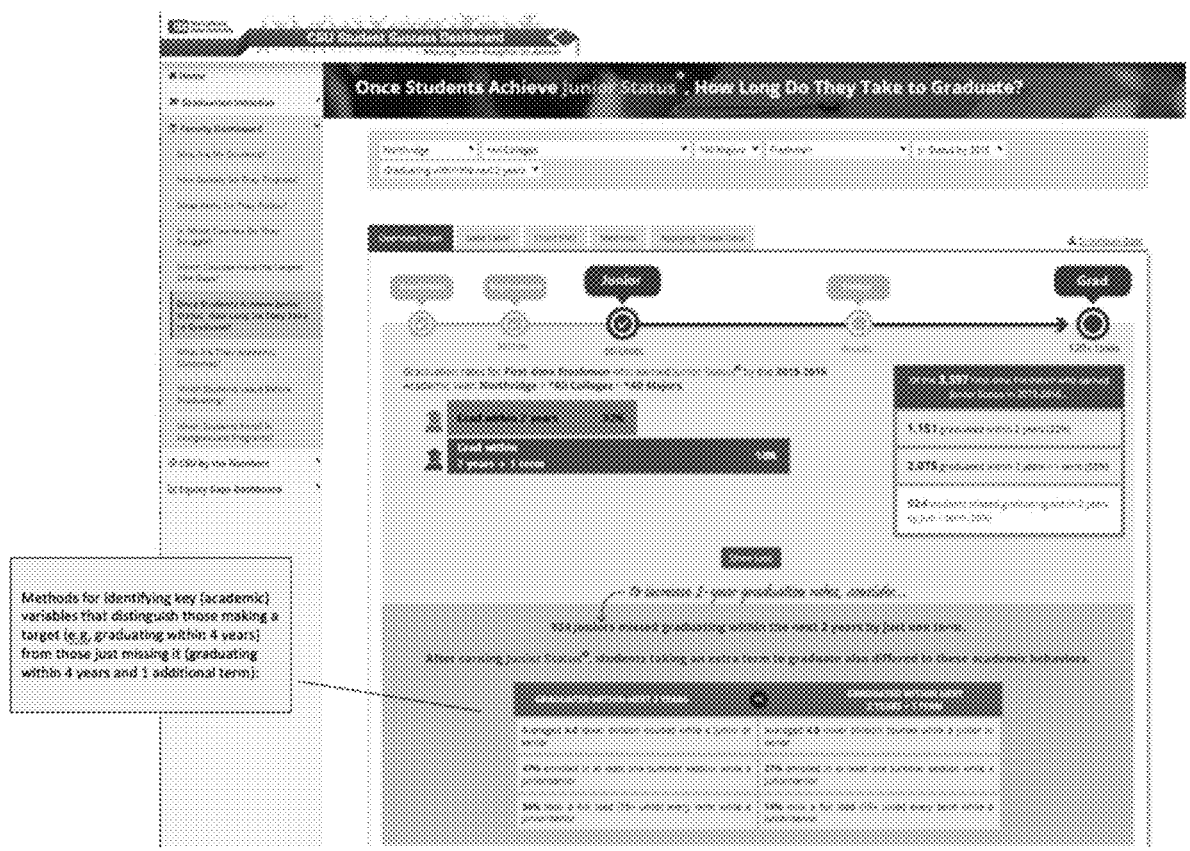
FIG. 39 is an example of a Student Success Dashboard graphic interface screen illustrating certain aspects of preferred embodiments of the invention and shows a page providing information about How Long Do They Take to Graduate and identifying key academic variables.

Referring now to FIG. 39, FIG. 39 shows is an example of a Student Success Dashboard graphic interface screen illustrating certain aspects of preferred embodiments of the invention and shows a page providing information about How Long Do They Take to Graduate and identifying key academic variables. FIG. 39 also shows menu options on the left side of the page with tab menus displayed across a ribbon feature at the top. Multiple graphs are generated and displayed on each page, including links to other pages, method for identifying key academic indicators, comparative trend graphs, pie charts with text and number labelling layered on the graphs for emphasis, bar graphs, and population size/comparison displays. Distilling big data into manageable and easy to understand displays provides for rapid understanding across multiple groups of shareholders and decision-makers.

Figure 40:
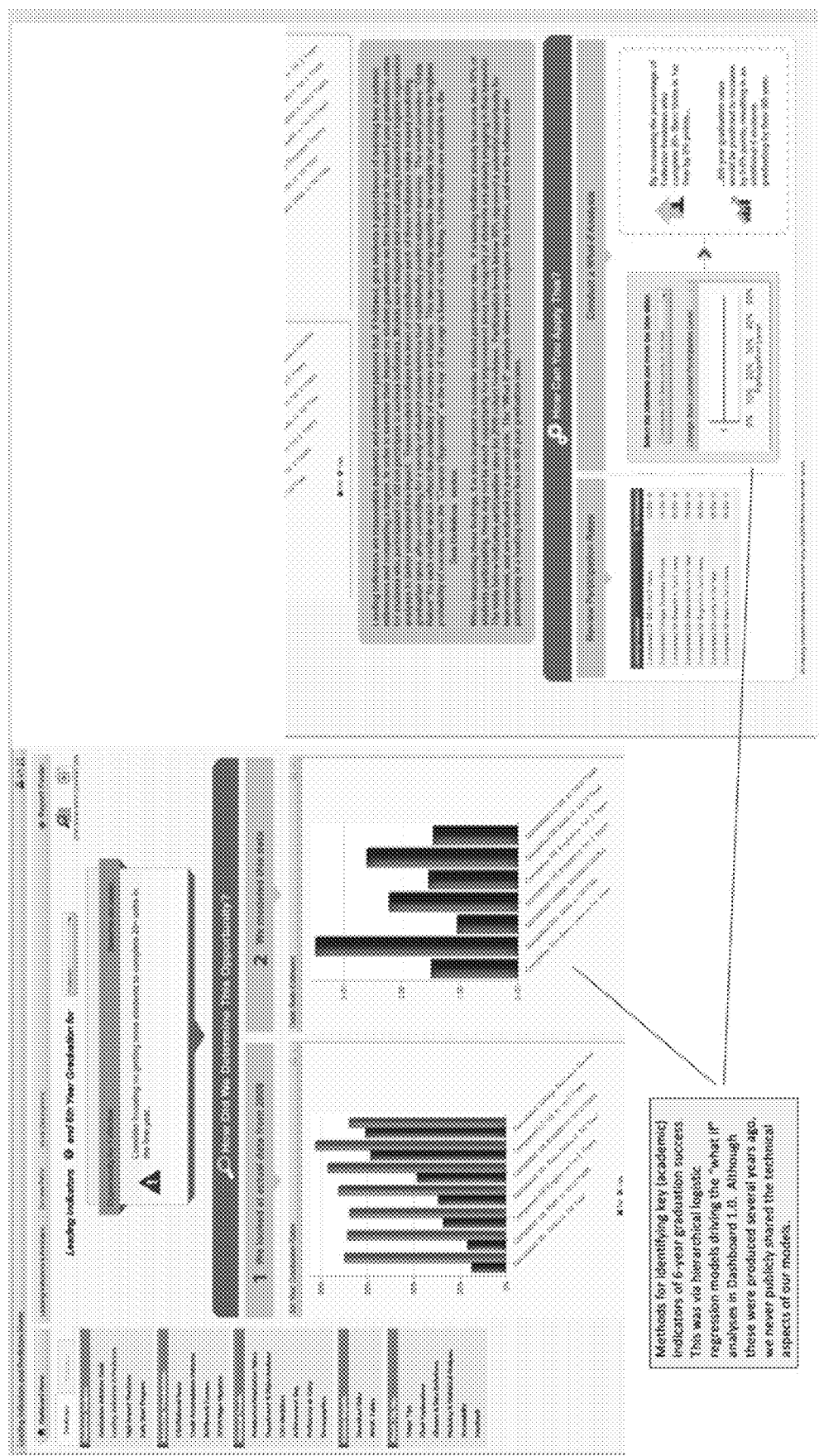
FIG. 40 is an example of a Student Success Dashboard graphic interface screen illustrating certain aspects of preferred embodiments of the invention and shows a page providing information about Leading Indicators.

Referring now to FIG. 40, FIG. 40 shows an example of a Student Success Dashboard graphic interface screen illustrating certain aspects of preferred embodiments of the invention and shows a page providing information about Leading Indicators. FIG. 40 also shows menu options on the left side of the page with tab menus displayed across a ribbon feature at the top. Multiple graphs are generated and displayed on each page, including links to other pages, method for identifying key academic indicators, comparative trend graphs, pie charts with text and number labelling layered on the graphs for emphasis, bar graphs, and population size/comparison displays. Distilling big data into manageable and easy to understand displays provides for rapid understanding across multiple groups of shareholders and decision-makers.

Figure 41:
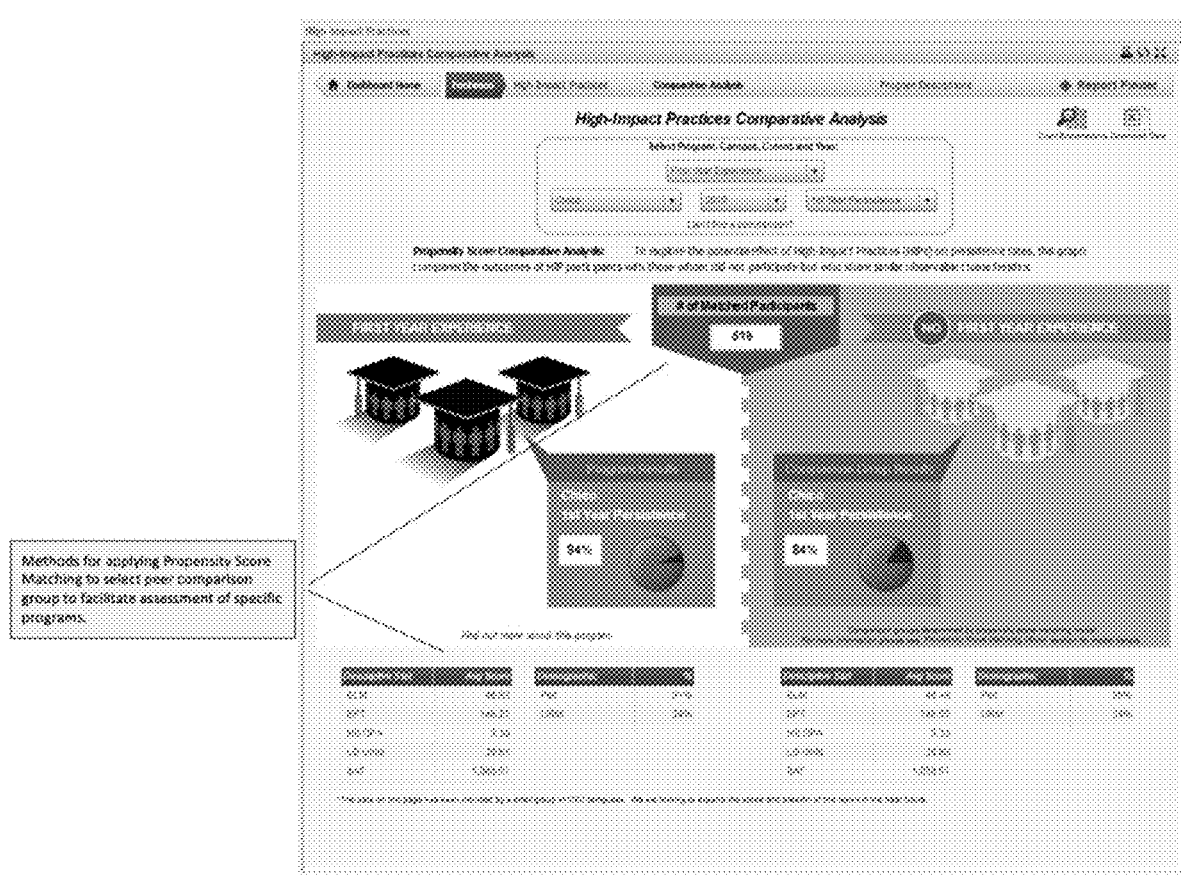
FIG. 41 is an example of a Student Success Dashboard graphic interface screen illustrating certain aspects of preferred embodiments of the invention and shows a page providing information about High Impact Practices Comparative Analysis.

Referring now to FIG. 41, FIG. 41 shows an example of a Student Success Dashboard graphic interface screen illustrating certain aspects of preferred embodiments of the invention and shows a page providing information about High Impact Practices Comparative Analysis. FIG. 41 also shows menu options on the left side of the page with tab menus displayed across a ribbon feature at the top. Multiple graphs are generated and displayed on each page, including campus by camp[us system-wide comparisons, links to other pages, method for identifying key academic indicators, comparative trend graphs, pie charts with text and number labelling layered on the graphs for emphasis, bar graphs, and population size/comparison displays. Distilling big data into manageable and easy to understand displays provides for rapid understanding across multiple groups of shareholders and decision-makers.

Figure 42:
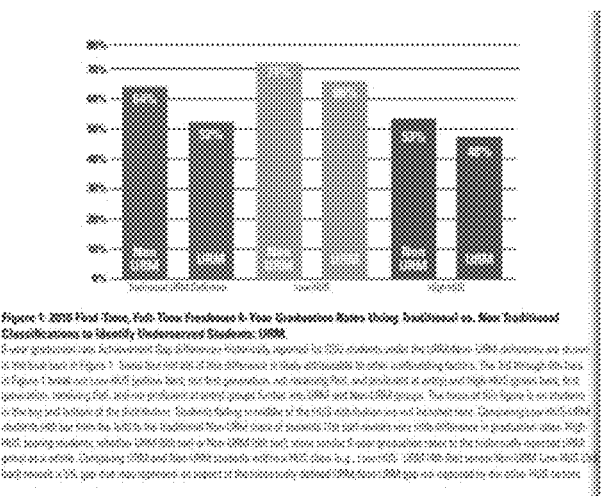
FIG. 42 is an example of a Student Success Dashboard graphic interface screen illustrating certain aspects of preferred embodiments of the invention and shows a page providing information about Using Traditional vs. Nontraditional Classifications for Under-represented Minorities.

Referring now to FIG. 42, FIG. 42 shows an example of a Student Success Dashboard graphic interface screen illustrating the ability to insert historical data and publications to provide information about Using Traditional vs. Non-traditional Classifications for Under-represented Minorities.

FIG. 43 is a graphic flowchart illustrating that the invention may comprise in preferred embodiments one or more modules from student-based module, a campus-based module, a faculty-based module, and an external academic module.

In one preferred embodiment, the invention comprises from 2 to 9 student data modules. In another preferred embodiment, the invention comprises from 2 to 5 student modules. In another preferred embodiment, the invention comprises from 3 to 7 student modules. In another preferred embodiment, the invention comprises at least 5 student modules.

In one preferred embodiment, the invention comprises from 2 to 9 campus data modules. In another preferred embodiment, the invention comprises from 2 to 5 campus modules. In another preferred embodiment, the invention comprises from 3 to 7 campus modules. In another preferred embodiment, the invention comprises at least 5 campus modules.

In one preferred embodiment, the invention comprises from 2 to 9 faculty data modules. In another preferred embodiment, the invention comprises from 2 to 5 faculty modules. In another preferred embodiment, the invention comprises from 3 to 7 faculty modules. In another preferred embodiment, the invention comprises at least 5 faculty modules.

In one preferred embodiment, the invention comprises from 2 to 5 external academic-related data modules. In another preferred embodiment, the invention comprises from 3 to 5 academic-related data modules. In another preferred embodiment, the invention comprises at least 2 academic-related data modules.

Figure 44:
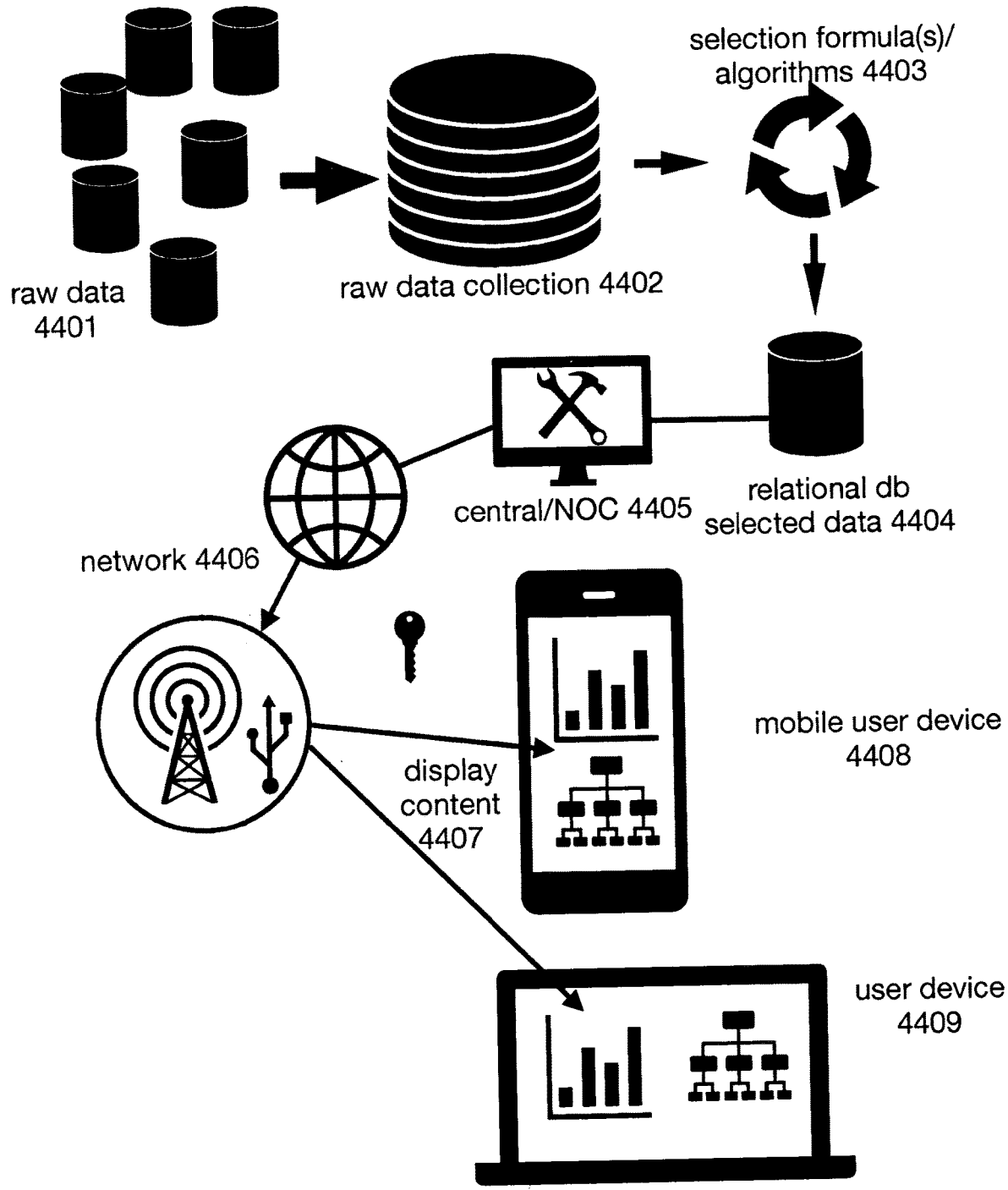
FIG. 44 is a graphic illustration showing a system that receives raw data and processes the raw data into selected data, which is then used to generate display content for sending to remote devices.

FIG. 44 is a graphic flowchart of a system for collecting raw data 4401 into a server or similar database storage facility 4402, processing said raw data into selected data using formulas or calculations 4403, saving the selected data to a relational database 4404, using a central node or network operation center (NOC) 4405 for generating display content from the selected data in the relational database, and transmitting via a network 4406 the display content 4407 to mobile user devices 4408 or other, e.g. desktop/laptop user devices 4409.

The central node may also provide for monitoring and controlling the data sources, database management, data decoupling and output selection, device detection feedback, output data source distribution to a display device, and the updating of output data sources for repurposing a display device.

Data sources are shown feeding into database server to convert external data into extracted, validated, cleaned (removing legacy formatting and non-essential information), report-specific, distribution-ready, and device-coded (EVC-RDD) data. External data sources represent heterogeneous data sources that require specific ontologies to resolve the semantic conflicts inherent in the data sources. Server is used to detect the format of the incoming external data sources, and to extract, clean, convert, and validate, the data into a data structure useable by the inventive system and processes. External data sources as source data will necessarily include variables specific to the originating source, including for example hardware standards (Variable 1, Var1), operating system data handling standards and file handling standards (Variable 2, Var2), and program/application handling standards (Variable 3, Var3).

Raw data server feeds into Reconfigurable Relational Database (RRDB) to achieve data integration processes necessary for the present invention. Data integration processes for periodically taking data from heterogenous sources and loading into one or more target database(s) include the steps of: (1) data mapping; (2) code generation to create and/or update transformation programs to extract and load the target record data; (3) verification, which includes the sub-processes of checking the accuracy of translation, checking the completeness of the translation, and checking to ensure that the loaded data is supported in the new system; and (4) cleaning, which can include the subprocesses of checking with Quality of Data standards, eliminating redundant data, removing obsolete data, and matching the new data structure requirements for the data at the target/destination/DB.

Also contemplated within the scope of the invention, as an alternative or partial process alternative to a Data Integration Conversion program or Master Data Recast program, is the conversion to an intermediate data format such as tab delimited text files or common separated text files with subsequent export to the target format.

Reconfigurable Relational DB uses standard Data Markup Language (DML) database programs includes Sybase, MySQL, DB2, SQL server, and Oracle. It is also contemplated as within the scope of the invention to use a Data Hub and/or a Data Lake approach in place of structured relational data warehouse approaches. Also, data integration is illustrated using a single DB server and a single relational DB. However, in practice, data integration solutions commonly use multiple forms of virtualization, including virtual servers and virtual databases, which are contemplated as within the scope of the invention. The use of adapters, software applications, and recasting to tag or wrap data and data sources provides a solution to the problems arising from heterogeneous sources. Data virtualization and data federalization provide the user the ability to handle data from disparate sources.

The Central Node (NOC) is used by the database administrator. Database tools and utilities within the Network operation center (NOC) allows the administrator to configure and manage the DB. Database parameters may include specifying the path of an input file, adding system identifiers, identifying port numbers for listener servicing, assigning hostname for the DB, user names and passwords, scheduling, mail and notification control, connecting and configuration of networks, servers, and hosts, upgrading software and features, restoring files and database information, library location, virtualization configuration, virtualization management, virtualization information, reporting requirements, and so forth. Additionally, the Network operation center (NOC) provides additional configuration control, including type, size and capability of the computing engine, persistence parameters, encryption, input and output parameters, latency, load balancing, OS support, security, maintenance, billing, autoboot backup take-over in case of failure, and the like.

Remote access includes a secure off-site desktop, laptop, tablet, or smart device that provides an administrator with access to control and manage the Network operation center (NOC).

Virtual Private Network (VPN) is optionally connected in some preferred embodiments to the Network operation center (NOC) to address some of the virtualization needs of the system.

Output from the inventive system is then delivered to external target devices with distribution according to the specific target destination device. In the example of a smartphone, connection is through a cellular network such as the LTE (Long term Evolution) Evolved Packet Core (EPC) and the Evolved UMTS Terrestrial Radio Access Network (E-UTRAN) which uses radio towers to carry allotted signals to the smartphone. In another example contemplated as within the scope of the invention, distributed connection is by way of a wireless router (WiFi) and is used to connect either a smartphone or a WiFi (or Bluetooth or similar) device or tablet. In yet another example contemplated as within the scope of the invention a remote display is connected, by wire or wirelessly, to receive the output data.

In one non-limiting preferred embodiment, these elements are logically and conceptually categorized into five (5) Tiers, namely the Presentation Tier, the Business Tier, the Integration Tier, the Data Tier, and the Source Provider (Tier).

As a structural overview, Presentation Tier comprises a web server connected to the Internet. The web server is programmed to access the remote multi-user enrollment, progress, and degree completion display system via a Cloud Platform-as-a-Service node.

The Cloud PaaS node is logically located in the Business Tier and is connected to Amazon Web Services S3 (AWS), FireBase, and Degree Completion Stats (DCC-Stats) module. AWS and FireBase are logically located in the Data Tier. Degree Completion Stats (DCC-Stats) module (Server) is logically located in Source Provider Tier. AWS is connected to Windows Server located in Integration Tier. Windows Server is connected to SQL Server logically located in Data Tier, and is connected to facility servers multi-user enrollment, progress, and degree completion display system.

A web server uses an open-source modular content management framework to install, administer, and manage websites. A web server, as a Content Management System (CMS), provides user account registration and maintenance, menu management, RSS feeds, taxonomy, page layout customization, and system administration. A web server may be written in PHP computing language, runs on any computing platform, and supports both web server functions and database storage and configuration.

A web server's features include access statistics and logging, searching, user profiles, multi-layer access control restrictions, workflow triggers and actions, multi-level menus, support for multiple sites, multi-user access for content creation and editing, feature throttling to enhance performance, descriptive URLs, RSS feeds, blogs and forums, and OpenID authentication support. A web server's database functions use PHP data objects to abstract the database, thus avoiding the need to write SQL queries as text strings.

The invention also contemplates, as one alternative, the use of a cloud-based Platform As A Service (PAAS) that provides the system administrator to deploy, run, and manage applications (source code program) written in various computer languages, including Ruby, Node.js, Java, Python, Clojure, Scala, Go, and PHP The cloud-based platform functions can be divided into two buckets: (1) application development and deployment, and (2) runtime operation of the cloud-based platform and post-deployment functions of the application.

AWS S3 is the Amazon Simple Storage Service (S-S-S=S3) part of the Amazon Web Services (AWS) suite of cloud computing services, and provides scalable, large capacity storage and computing without needing to build a physical server farm. AWS itself consists of 9 main product areas that comprises a total of over 70 different services. The nine main product areas include computing, networking, content delivery, storage and content delivery, database, deployment, management, application services, and analytics. AWS S3 services use hypertext transfer protocol (HTTP) as the access protocol for accessing over the web, and use the Representational State Transfer (REST) architecture, Simple Object Access Protocol (SOAP) protocol, and BitTorrent. The REST architecture is the same architecture of the world wide web (WWW) and uses the HTTP communication protocol with HTTP verbs (GET, POST, PUT, DELETE) and Uniform Resource Identifiers (URIs) to identify web resources and interface with external systems. The SOAP protocol specifies the exchange of structured information using the XML Information Set for formatting (envelope, header, body) and application layer protocol HTTP and SMTP to negotiate and transmit information. BitTorrent is a peer-to-peer file sharing communication protocol which spreads transmission and receipt of data over multiple peer client computers called Seeds. BitTorrent is a low-bandwidth way of transmitting large amounts of data by having the user transmit or receive a file that is described in a small torrent descriptor file with the original file broken into equal sized segments, encrypted, and transmitted non-sequentially through a swarm/group/network of connected peer computers. The torrent descriptor file allows correct reassembly of the file at the destination and allows or removes any time requirements or continuity requirements typical of a standard upload or download.

The invention may also use data services product that provides global enrollment, progress, and degree completion data to users. These data elements may include scheduled admission times, estimated graduation times, actual degree completion times, student information, ethnicity information, financial (PELL) information, degree requirements information, course information, admissions information, faculty information, student rate of degree completion information, University-peer group comparative information, student support information and student tracking information, delay calculations, campus information, classroom information, course equipment information, degree completion performance for university's, degree completion on-time percentage, performance/delay index, and degree of lateness probabilities information. In one preferred embodiment, this data is aggregated as an Enrollment, Progress, and Degree Completion Identification Display System (EPDC-IDS) as an API in a standardized format via a streaming data source using a simple request/response protocol.

Referring now to FIG. 45, FIG. 45 is a graphic flowchart of a method for displaying student degree completion information on a mobile user devices or desktop/laptop user devices. In this non-limiting preferred embodiment of the invention, an administrator generates a specific data set from a combination of multiple variables taken from the relational database. The data set is interrogated and selected transformational mathematical models are then run on the data set, generating multiple variations of display outputs, including graphs, moving images, charts and so forth. The display outputs are then evaluated against a specific audience, e.g. student, faculty, admin, external, for which the display is intended, and the assessed strength of the match between the display output and the specific audience is output as a narrative strength measure. When a specific display output is found to be a strong match for the specific audience, the display output is finalized and added to a system containing a collection of display outputs, e.g. as a website.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

Having described embodiments for the invention herein, it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims:

1. A computer-implemented system for providing reports on student progress towards completion of an undergraduate degree, comprising:

a database computer having programming instructions saved to memory and executable by a first processor that (i) detect a format of incoming heterogeneous external raw data, (ii) extract, clean, convert and validate the heterogeneous external raw data into a plurality of selected university (SU) data having a target data structure, and (iii) store the SU data in a relational database, wherein converting the heterogeneous external raw data comprises mapping the heterogeneous external raw data, extracting the mapped data, coding the extracted mapped data and validating the coded extracted mapped data using the programming instructions in a data decoupling module of the database computer;

a remote raw data feed computer in communication with the database computer, the remote raw data feed computer having programming instructions saved to memory and executable by a second processor that receives, stores, and transmits raw data from multiple sources, said multiple sources comprising a university academic data (AD) source comprising student level input variable (SLIV) data, said SLIV data comprising 527 variables per student, a university financial aid data (FAD) source comprising financial aid student level input variable (FA-SLIV) data, said FA-SLIV data comprising 115 variables per student, a university education advisory board (EAB) data source comprising education advisory board student level input variable (EAB-SLIV) data, said EAB-SLIV data comprising 44 variables per student, a national student clearinghouse (NSC) data source comprising national student clearinghouse student level input variable (NSC-SLIV) data, said NSC-SLIV data comprising 32 variables per student, a state employment development department (SEDD) data source comprising state employment development department student level input variable (SEDD-SLIV) data, said SEDD-SLIV data comprising 10 variables per student, a national survey for student engagement (NSSE) data source comprising national survey for student engagement student level input variable (NSSE-SLIV) data, said NSSE-SLIV data comprising 113 variables per student, a cooperative institutional research program-freshman survey (CIRP-FS) data source comprising cooperative institutional research program-freshman survey student level input variable (CIRPFS-SLIV) data, said CIRPFS-SLIV data comprising 52 variables per student, a major cross-reference mapping (MAJ) data source comprising MAJ data, said MAJ data comprising a first 3 variables per student, a department cross-reference mapping (DEPT) data source comprising DEPT data, said DEPT data comprising a second 3 variables per student, and an IPEDS national peers (PEERS) data source comprising IPEDS national peers campus level input variable (PEERS-CLIV) data, said PEERS-CLIV data comprising 2159 variables per campus, wherein the database computer is configured to generate the SU data from selections of the raw data comprising:

a selection of the SLIV data comprising 101 of the 527 variables per student, a selection of the FAD-SLIV data comprising 2 of the 115 variables per student, a selection of the NSC-SLIV data comprising 7 of the 32 variables per student, a selection of the MAJ data comprising the first 3 variables per student, a selection of the DEPT data comprising the second 3 variables per student, and a selection of the PEERS-CLIV data comprising 12 of the 2159 variables per campus, wherein the programming instructions on the database computer comprise a university dashboard data module configured to generate from the SU data a first output of student level input variables comprising 108 variables per student and a second output of 18 variables per campus, wherein the raw data is selected from the group consisting of: university student enrollment data, university student progress data, university student degree completion data, university campus data, university student biographical data, university course data, university faculty data, state-wide university student statistics data, national university student statistics data, university student test data, university student financial data, university student high school and/or community college data, university student enrollment data, university student attendance data, university student retention data, and combined forms of group university student data;

wherein the SU data comprises variables selected from the group consisting of: campus assigned student ID, campus code, campus GPA, citizenship code, concentration code, university race/ethnicity reporting category, cumulative campus pre-collegiate units attempted, cumulative campus state-supported units attempted, cumulative campus units earned, degree level code, degree objective code, employee identification number, English proficiency status, enrollment status, entry level mathematics proficiency status, ethnic code (old), fathers' parent/guardian education code, Federal Pell grant award, high school GPA, Hispanic/Latino ethnic category, Hispanic/Latino status, institution origin code, IPEDS race/ethnicity reporting category, major code, mathematics/quantitative reasoning placement status, matriculation period, matriculation type, mother's parent/guardian education code, social security number, term code, term units attempted—lower division, term units attempted—pre-collegiate, term units attempted—upper division, total GPA, total units earned, transfer units earned, year, campus ID, course abbreviation, course number, course suffix, course section, course section credit units, grade, course title, course level, course section credit units—modified, campus_ID, cohort_group, cohort_type, DEG_campus, DEG_concentration_code, DEG_term, DEG_totGPA, DEG_totunitsearned, DEG_transGPA, DEG_transunitsearned, DEG_year, DEG_major_degree_code, ethnicity, empl_ID, enroll_status, first_gen_status, gender, IPEDS_race_ethnicity, maj_opt_conc_emph, major_code, math_qr_placement_status, Pell_status, remediated, remediation_status, student_level, term_units_att_total, URM_status, yr1_retention_samecampus, yr2_retention_samecampus, yr3_retention_samecampus, yr4_retention_samecampus, yr5_retention_samecampus, yr6_retention_samecampus, yr7_retention_samecampus, yrterm, cohort, major, precollunits, studentlevel, totunits, udunits, requester return field, college name, 2-year/4-year, enrollment begin, enrollment end, graduated?, and graduation date;

wherein the system further includes a database management system configured to (i) define, create, query, update, and administer the relational database, (ii) generate a specific data set from a combination of the variables from the relational database, (iii) interrogate the specific data set and run selected transformational mathematical models on the specific data set, (iv) generate display outputs, (v) evaluate the display outputs against an audience for which the display output is intended, the audience being selected from a student, a faculty, a campus administrator, and an external stakeholder, and (vi) finalize the display output;

wherein the system further includes a plurality of user devices in communication with the database computer, the plurality of user devices selected from a smartphone, a desktop, laptop, a tablet, and a remote display device, the plurality of user devices comprising a plurality of student devices, a plurality of faculty devices, a plurality of campus devices, and a plurality of external stakeholder devices, each of the plurality of user devices comprising program instructions executable by a third processor and configured to generate a plurality of dashboard displays using the display output and the SU data having the target data structure, wherein the plurality of dashboard displays comprise a graduation progress dashboard, a faculty dashboard, a campus tracking dashboard, and an equity gaps dashboard, said program instructions executable by the third processor in each of the plurality of user devices retrieve the SU data from the relational database and/or the display output from the database management system and graphically display a graph, chart, or selection menu in one of the plurality of dashboard displays on a corresponding one of the plurality of user devices, wherein the graph, the chart and the selection menu include at least some of the SU data and the display output, wherein the programming instructions executable by the first processor in the database computer allow the campus devices and the faculty devices to display a colorimetric display of progress towards graduation, student_level-based prediction graphs, charts and selection menus for progress towards graduation, contributing factors graphs, charts and selection menus comprising variables relating to a cohort year, a term, a campus, a student level, a student type, and a student identifier, departing students academic and background characteristics graphs, charts and selection menus, full units load graphs, charts and selection menus, student background vs. time to degree graphs, charts and selection menus, academic behaviors graphs, charts and selection menus, first junior status achievement graphs, charts and selection menus, and post-junior status graphs, charts and selection menus, wherein the programming instructions executable by the first processor in the database computer allow the campus devices to further display course passage rates graphs, charts and selection menus, course and GPA equity gap graphs, charts and selection menus, first post-graduate enrollment graphs, charts and selection menus, student populations graphs, charts and selection menus, historical graduation rate graphs, charts and selection menus, equity gaps graphs, charts and selection menus, high school and community college feeder schools graphs, charts and selection menus, equity gap by campus graphs, charts and selection menus, and GPA equity gap by course graphs, charts and selection menus, wherein the programming instructions executable by the first processor in the database computer allow the faculty devices to further display student type graphs, charts and selection menus, progress rate graphs, charts and selection menus, majors view graphs, charts and selection menus, course struggle graphs, charts and selection menus, GPA equity gap graphs, charts and selection menus, second junior status achievement graphs, charts and selection menus, academic outcomes graphs, charts and selection menus, student departure graphs, charts and selection menus, and second post-graduate enrollment graphs, charts and selection menus, wherein the programming instructions executable by the first processor in the database computer allow the external stakeholder devices to display state-wide peer comparison graphs, charts and selection menus, national peer comparison graphs, charts and selection menus, in-state high school graphs, charts and selection menus, in-state church partners graphs, charts and selection menus, and in-state community college graphs, charts and selection menus, wherein the system further includes a web server in communication with the database computer and with the plurality of user devices, said web server having programming instructions saved to memory and executable by a fourth processor that access a central node of the relational database and that (i) generate or manage and (ii) store access statistics, logging, searching, user account registration and maintenance, user profiles, multi-layer access control restrictions, workflow triggers and actions, multi-level menus, support for multiple sites, multi-user access for content creation and editing, and authentication, wherein the student devices have access to the system based on a student sign-in and are limited to student menus, student displays, and student data formatted for student reports, the plurality of faculty devices have access to the system based on faculty sign-in and are limited to faculty menus, faculty displays, and faculty data formatted for faculty reports, and the plurality of campus devices have access to the system based on campus sign-in and are limited to campus menus, campus displays, and campus data formatted for campus reports.

2. The computer-implemented system of claim 1, further comprising a network operation center (NOC) configured with computer programming instructions executable by a fifth processor to:

(i) retrieve the SU data from the relational database,
(ii) transmit the SU data to the plurality of user devices, and
(iii) monitor and control receipt of the raw data from the multiple sources, manage the relational database, and monitor and control data decoupling and output selection, device detection feedback, and output data source distribution to the plurality of user devices.

3. The computer-implemented system of claim 2, further comprising:
a user smart phone device registered with the NOC, where the user smart phone device has a university mobile application installed thereon, the university mobile application contains user specific travel data, the user smart phone device includes a geolocating function selected from one or more of GPS, WiFi, cellular LTE and/or LTE advanced, Bluetooth, Satellite and near-field communication (NFC),
said university mobile application configured to generate a graphical enrollment, progress, and graduation completion aid by combining the user specific data with the selected university data in the relational database using computer program instructions in the NOC to generate re-aggregated filtered device-modified special purpose selected university data;
said NOC configured to transmit the graphical enrollment, progress, and graduation completion aid to the user smart phone device, wherein the NOC is configured with computer programming instructions to transmit the graphical graduation, progress, and graduation completion aid to the user smart phone device,
said NOC configured with computer programming instructions to monitoring and controlling the data sources, relational database management, data decoupling and output selection, device detection feedback, output data source distribution, and updating the re-aggregated filtered device-modified special purpose output data and graphical graduation, progress, and graduation completion aid, and
said university mobile application configured to provide a selected university data user interface (UI) to a display on the user smart phone device, said user smart phone device connected to a centralized data collection node, said user interface comprising:
a UI data sources region configured to display links to periodically-provided university data sources selected from the group consisting of a university data source and a media data source;
a UI system management region configured to display system management tools for centralized management and distribution of university content media,
at least one additional UI region configured to display information relating to the at least one additional UI region, wherein the at least one additional UI region is selected from a UI manage relational database region, a UI manage remote display region, a UI manage customer/user mobile devices region, a UI emergency management region, a UI archive region, a UI manage network region, a UI generate reports region, a UI communication region, a UI alert region, and a UI system parameters region.

4. The computer-implemented system of claim 3, wherein the NOC registers the user smart phone device by sending a notification, triggered by a geolocation feature in the university mobile application indicating the user smart phone device is at the university, wherein the notification is selected from the group consisting of: an automated text message from the user smart phone device to a pre-set list of mobile numbers or emails selected by the user in the university mobile application; an arrival notification sent to the NOC; and an arrival notification sent to the university.

5. The computer-implemented system of claim 3, configured to generate and send an alert to the user smart phone device by measuring the user enrollment, progress, and graduation completion information, calculating the enrollment, progress, and graduation completion and a target, calculating a user rate of enrollment, progress, and graduation completion based on actual enrollment, progress, and graduation completion information, calculating a time to graduation completion, comparing the time to graduation completion to target time data (TTD) for the student to reach graduation completion, generating an enrollment, progress, and graduation completion report when the user is not on schedule to reach graduation completion in a timely manner, sending the enrollment, progress, and graduation completion report and a graphic alert to the NOC, to the university, and to the user to notify the user and the university that the user is not on schedule to graduate on time.

6. The computer-implemented system of claim 5, wherein the graphic alert includes one or more alerts selected from a color change to the graphic, a sound alert, and a recorded message.

7. The computer-implemented system of claim 6, wherein the graphic alert is the color change to the graphic, and the color change to the graphic is in direct relation to difference in time between the calculated time to graduation completion and the TTD.

8. The computer-implemented system of claim 1, further comprising a plurality of programmable interfaces that provide different ones of the modules to different ones of plurality of user devices, based upon the user device that is accessing the computer-implemented system.

9. The computer-implemented system of claim 8, further comprising an application programming interface (API) architecture that defines the plurality of programmable interfaces.

10. The computer-implemented system of claim 1, wherein the database management system is further configured to assess a strength of a match between the display output and the audience, and finalize the display output when one of the display outputs is a strong match for the intended audience.

11. The computer-implemented system of claim 1, wherein the database management system is further configured to (i) define the relational database by creating, modifying and removing definitions that organize the raw data, and (ii) administer the relational database by registering and monitoring users, enforcing data security, monitoring performance, maintaining data integrity, dealing with concurrency control, and recovering corrupted information.

12. The computer-implemented system of claim 1, wherein the graphs, charts, and selection menus to be displayed on the campus devices, the faculty devices and the external stakeholder devices are module-specific graphs, charts, and selection menus, and the programming instructions executable by the first processor in the database computer retrieve module-specific SU data from the relational database, perform calculations and/or functions using the module-specific SU data, and transmit instructions to the campus devices, the faculty devices and the external stakeholder to display the module-specific graphs, charts, and selection menus.

13. A non-transitory computer readable medium having computer program instructions embodied therewith for providing media content to a plurality of displays in a computer-implemented system for providing reports on student progress towards completion of an undergraduate degree, the computer program instructions executable by a first processor, wherein said computer program instructions, when executed by the first processor:

monitor and control a centralized data collection node of a network operation center (NOC) that includes a computer with a second processor linked to computer memory, receive raw data from multiple sources into the centralized data collection node, wherein the raw data comprises university student enrollment data, university student progress data, university student degree completion data, university campus data, university student biographical data, university course data, university faculty data, state-wide university student statistics data, national university student statistics data, university student test data, university student financial data, university student high school and/or community college data, university student attendance data, university student retention data, and combined forms of group university student data;

detect a format of incoming heterogeneous external raw data, extract, clean, convert and validate the heterogeneous external raw data into a plurality of selected university (SU) data having a target data structure, and store the SU data in a relational database, wherein converting the heterogeneous external raw data comprises mapping the heterogeneous external raw data, extracting the mapped data, coding the extracted mapped data and validating the coded extracted mapped data using programming instructions in a data decoupling module of a database computer;

generate selected university (SU) data by selecting from the raw data:
  A selection of university academic data (AD) comprising student level input variable (SLIV) data comprising 101 of 527 possible variables per student,
  a selection of university financial aid (FAD) SLIV data comprising 2 of 115 possible variables per student,
  a selection of national student clearinghouse (NSC) SLIV data comprising 7 of 32 possible variables per student,
  a selection of major cross-reference mapping (MAJ) data comprising a first 3 variables per student,
  a selection of department cross-reference mapping (DEPT) data comprising a second 3 variables per student, and
  a selection of IPEDS national peers campus level input variable (PEERS-CLIV) data, said PEERS-CLIV data comprising 12 of 2159 possible variables per campus, store the selected university data in a relational database, transmit the selected university data from the relational database to a plurality of remote display devices, wherein the plurality of display devices comprise a plurality of student devices, a plurality of faculty devices, a plurality of campus devices, and a plurality of external stakeholder devices, generate a plurality of dashboard displays using the selected university data, monitor and control receipt of the raw data, data decoupling and output selection, device detection feedback, output data source distribution to the plurality of display devices, and updating of output data sources for the plurality of display devices, manage the relational database, and provide a user interface to a university display connected to the centralized data collection node, said user interface comprising:
  a data sources region that displays links to the selected university data;
  a system management region that displays system management tools for centralized management and distribution of the selected university data, and
  at least one additional region selected from a manage relational database region, a manage remote display region, a manage customer/user mobile devices region, an archive region, a manage network region, a generate reports region, a communication region, an alert region, and a system parameters region that displays information relating to the at least one additional region, wherein the selected university data comprises variables selected from the group consisting of: campus assigned student ID, campus code, campus GPA, citizenship code, concentration code, university race/ethnicity reporting category, cumulative campus pre-collegiate units attempted, cumulative campus state-supported units attempted, cumulative campus units earned, degree level code, degree objective code, employee identification number, English proficiency status, enrollment status, entry level mathematics proficiency status, ethnic code (old), fathers' parent/guardian education code, Federal Pell grant award, high school GPA, Hispanic/Latino ethnic category, Hispanic/Latino status, institution origin code, IPEDS race/ethnicity reporting category, major code, mathematics/quantitative reasoning placement status, matriculation period, matriculation type, mother's parent/guardian education code, social security number, term code, term units attempted—lower division, term units attempted—pre-collegiate, term units attempted—upper division, total GPA, total units earned, transfer units earned, year, campus ID, course abbreviation, course number, course suffix, course section, course section credit units, grade, course title, course level, course section credit units—modified, campus_ID, cohort_group, cohort_type, DEG_campus, DEG_concentration_code, DEG_term, DEG_totGPA, DEG_totunitsearned, DEG_transGPA, DEG_transunitsearned, DEG_year, DEG_major_degree_code, ethnicity, empl_ID, enroll_status, first_gen_status, gender, IPEDS_race_ethnicity, maj_opt_conc_emph, major_code, math_qr_placement_status, Pell_status, remediated, remediation_status, student_level, term_units_att_total, URM_status, yr1_retention_samecampus, yr2_retention_samecampus, yr3_retention_samecampus, yr4_retention_samecampus, yr5_retention_samecampus, yr6_retention_samecampus, yr7_retention_samecampus, yrterm, cohort, major, precollunits, studentlevel, totunits, udunits, requester return field, college name, 2-year/4-year, enrollment begin, enrollment end, graduated?, and graduation date;

the dashboard displays comprise a graduation progress dashboard, a faculty dashboard, a campus tracking dashboard, and an equity gaps dashboard, the dashboard displays comprise one or more of a graph, a chart and a selection menu, the program instructions allow (i) the campus devices and the faculty devices to display a colorimetric display of progress towards graduation, student_level-based prediction graphs, charts and selection menus for progress towards graduation, contributing factors graphs, charts and selection menus comprising variables relating to a cohort year, a term, a campus, a student level, a student type, and a student identifier, departing students academic and background characteristics graphs, charts and selection menus, full units load graphs, charts and selection menus, student background vs. time to degree graphs, charts and selection menus, academic behaviors graphs, charts and selection menus, first junior status achievement graphs, charts and selection menus, and post-junior status graphs, charts and selection menus, (ii) the campus devices to further display course passage rates graphs, charts and selection menus, course and GPA equity gap graphs, charts and selection menus, first post-graduate enrollment graphs, charts and selection menus, student populations graphs, charts and selection menus, historical graduation rate graphs, charts and selection menus, equity gaps graphs, charts and selection menus, high school and community college feeder schools graphs, charts and selection menus, equity gap by campus graphs, charts and selection menus, and GPA equity gap by course graphs, charts and selection menus, (iii) the faculty devices to further display student type graphs, charts and selection menus, progress rate graphs, charts and selection menus, majors view graphs, charts and selection menus, course struggle graphs, charts and selection menus, GPA equity gap graphs, charts and selection menus, second junior status achievement graphs, charts and selection menus, academic outcomes graphs, charts and selection menus, student departure graphs, charts and selection menus, and second post-graduate enrollment graphs, charts and selection menus, and (iv) the external stakeholder devices to display state-wide peer comparison graphs, chart and selection menus, national peer comparison graphs, charts and selection menus, in-state high school graphs, charts and selection menus, in-state church partners graphs, charts and selection menus, and in-state community college graphs, charts and selection menus, and the student devices have access to the relational database based on a student sign-in and are limited to student menus, student displays, and student data formatted for student reports, the plurality of faculty devices have access to the relational database based on faculty sign-in and are limited to faculty menus, faculty displays, and faculty data formatted for faculty reports, and the plurality of campus devices have access to the relational database based on campus sign-in and are limited to campus menus, campus displays, and campus data formatted for campus reports.

14. The non-transitory computer readable medium of claim 13, wherein the computer program instructions further detect a type of display of the plurality of displays, wherein the type of display comprises one or more from the group consisting of a smartphone, a tablet, a laptop, and a desktop computer, and use an application programming interface (API) specific for each type of device to receive device-modified special purpose output selected university data.

15. The non-transitory computer readable medium of claim 13, wherein the computer program instructions further:
use a web server connected to the Internet to access and communicate with the centralized data collection node, wherein the web server has a data storage device, a connection to the Internet, and a messaging gateway;
use at least one remote access module that is connected to the centralized data collection node to communicate with the web server via the messaging gateway; and
use an Internet device connected to the Internet to allow a user of the university display to communicate with the web server and remotely access and control the centralized data collection node via the web server.

16. The non-transitory computer readable medium of claim 13, wherein the selected university data is directly received from a university and includes data formatted as received from the university or a proxy.

17. The non-transitory computer readable medium of claim 13, wherein said computer program instructions further provide remote access to the NOC and settings of a remote multi-user enrollment, progress, and degree completion display system via the Internet,
use a web server connected to the Internet to access the NOC and the remote multi-user enrollment, progress, and degree completion display system, wherein the web server has a data storage device, a connection to the Internet, and a messaging gateway to communicate with the NOC and the remote multi-user enrollment, progress, and degree completion display system;
use at least one remote access module that is connected to the NOC and the remote multi-user enrollment, progress, and degree completion display system, the remote access module having a digital interface coupled to the NOC and the remote multi-user enrollment, progress, and degree completion display system and a communications module, to communicate with the web server via the messaging gateway; and
use an internet device connected to the Internet to communicate with the web server and remotely access and control the NOC and the remote multi-user enrollment, progress, and degree completion display system via the web server.

18. The non-transitory computer readable medium of claim 13, wherein the computer program instructions comprise a university dashboard data module configured to generate from the SU data a first output of student level input variables comprising 108 variables per student and a second output of 18 variables per campus, and the multiple sources comprise:
an AD source comprising SLIV data, said SLIV data comprising the 527 variables per student,
an FAD data source comprising the FAD SLIV data, said FAD SLIV data comprising the 115 variables per student,
a university education advisory board (EAB) data source comprising education advisory board student level input variable (EAB-SLIV) data, said EAB-SLIV data comprising 44 variables per student,
an NSC data source comprising the NSC-SLIV data, said NSC-SLIV data comprising 32 variables per student,
a state employment development department (SEDD) data source comprising state employment development department student level input variable (SEDD-SLIV) data, said SEDD-SLIV data comprising 10 variables per student,
a national survey for student engagement (NSSE) data source comprising national survey for student engagement student level input variable (NSSE-SLIV) data, said NSSE-SLIV data comprising 113 variables per student, a cooperative institutional research program-freshman survey (CIRP-FS) data source comprising cooperative institutional research program-freshman survey student level input variable (CIRPFS-SLIV) data, said CIRPFS-SLIV data comprising 52 variables per student, an MAJ data source comprising the MAJ data, a DEPT data source comprising the DEPT data, and an IPEDS national peers data source comprising the PEERS-CLIV data, said PEERS-CLIV data comprising the 2159 variables per campus.

19. The non-transitory computer readable medium of claim 13, wherein the computer program instructions, when executed by the first processor, further (i) define, create, query, update, and administer the relational database, (ii) generate a specific data set from a combination of the variables from the relational database, (iii) interrogate the specific data set and run selected transformational mathematical models on the specific data set, (iv) generate display outputs, (v) evaluate the display outputs against an audience for which the display output is intended, the audience being selected from a student, a faculty, a campus administrator, and an external stakeholder, and (vi) finalize the display output.

* * * * *